(12) United States Patent
Enomura

(10) Patent No.: US 9,255,202 B2
(45) Date of Patent: Feb. 9, 2016

(54) METHOD FOR TREATING SURFACE OF PIGMENT MICROPARTICLES

(75) Inventor: Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 1130 days.

(21) Appl. No.: 13/254,986

(22) PCT Filed: Nov. 10, 2009

(86) PCT No.: PCT/JP2009/069073
§ 371 (c)(1),
(2), (4) Date: Sep. 15, 2011

(87) PCT Pub. No.: WO2010/100794
PCT Pub. Date: Sep. 10, 2010

(65) Prior Publication Data
US 2012/0006230 A1    Jan. 12, 2012

(30) Foreign Application Priority Data

Mar. 3, 2009   (JP) .................................. 2009-049962

(51) Int. Cl.
*B05D 7/00*   (2006.01)
*B05D 1/34*   (2006.01)
(Continued)

(52) U.S. Cl.
CPC ......... *C09B 67/0091* (2013.01); *B01F 7/00791* (2013.01); *C09B 67/0019* (2013.01); *C09B 67/0022* (2013.01); *C09B 67/0096* (2013.01); *C09B 68/4253* (2013.01)

(58) Field of Classification Search
CPC ............ C09B 67/0014; C09B 67/0022; C09B 67/0035; C09B 67/0002; C09B 67/0019; C09B 67/0023; C09B 67/0025; C01G 23/047; B29B 9/10; B29B 9/16

USPC ................................ 427/212; 106/410; 264/8
See application file for complete search history.

(56) References Cited

U.S. PATENT DOCUMENTS

| | | | |
|---|---|---|---|
| 2,284,685 A * | 6/1942 | Detrick et al. ................. | 540/122 |
| 2,526,345 A | 10/1950 | Giambalvo | |
| 3,519,453 A | 7/1970 | Morris et al. | |
| 2004/0032792 A1 * | 2/2004 | Enomura ............ | B01F 7/00758 366/263 |

FOREIGN PATENT DOCUMENTS

| | | |
|---|---|---|
| GB | 2255565 A | 11/1992 |
| JP | 8-3498 A | 1/1996 |

(Continued)

OTHER PUBLICATIONS

Brechtelsbauer et al., "Evaluation of a Spinning Disc Reactor for Continuous Processing," Organic Process Research and Development, American Chemical Society, vol. 5, No. 1, 2001, pp. 65-68, XP008134718.

*Primary Examiner* — Alexander Weddle
(74) *Attorney, Agent, or Firm* — Birch, Stewart, Kolasch & Birch, LLP

(57) ABSTRACT

The surface of fine pigment particles is efficiently treated using low energy without causing a cost increase. Provided is a method of treating the surface of fine pigment particles, characterized by maintaining a small gap of 1 mm or narrower between two treating surfaces which are able to get close to and apart from each other and relatively rotate and using the gap between the two treating surfaces which is kept so narrow, as a passage for a fluid to be treated, thereby forming a thin film of the fluid to be treated (forced thin film). Fine pigment particles are formed in this thin-film fluid (forced thin film). The method is further characterized by modifying the surface of the formed fine pigment particles within the thin-film fluid (forced thin film).

15 Claims, 49 Drawing Sheets

(51) Int. Cl.
    *C09B 67/46*     (2006.01)
    *B01F 7/00*     (2006.01)
    *C09B 67/16*     (2006.01)
    *C09B 67/00*     (2006.01)
    *C09B 67/54*     (2006.01)

(56) References Cited

FOREIGN PATENT DOCUMENTS

| | | |
|---|---|---|
| JP | 10-110110 A | 4/1998 |
| JP | 2000-256593 A | 9/2000 |
| JP | 2000-303014 A | 10/2000 |
| JP | 2002-317126 A | 10/2002 |
| JP | 2004-175975 A | 6/2004 |
| JP | 2004175975 * | 6/2004 |
| JP | 2004-182751 A | 7/2004 |
| JP | 2004-307854 A | 11/2004 |
| JP | 2006-274023 A | 10/2006 |
| JP | 2006-341232 A | 12/2006 |
| JP | 2007-112919 A | 5/2007 |
| JP | 2008-31194 A | 2/2008 |
| JP | 2008-231169 A | 10/2008 |
| WO | WO 2009/008388 A1 | 1/2009 |
| WO | WO2009008393 A1 * | 1/2009 |

* cited by examiner

Fig. 9
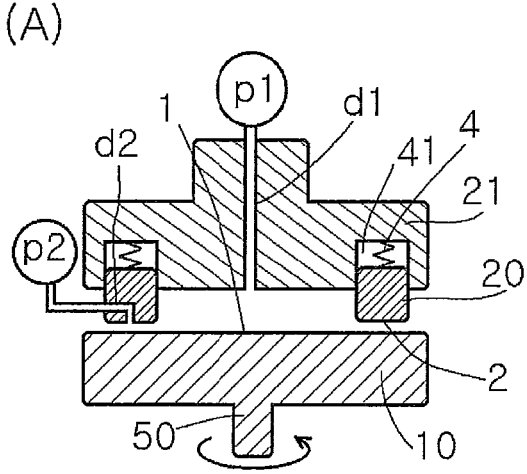
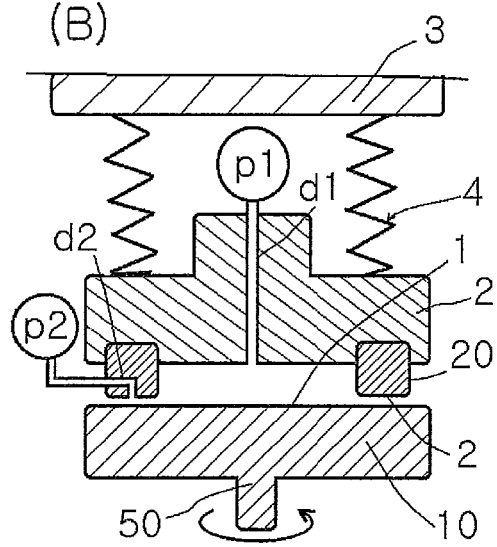
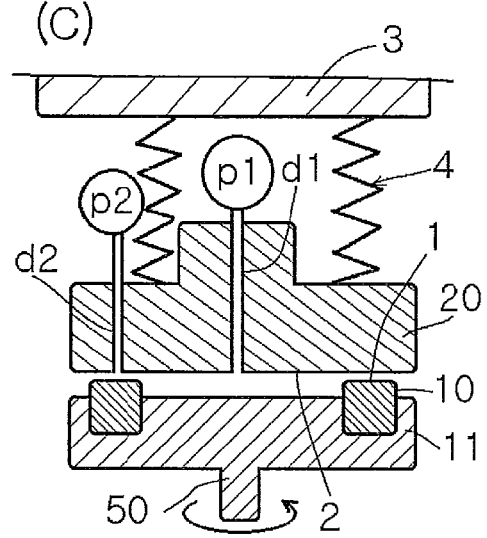

Fig. 24
(A) 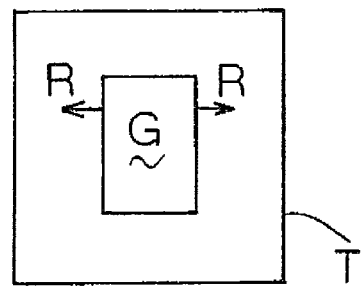
(B) 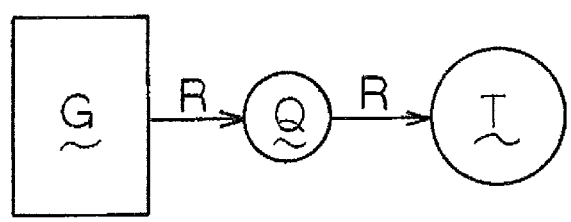
(C) 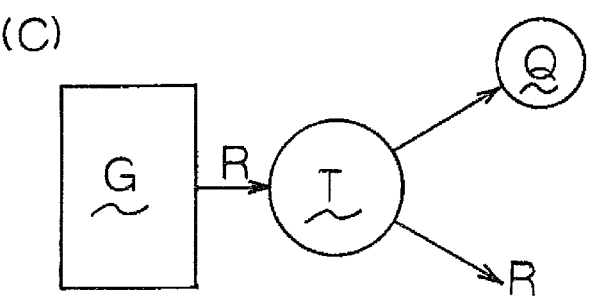

Fig. 26
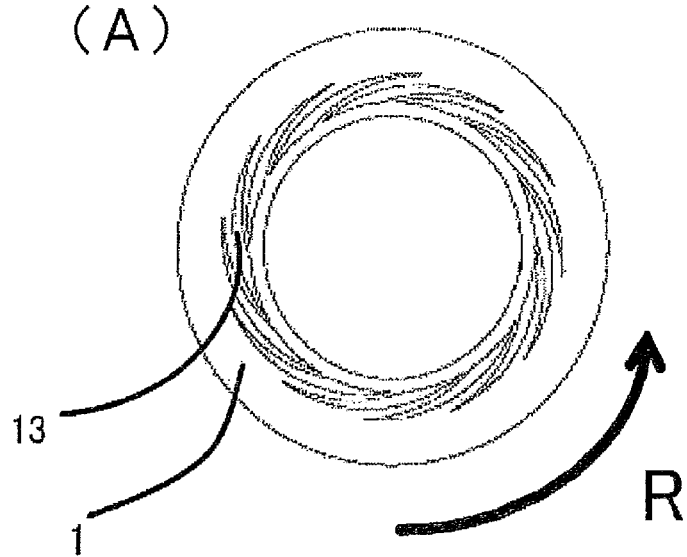
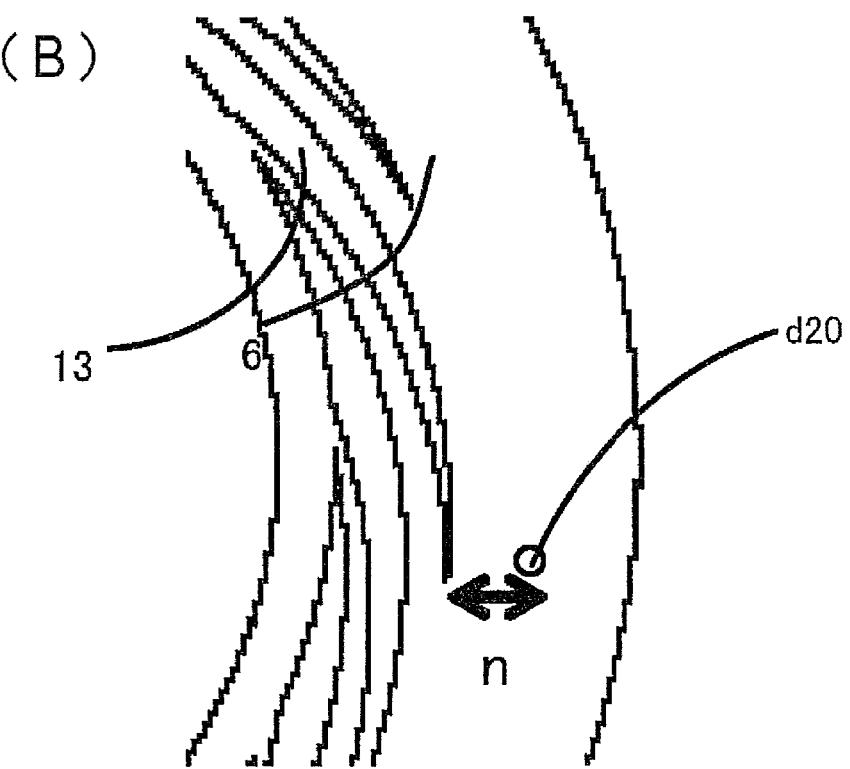

Fig. 27
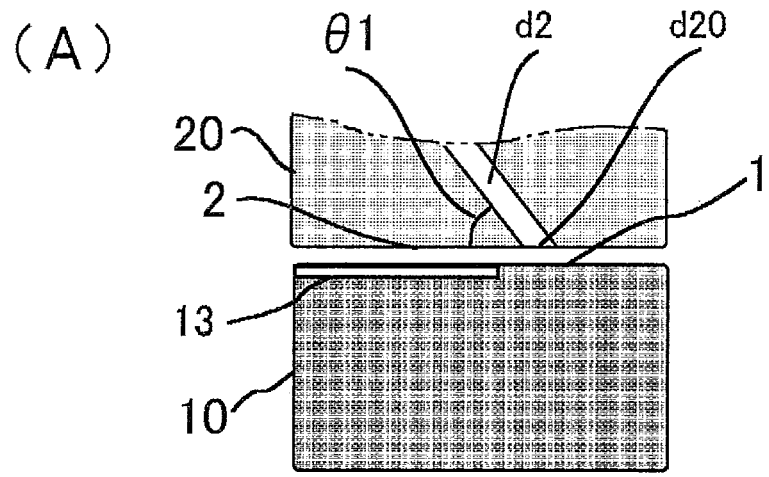
(A)
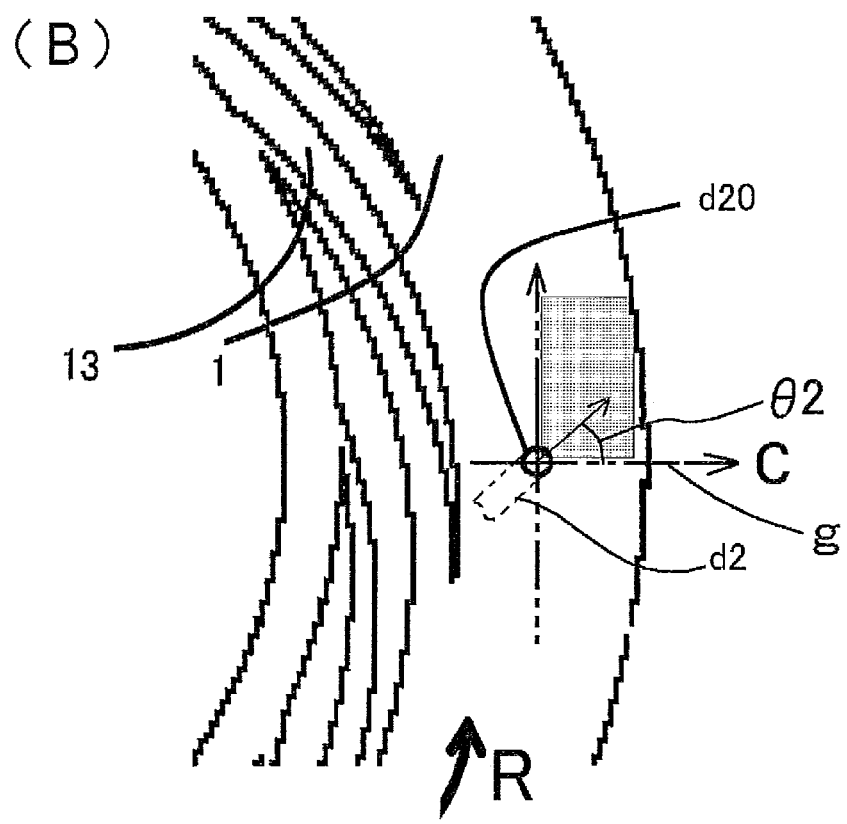
(B)

Fig. 28
(A)
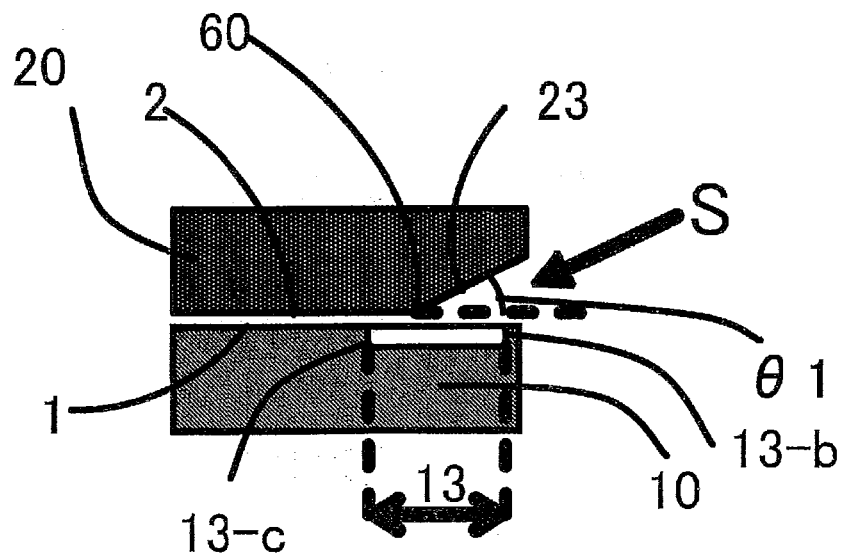
(B)
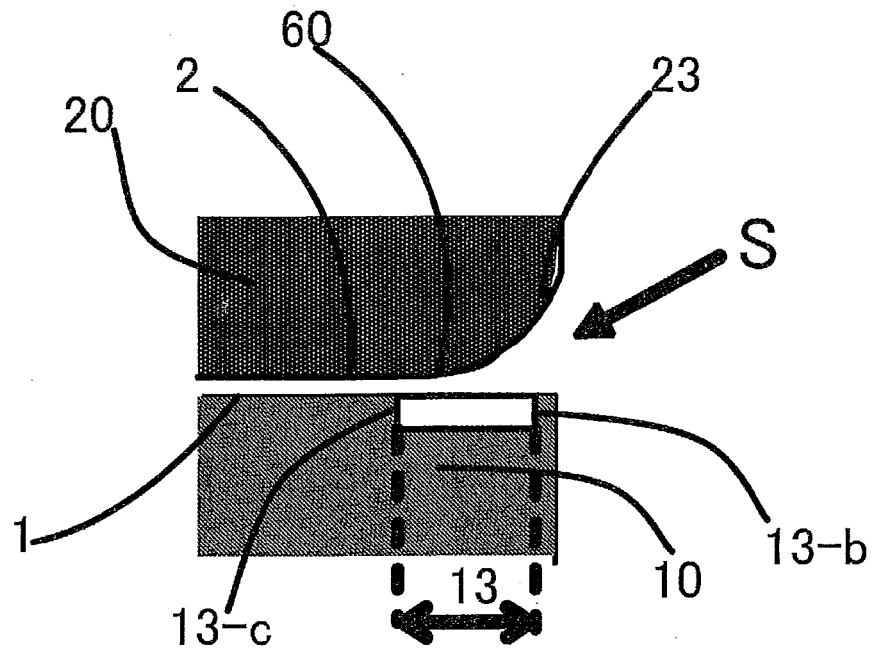

Fig. 45
(A)
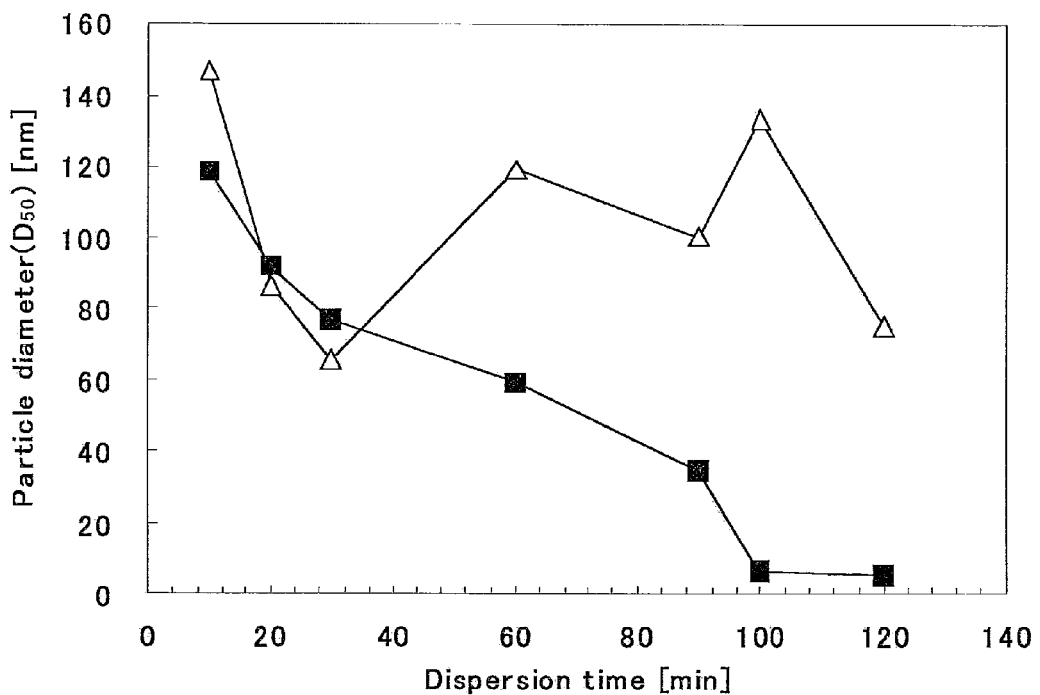
(B)
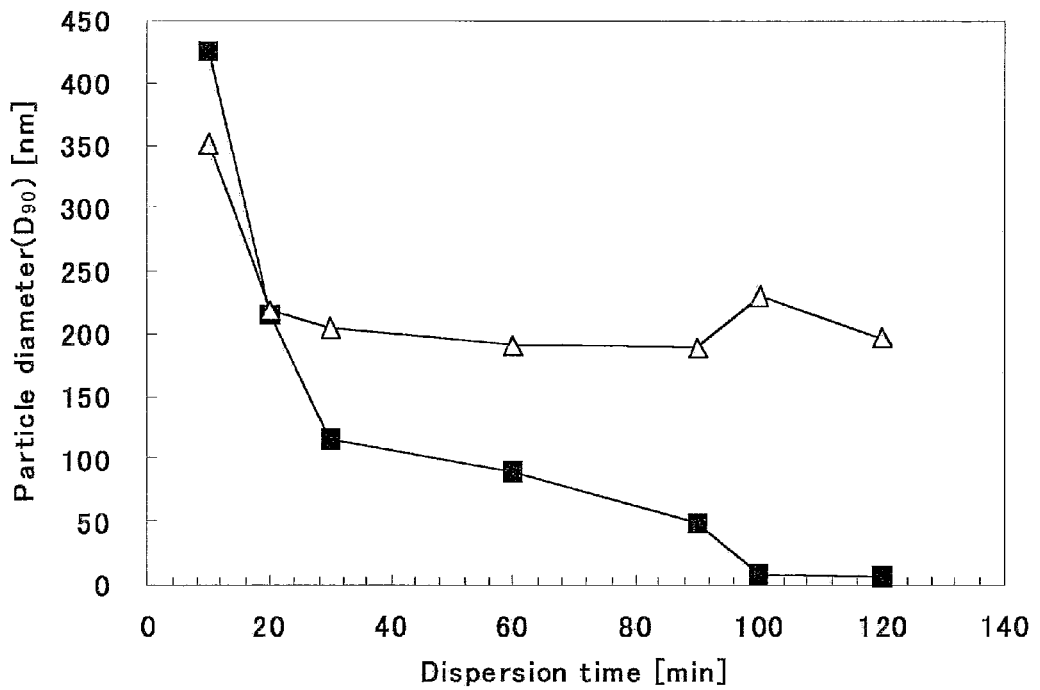

METHOD FOR TREATING SURFACE OF PIGMENT MICROPARTICLES

TECHNICAL FIELD

The present invention relates to a method for treating surface of pigment microparticles.

BACKGROUND ART

Pigment microparticles are used by dispersing them into a dispersing medium such as water and an organic solvent. However, in general, as the size of pigment microparticles becomes smaller, dispersion into a dispersing medium becomes more difficult; and as a result, an equipment requiring large energy such as a bead mill and a high pressure homogenizer is necessary for dispersion, or there is a problem of dispersion stability due to reaggregation of microparticles once dispersed. Therefore, to homogeneously disperse pigment microparticles, such a method in which surface of pigment microparticles is modified to increase affinity with a dispersing medium or with a dispersing agent contained in a dispersing medium has been known in the art (Patent Document 1 and Patent Document 2).

In addition, a method in which, after a water-swelled organic pigment paste is added into a reaction medium for sulfonation to disperse the pigment, water is removed and then a sulfonic acid group (sulfo group) is introduced onto particle surface of the organic pigment by a sulfonating agent (Patent Document 3), a method in which phthalocyanine pigment particles are dispersed into an aqueous solution of a water-soluble phthalocyanine derivative, which is obtained by introducing an acidic functional group or its salt into phthalocyanine, thereby adsorbing the water-soluble phthalocyanine derivative onto surface of the phthalocyanine pigment particles (Patent Document 4), and a method in which an aqueous sodium hydroxide is added dropwise into an aqueous slurry solution containing copper phthalocyanine to control at pH 12.0, and then the resulting mixture is irradiated with ultrasonic wave of 38 KHz at 150 W from ultrasonic transducer 2 of ultrasonic oscillator 1 under an ozone-containing oxygen gas stream at the flow rate of 0.5 liter per minute to introduce a hydrophilic functional group onto surface of copper phtalocyanine microparticles (Patent Document 5), have been known.

However, in surface treatment of aggregated particles or particles once dried, it is general that surface treatment must be done after redispersion of intended particles into a solvent. Because of this, large energy is necessary to disperse uniformly the particles whose surface is not treated; and in addition, it is difficult to treat surface of each particle uniformly. Further, in the case that surface modification is done after formation of microparticles by atomization, large energy is necessary in each step. Still further, to carry out intended treatment in each step, different reagents are necessary in respective steps thereby leading to increase in cost and wasting large amount of resources.

There is a method in which an organic pigment solution obtained by dissolving the pigment into a good solvent to the pigment is mixed with a solvent being capable of a poor solvent to the pigment thereby effecting separating of the pigment into a mixed solution as particles with surface of the particles being modified almost at the same time substantively; in this regard, disclosed is a method for producing surface-treated pigment, wherein a mixture, obtained by separating into a water from a strongly acidic solution of a poorly water-soluble compound having an acidic functional group bonded to its dye moiety and a compound that is a constituting component of an organic pigment, is adsorbed onto particle surface of the organic pigment (Patent Document 7). However, this method comprises a step of producing a compound having a modification group in its dye moiety and steps of dissolution and reseparating of a mixture of the pigment with the compound having a modification group in its dye moiety; and thus the method has problems of increased number of steps, increased cost, and so on. It is to be noted that the modification group means a functional group or a radical that is introduced or bonded at least onto particle surface.

In addition, there is a method in which an organic pigment solution obtained by dissolving the pigment into a first solvent that is a good solvent to the pigment is mixed with a second solvent being capable of a poor solvent to the pigment thereby effecting separating of the organic pigment as nanoparticles into a mixed solution, then a polymer having mass-average molecular weight of 1000 or higher is introduced and at the same time a surface-modification group is substantially introduced (Patent Document 8); in this method, however, the surface-modification group inevitably contains the polymer; and thus, this method has such a problem that both the surface-modification group and the polymer need to be selected in accordance with a dispersing medium and a dispersing agent of produced particles.

According to the invention by the present applicant (Patent Document 6), pigment microparticles are produced by using an equipment wherein a minute space is kept between two processing surfaces being capable of approaching to and separating from each other and rotating relative to each other, wherein this minute space kept between two processing surfaces is used as a flow path of a fluid to be processed thereby forming a thin film fluid (forced thin film) of the fluid to be processed, wherein pigment microparticles are formed in this thin film fluid (forced thin film); however, even by using such an equipment, easy dispersiveness of pigment microparticles could not be established yet.

PRIOR ART DOCUMENT

Patent Document

Patent Document 1: JP-A 2000-256593
Patent Document 2: JP-A H08-3498
Patent Document 3: JP-A H10-110110
Patent Document 4: JP-A 2000-303014
Patent Document 5: JP-A 2004-182751
Patent Document 6: WO 2009/8388
Patent Document 7: JP-A 2002-317126
Patent Document 8: JP-A 2008-231169

SUMMARY OF THE INVENTION

Problem the Present Invention Aims to Solve

In view of the situation mentioned above, the present invention has an object to effect surface treatment of pigment microparticles, for example, to introduce a modification group at least onto surface of pigment microparticles, with small energy, with high efficiency, and without increasing a cost.

Means for Solving the Object

An aspect of the present invention according to claim 1 is a method for surface treatment of pigment microparticles, wherein a fluid to be processed is supplied between processing surfaces capable of approaching to and separating from each other and displacing relative to each other, a force to move in the direction of approaching, wherein the force includes a supply pressure of the fluid to be processed and a pressure applied between the rotating processing surfaces, is balanced with a force to move in the direction of separating thereby keeping a minute space in the distance between the processing surfaces, the minute space kept between two processing surfaces is used as a flow path of the fluid to be processed thereby forming a thin film fluid by the fluid to be processed, pigment microparticles are formed in the thin film fluid, and the pigment microparticles thereby formed is surface-modified.

An aspect of the present invention according to claim 2 is the method for surface treatment of pigment microparticles according to claim 1, wherein the production method comprises: a fluid pressure imparting mechanism for imparting a pressure to the fluid to be processed, at least two processing members of a first processing member and a second processing member, the second processing member being capable of relatively approaching to and separating from the first processing member, and a rotation drive mechanism for rotating the first processing member and the second processing member relative to each other, wherein each of the processing members is provided with at least two processing surfaces of a first processing surface and a second processing surface disposed in a position they are faced with each other, each of the processing surfaces constitutes part of a sealed flow path through which the fluid to be processed under the pressure is passed, of the first and second processing members, at least the second processing member is provided with a pressure-receiving surface, and at least part of the pressure-receiving surface is comprised of the second processing surface, the pressure-receiving surface receives the pressure applied to the fluid to be processed by the fluid pressure imparting mechanism thereby generating a force to move in the direction of separating the second processing surface from the first processing surface, the fluid to be processed under the predetermined pressure is passed between the first and second processing surfaces being capable of approaching to and separating from each other and rotating relative to each other, whereby the fluid to be processed forms the thin film fluid, the pigment microparticles are formed in the thin film fluid, and the pigment microparticles thereby formed is surface-modified.

An aspect of the present invention according to claim 3 is the method for producing copper phthalocyanine microparticle according to claim 2, wherein one of the fluids to be processed under the pressure from the fluid pressure imparting mechanism is passed between the first and second processing surfaces, wherein an independent introduction path through which a fluid to be processed other than the said fluid to be processed is passed is arranged, and at least one opening leading to the introduction path is arranged in at least either the first processing surface or the second processing surface, wherein the fluid other than the said fluid to be processed is introduced between the processing surfaces from the introduction path whereby the said fluid to be processed and the fluid other than the said fluid to be processed are mixed in the thin film fluid.

An aspect of the present invention according to claim 4 is the method for surface treatment of microparticles according to any one of claims 1 to 3, wherein the surface treatment of pigment microparticles is effected in the thin film fluid.

An aspect of the present invention according to claim 5 is the method for surface treatment of pigment microparticles according to any one of claims 1 to 4, wherein the surface treatment is effected by treating surface of the pigment microparticles with an acid group.

An aspect of the present invention according to claim 6 is the method for surface treatment of pigment microparticles according to any one of claims 1 to 4, wherein the surface treatment is effected by treating surface of the pigment microparticles with a basic group.

An aspect of the present invention according to claim 7 is pigment microparticles produced by the method for surface treatment of pigment microparticles according to any one of claims 1 to 6.

An aspect of the present invention according to claim 8 is a disperse solution of pigment microparticles obtained by the method for surface treatment of pigment microparticles according to any one of claims 1 to 6.

Effect of the Invention

According to the present invention, surface modification of pigment microparticles could be effected effectively and efficiently. In addition, formation of microparticles by atomization and surface modification can be effected substantially at the same time, and thus, a process could be made simple. Still in addition, a process that requires large energy could be omitted, so that existing problems as mentioned above could be remedied.

BRIEF DESCRIPTION OF DRAWINGS

FIG. 9(A) to FIG. 9(C) each show a schematic vertical sectional view showing the concept of still another embodiment of the apparatus shown in FIG. 1.

FIG. 24(A), FIG. 24(B) and FIG. 24(C) are diagrams showing embodiments other than those described above with respect to the method of separating a processed material after processing.

FIG. 26(A) is a schematic plane view of the first processing surface in the apparatus shown in FIG. 25, and FIG. 26(B) is an enlarged view showing an important part of the first processing surface in the apparatus shown in FIG. 25.

FIG. 27(A) is a sectional view of the second introduction path, and FIG. 27(B) is an enlarged view showing an important part of the processing surface for explaining the second introduction path.

FIG. 28(A) and FIG. 28(B) are each an enlarged sectional view of an important part for explaining an inclined surface arranged in the processing member.

FIG. 29(A) is a bottom view of the second processing member, and FIG. 29(B) is an enlarged sectional view showing an important part of first and second processing members 1 and 2.

FIG. 43 (A) is obtained in Example 3 (Ex. 1) and FIG. 43 (B) is obtained in Example 6 (Ex. 4). Gray lines show theoretical values of existing ratio of stable isotopes of copper phthalocyanine.

FIG. 45 shows change of particle diameter with a lapse of time in dispersion treatment in each of Example 3 (Ex. 1/white triangles) and Example 6 (Ex. 4/black quadrangles) with regard to the organic solvent disperse solution of copper phthalocyanine microparticles. FIG. 45 (A) shows $D_{50}$ (50% by volume diameter) and FIG. 45 (B) shows $D_{90}$ (90% by volume diameter).

1/white triangles), Example 4 (Ex. 2/white circles), and Example 6 (Ex. 3/white quadrangles) with regard to the aqueous disperse solution of copper phthalocyanine microparticles. FIG. 47 (A) shows $D_{50}$ (50% by volume diameter) and FIG. 47 (B) shows $D_{90}$ (90% by volume diameter).

EMBODIMENTS TO CARRY OUT THE INVENTION

Figure 1:
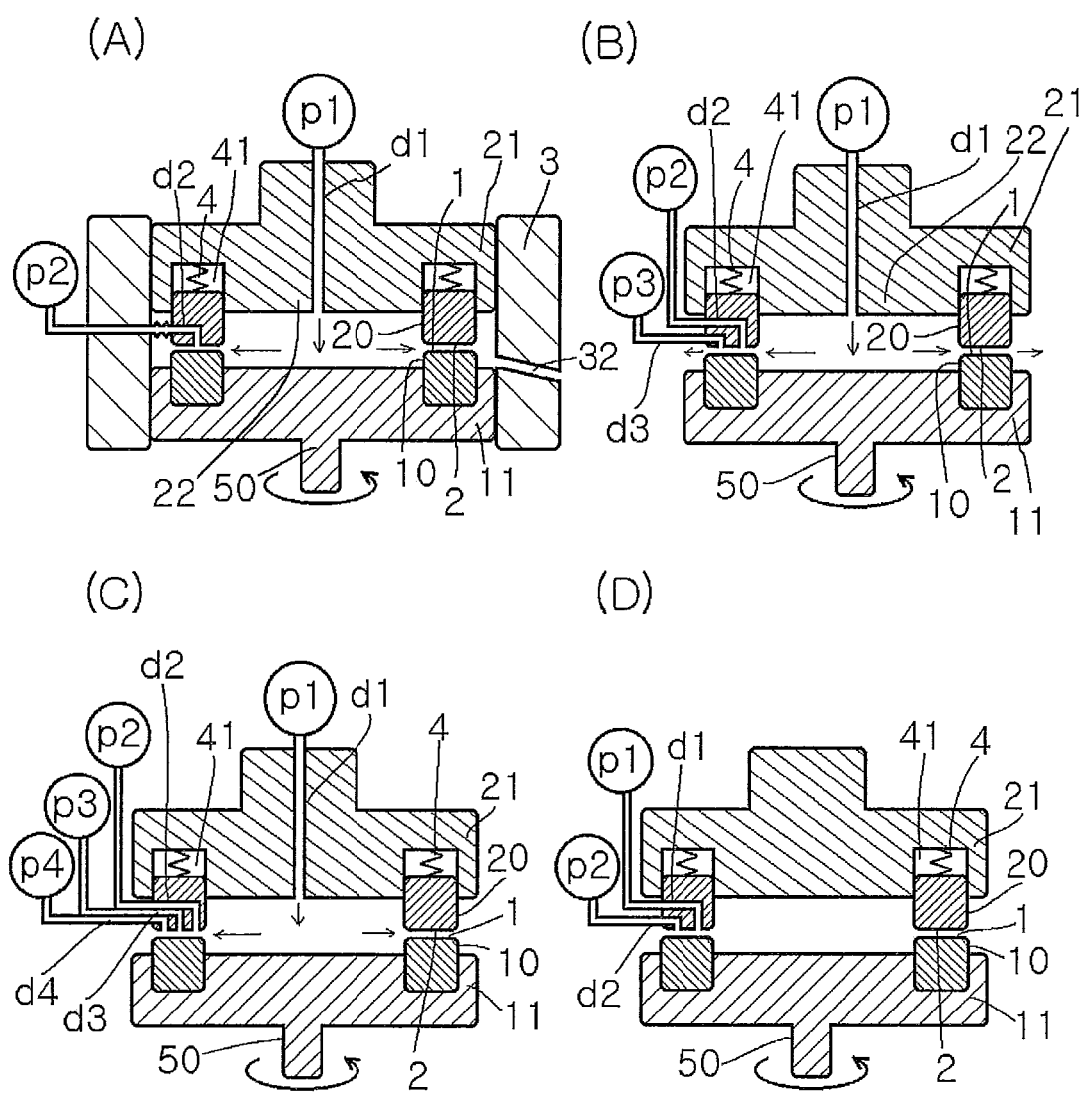
FIG. 1(A) is a schematic vertical sectional view showing the concept of the apparatus used for carrying out the present invention.
FIG. 1(B) is a schematic vertical sectional view showing the concept of another embodiment of the apparatus.
FIG. 1(C) is a schematic vertical sectional view showing the concept of still another embodiment of the apparatus.
FIG. 1(D) is a schematic vertical sectional view showing the concept of still another embodiment of the apparatus.
Figure 2:
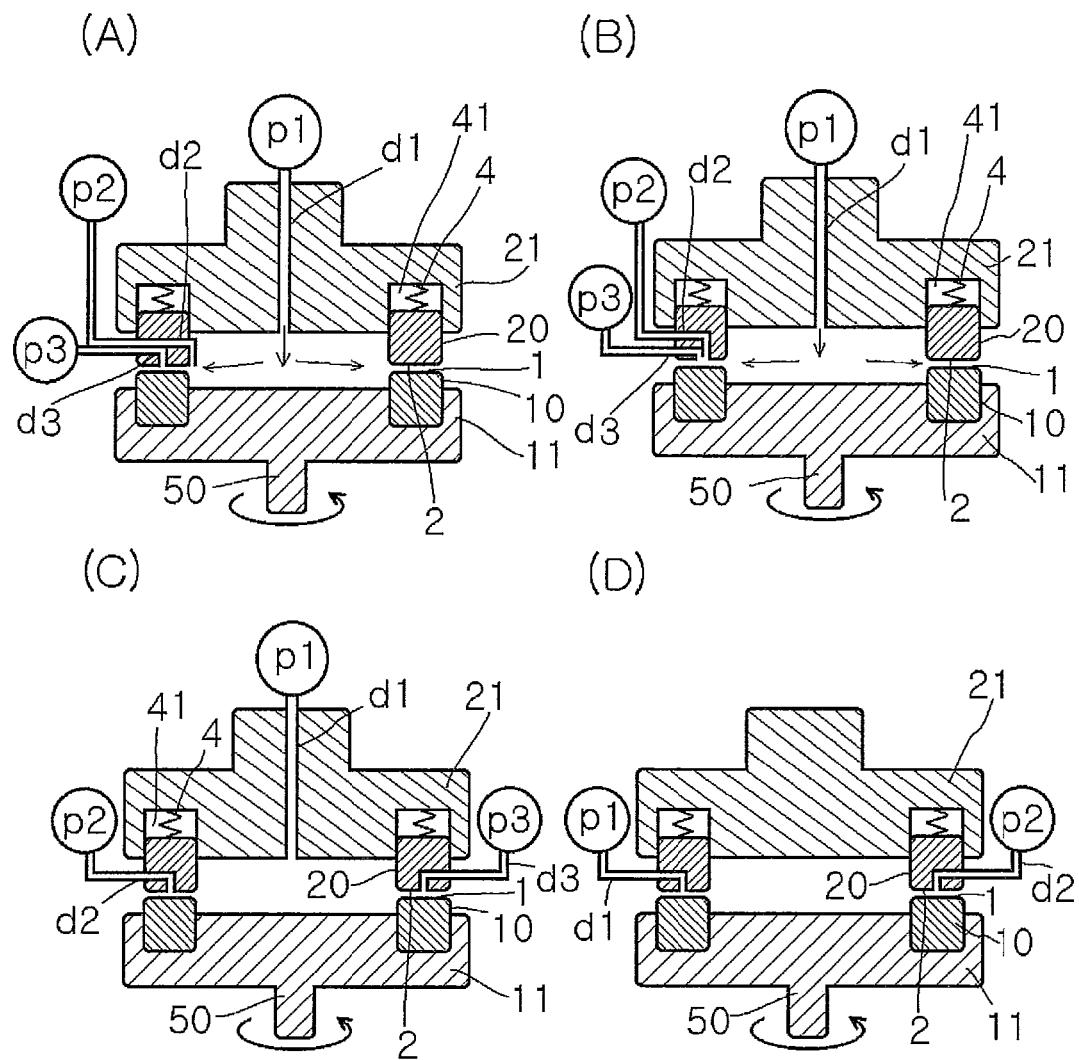
FIG. 2(A) to FIG. 2(D) each show a schematic vertical sectional view showing the concept of still another embodiment of the apparatus shown in FIG. 1.

The present invention relates to a method for surface treatment, or in more detail to a method for surface modification, of pigment microparticles, wherein a minute space of 1 mm or less is kept between two processing surfaces being capable of approaching to and separating from each other and rotating relative to each other, and this minute space kept between two processing surfaces is used as a flow path of a fluid to be processed thereby forming a thin film fluid (forced thin film) of the fluid to be processed, whereby the pigment microparticles formed in this thin film fluid (forced thin film) are surface-treated.

Kinds of the pigment microparticles to be surface-treated are not particularly limited. An example thereof includes pigment of a perylene compound, pigment of a perinone compound, pigment of a quinacridone compound, pigment of quinacridonequinone compound, pigment of an anthraquinone compound, pigment of an anthanthrone compound, pigment of a benzimidazolone compound, pigment of a disazo condensation compound, pigment of a disazo compound, pigment of an azo compound, pigment of an indanthrone compound, pigment of a phthalocyanine compound, pigment of a triaryl carbonium compound, pigment of a dioxazine compound, pigment of an aminoanthraquinone compound, pigment of a diketopyrrolopyrrole compound, pigment of a thioindigo compound, pigment of an isoindoline compound, pigment of an isoindolinone compound, pigment of a pyranethrone compound, and pigment of an isoviolanthrone compound, or a mixture thereof.

An equipment to produce pigment microparticles—wherein a minute space of 1 mm or less is kept between two processing surfaces being capable of approaching to and separating from each other and rotating relative to each other, wherein this minute space kept between two processing surfaces is used as a flow path of the fluid to be processed thereby forming a thin film fluid (forced thin film) of a fluid to be processed, whereby the pigment microparticles are formed in this thin film fluid (forced thin film)—is not particularly limited; and, for example, an equipment based on the principle described in International Patent Laid-Open Publication No. 2009/8388 (Patent Document 6) may be used.

To produce pigment microparticles for surface modification of the present invention, in a method in which a fluid containing a pigment solution obtained by dissolving the pigment into a solvent is mixed with a fluid containing a solvent capable of being a poor solvent that has lower solubility to the pigment in the pigment solution thereby separating the pigment to produce pigment microparticles, one example thereof is a method for producing pigment microparticles, wherein the foregoing respective fluids are mixed as a thin film fluid between processing surfaces arranged to be opposite to each other so as to be able to approach to and separate from each other, at least one of which rotates relative to the other, whereby separating the pigment microparticles in the thin film fluid. In the following, this production method will be explained. However, this production method is a mere example, and thus, the present invention is not limited to this production method.

Hereinafter, the fluid processing apparatus suitable for carrying out this method is described.

As shown in FIG. 1(A), this apparatus includes opposing first and second processing members 10 and 20, at least one of which rotates to the other. The opposing surfaces of both the processing members 10 and 20 serve as processing surfaces 1 and 2 to process a fluid to be processed therebetween. The first processing member 10 includes a first processing surface 1, and the second processing member 20 includes a second processing surface 2.

Both the processing surfaces 1 and 2 are connected to a flow path of the fluid to constitute a part of the flow path of the fluid.

Specifically, this apparatus constitutes flow paths of at least two fluids to be processed and joins the flow paths together.

That is, this apparatus is connected to a flow path of a first fluid to form a part of the flow path of the first fluid and simultaneously forms a part of a flow path of a second fluid other than the first fluid. This apparatus joins both the flow paths together thereby mixing and reacting both the fluids between the processing surfaces 1 and 2. In the embodiment shown in FIG. 1(A), each of the flow paths is hermetically closed and made liquid-tight (when the processed fluid is a liquid) or air-tight (when the processed fluid is a gas).

Specifically, this apparatus as shown in FIG. 1(A) includes the first processing member 10, the second processing member 20, a first holder 11 for holding the first processing member 10, a second holder 21 for holding the second processing member 20, a surface-approaching pressure imparting mechanism 4, a rotation drive member, a first introduction part d1, a second introduction part d2, a fluid pressure imparting mechanism p1, a second fluid supply part p2, and a case 3.

Illustration of the rotation drive member is omitted.

At least one of the first processing member 10 and the second processing member 20 is able to approach to and separate from each other, and the processing surfaces 1 and 2 are able to approach to and separate from each other.

In this embodiment, the second processing member 20 approaches to and separates from the first processing member 10. On the contrary, the first processing member 10 may approach to and separate from the second processing member 20, or both the processing members 10 and 20 may approach to and separate from each other.

The second processing member 20 is disposed over the first processing member 10, and the lower surface of the second processing member 20 serves as the second processing surface 2, and the upper surface of the first processing member 10 serves as the first processing surface 1.

As shown in FIG. 1(A), the first processing member 10 and the second processing member 20 in this embodiment are circular bodies, that is, rings. Hereinafter, the first processing member 10 is referred to as a first ring 10, and the second processing member 20 as a second ring 20.

Both the rings 10 and 20 in this embodiment are metallic members having, at one end, a mirror-polished surface, respectively, and their mirror-polished surfaces are referred to as the first processing surface 1 and the second processing surface 2, respectively. That is, the upper surface of the first ring 10 is mirror-polished as the first processing surface 1, and the lower surface of the second ring is mirror-polished as the second processing surface 2.

At least one of the holders can rotate relative to the other holder by the rotation drive member. In FIG. 1(A), numerical 50 indicates a rotary shaft of the rotation drive member. The rotation drive member may use an electric motor. By the rotation drive member, the processing surface of one ring can rotate relative to the processing surface of the other ring.

In this embodiment, the first holder 11 receives drive power on the rotary shaft 50 from the rotation drive member and rotates relative to the second holder 21, whereby the first ring 10 integrated with the first holder 11 rotates relative to the second ring 20. Inside the first ring 10, the rotary shaft 50 is disposed in the first holder 11 so as to be concentric, in a plane, with the center of the circular first ring 10.

The first ring 10 rotates centering on the shaft center of the first ring 10. The shaft center (not shown) is a virtual line referring to the central line of the first ring 10.

In this embodiment as described above, the first holder 11 holds the first ring 10 such that the first processing surface 1 of the first ring 10 is directed upward, and the second holder 21 holds the second ring 20 such that the second processing surface 2 of the second ring 20 is directed downward.

Specifically, the first and second holders 11 and 21 include a ring-accepting concave part, respectively. In this embodiment, the first ring 11 is fitted in the ring-accepting part of the first holder 11, and the first ring 10 is fitted in the ring-accepting part so as not to rise from, and set in, the ring-accepting part of the first holder 11.

That is, the first processing surface 1 is exposed from the first holder 11 and faces the second holder 21.

Examples of the material for the first ring 10 include metal, ceramics, sintered metal, abrasion-resistant steel, metal subjected to hardening treatment, and rigid materials subjected to lining, coating or plating. The first processing member 10 is preferably formed of a lightweight material for rotation. A material for the second ring 20 may be the same as that for the first ring 10.

The ring-accepting part 41 arranged in the second holder 21 accepts the processing surface 2 of the second ring 20 such that the processing member can rise and set.

The ring-accepting part 41 of the second holder 21 is a concave portion for mainly accepting that side of the second ring 20 opposite to the processing surface 2, and this concave portion is a groove which has been formed into a circle when viewed in a plane.

The ring-accepting part 41 is formed to be larger in size than the second ring 20 so as to accept the second ring 20 with sufficient clearance between itself and the second ring 20.

By this clearance, the second ring 20 in the ring-accepting part 41 can be displaced not only in the axial direction of the circular ring-accepting part 41 but also in a direction perpendicular to the axial direction. In other words, the second ring 20 can, by this clearance, be displaced relative to the ring-accepting part 41 to make the central line of the second ring 20 unparallel to the axial direction of the ring-accepting part 41.

Hereinafter, that portion of the second holder 21 which is surrounded by the second ring 20 is referred to as a central portion 22.

In other words, the second ring 20 is displaceably accepted within the ring-accepting part 41 not only in the thrust direction of the ring-accepting part 41, that is, in the direction in which the second ring 20 rises from and sets in the part 41, but also in the decentering direction of the second ring 20 from the center of the ring-accepting part 41. Further, the second ring 20 is accepted in the ring-accepting part 41 such that the second ring 20 can be displaced (i.e. run-out) to vary the width between itself upon rising or setting and the ring-accepting part 41, at each position in the circumferential direction of the second ring 20.

The second ring 20, while maintaining the degree of its move in the above three directions, that is, the axial direction, decentering direction and run-out direction of the second ring 20 relative to the ring-accepting part 41, is held on the second holder 21 so as not to follow the rotation of the first ring 10. For this purpose, suitable unevenness (not shown) for regulating rotation in the circumferential direction of the ring-accepting part 41 may be arranged both in the ring-accepting part 41 and in the second ring 20. However, the unevenness should not deteriorate displacement in the degree of its move in the three directions.

The surface-approaching pressure imparting mechanism 4 supplies the processing members with force exerted in the direction of approaching the first processing surface 1 and the second processing surface 2 each other. In this embodiment, the surface-approaching pressure imparting mechanism 4 is disposed in the second holder 21 and biases the second ring 20 toward the first ring 10.

The surface-approaching pressure imparting mechanism 4 uniformly biases each position in the circumferential direction of the second ring 20, that is, each position of the second processing surface 2, toward the first ring 10. A specific structure of the surface-approaching pressure imparting mechanism 4 will be described later.

As shown in FIG. 1(A), the case 3 is arranged outside the outer circumferential surfaces of both the rings 10 and 20, and accepts a product formed between the processing surfaces 1 and 2 and discharged to the outside of both the rings 10 and 20. As shown in FIG. 1(A), the case 3 is a liquid-tight container for accepting the first holder 11 and the second holder 21. However, the second holder 21 may be that which as a part of the case 3, is integrally formed with the case 3.

As described above, the second holder 21 whether formed as a part of the case 3 or formed separately from the case 3 is not movable so as to influence the distance between both the rings 10 and 20, that is, the distance between the processing surfaces 1 and 2. In other words, the second holder 21 does not influence the distance between the processing surfaces 1 and 2.

The case 3 is provided with an outlet 32 for discharging a product to the outside of the case 3.

The first introduction part d1 supplies a first fluid to the space between the processing surfaces 1 and 2.

The fluid pressure imparting mechanism p1 is connected directly or indirectly to the first introduction part d1 to impart fluid pressure to the first processed fluid. A compressor or a pump can be used in the fluid pressure imparting mechanism p1.

In this embodiment, the first introduction part d1 is a fluid path arranged inside the central part 22 of the second holder 21, and one end of the first introduction part d1 is open at the central position of a circle, when viewed in a plane, of the second ring 20 on the second holder 21. The other end of the first introduction part d1 is connected to the fluid pressure imparting mechanism p1 outside the second holder 21, that is, outside the case 3.

The second introduction part d2 supplies a second fluid to be mixed with the first fluid to the space between the processing surfaces 1 and 2. In this embodiment, the second introduction part is a fluid passage arranged inside the second ring 20, and one end of the second introduction part is open at the side of the second processing surface 2, and a second fluid-feeding part p2 is connected to the other end.

A compressor or a pump can be used in the second fluid-feeding part p2.

The first processed fluid pressurized with the fluid pressure imparting mechanism p1 is introduced from the first introduction part d1 to the space between the rings 10 and 20 and will pass through the space between the first processing surface 1 and the second processing surface 2 to the outside of the rings 10 and 20.

At this time, the second ring 20 receiving the supply pressure of the first fluid stands against the bias of the surface-approaching pressure imparting mechanism 4, thereby receding from the first ring 10 and making a minute space between the processing surfaces. The space between both the processing surfaces 1 and 2 by approach and separation of the surfaces 1 and 2 will be described in detail later.

A second fluid is supplied from the second introduction part d2 to the space between the processing surfaces 1 and 2, flows into the first fluid, and is subjected to a mixing (reaction) promoted by rotation of the processing surface. Then, a reaction product formed by the mixing (reaction) of both the fluids is discharged from the space between the processing surfaces 1 and 2 to the outside of the rings 10 and 20. The reaction product discharged to the outside of the rings 10 and 20 is discharged finally through the outlet 32 of the case 3 to the outside of the case 3 (self-discharge).

The mixing and reaction (when the mixing is accompanied by reaction) of the processed fluid are effected between the first processing surface 1 and the second processing surface 2 by rotation, relative to the second processing member 20, of the first processing member 10 with the rotation drive member.

Figure 11:
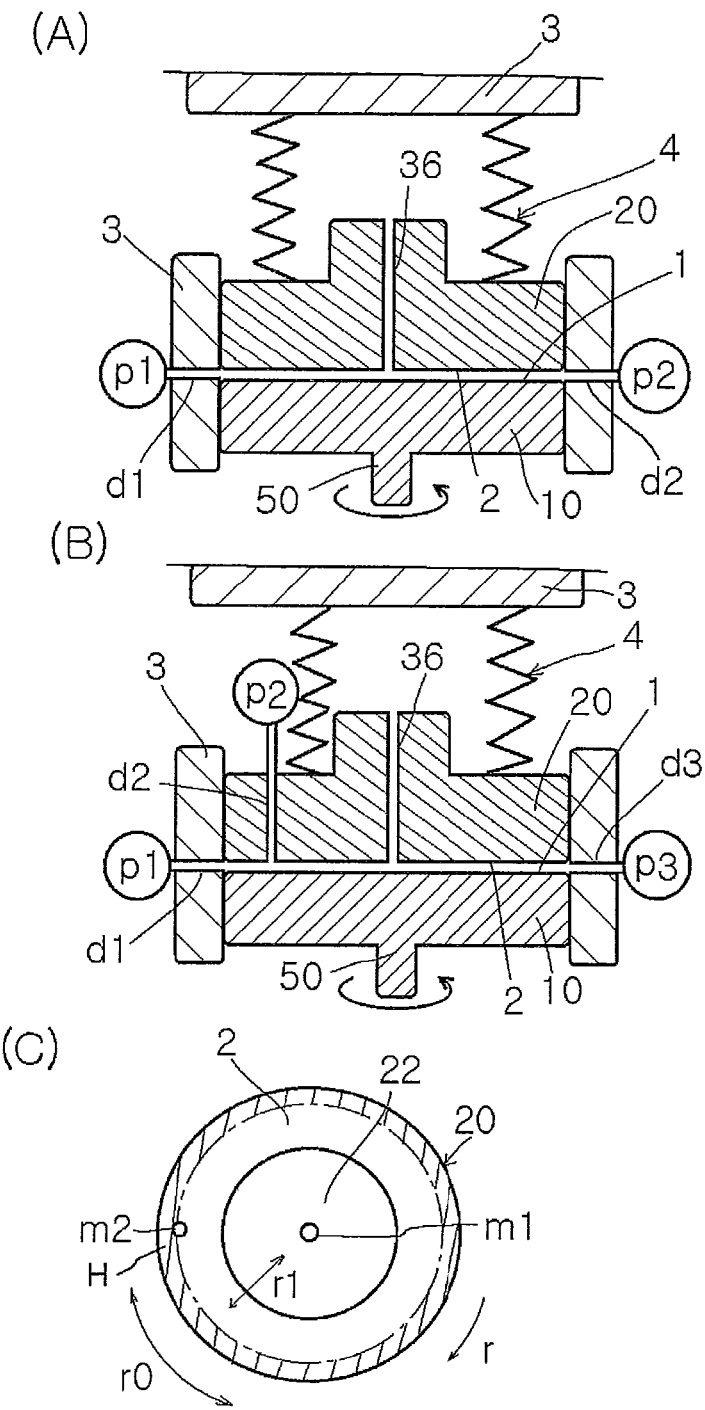
FIG. 11(A) and FIG. 11(B) each show a schematic vertical sectional view showing the concept of still another embodiment of the apparatus shown in FIG. 1.
FIG. 11(C) is a schematic bottom view showing an important part of the apparatus shown in FIG. 1(A).

Between the first and second processing surfaces 1 and 2, a region downstream from an opening m2 of the second introduction part d2 serves as a reaction chamber where the first and second processed fluids are reacted with each other. Specifically, as shown in FIG. 11(C) illustrating a bottom face of the second ring 20, a region H shown by oblique lines, outside the second opening m2 of the second introduction part in the radial direction r1 of the second ring 20, serves as the processing chamber, that is, the reaction chamber. Accordingly, this reaction chamber is located downstream from the openings m1 and m2 of the first introduction part d1 and the second introduction part d2 between the processing surfaces 1 and 2.

The first fluid introduced from the first opening m1 through a space inside the ring into the space between the processing surfaces 1 and 2, and the second fluid introduced from the second opening m2 into the space between the processing surfaces 1 and 2, are mixed with each other in the region H serving as the processing chamber, and if the mixing is accompanied by reaction, both the processed fluids are reacted with each other. The fluid will, upon receiving supply pressure from the fluid pressure imparting mechanism p1, move through the minute space between the processing surfaces 1 and 2 to the outside of the rings, but because of rotation of the first ring 10, the fluid mixed in the reaction region H does not move linearly from the inside to the outside of the rings in the radial direction, but moves from the inside to the outside of the ring spirally around the rotary shaft of the ring when the processing surfaces are viewed in a plane. In the region H where the fluids are thus mixed (reacted), the fluids can move spirally from inside to outside to secure a zone necessary for sufficient mixing (reaction) in the minute space between the processing surfaces 1 and 2, thereby promoting their uniform reaction.

The product formed by the mixing (reaction) becomes a uniform reaction product in the minute space between the first processing surface 1 and the second processing surface 2 and appears as microparticles particularly in the case of crystallization or separation.

By the balance among at least the supply pressure applied by the fluid pressure imparting mechanism p1, the bias of the surface-approaching pressure imparting mechanism 4, and the centrifugal force resulting from rotation of the ring, the distance between the processing surfaces 1 and 2 can be balanced to attain a preferable minute space, and further the processed fluid receiving the supply pressure applied by the fluid pressure imparting mechanism p1 and the centrifugal force by rotation of the ring moves spirally in the minute space between the processing surfaces 1 and 2, so that their mixing (reaction) is promoted.

The mixing (reaction) is forcedly effected by the supply pressure applied by the fluid pressure imparting mechanism p1 and the rotation of the ring. That is, the mixing (reaction) occurs under forced uniform mixing between the processing surfaces 1 and 2 arranged opposite to each other so as to be able to approach to and separate from each other, at least one of which rotates relative to the other.

Accordingly, the crystallization and separation of the product formed by the reaction can be regulated by relatively easily controllable methods such as regulation of supply pressure applied by the fluid pressure imparting mechanism p1 and regulation of the rotating speed of the ring, that is, the number of revolutions of the ring.

As described above, this processing apparatus is excellent in that the space between the processing surfaces 1 and 2, which can exert influence on the size of a product, and the distance in which the processed fluid moves in the reaction region H, which can exert influence on production of a uniform product, can be regulated by the supply pressure and the centrifugal force.

The reaction processing gives not only deposit of the product but also liquids. Also, when the product is a cluster of fine particles such as microparticles, the product may be precipitated in the processed fluid, or may be in a state of a dispersion in which a dispersal phase exists in the continuous phase, too.

The rotary shaft 50 is not limited to the vertically arranged one and may be arranged in the horizontal direction or arranged at a slant. This is because during processing, the reaction occurs in such a minute space between the processing surfaces 1 and 2 that the influence of gravity can be substantially eliminated.

In FIG. 1(A), the first introduction part d1 extends vertically and coincides with the shaft center of the second ring 20 in the second holder 21. However, the first introduction part d1 is not limited to the one having a center coinciding with the shaft center of the second ring 20 and may be arranged in other positions in the central portion 22 of the second holder 21 as long as the first fluid can be supplied into the space surrounded by the rings 10 and 20, and the first introduction part d1 may extend obliquely as well as vertically.

Figure 12:
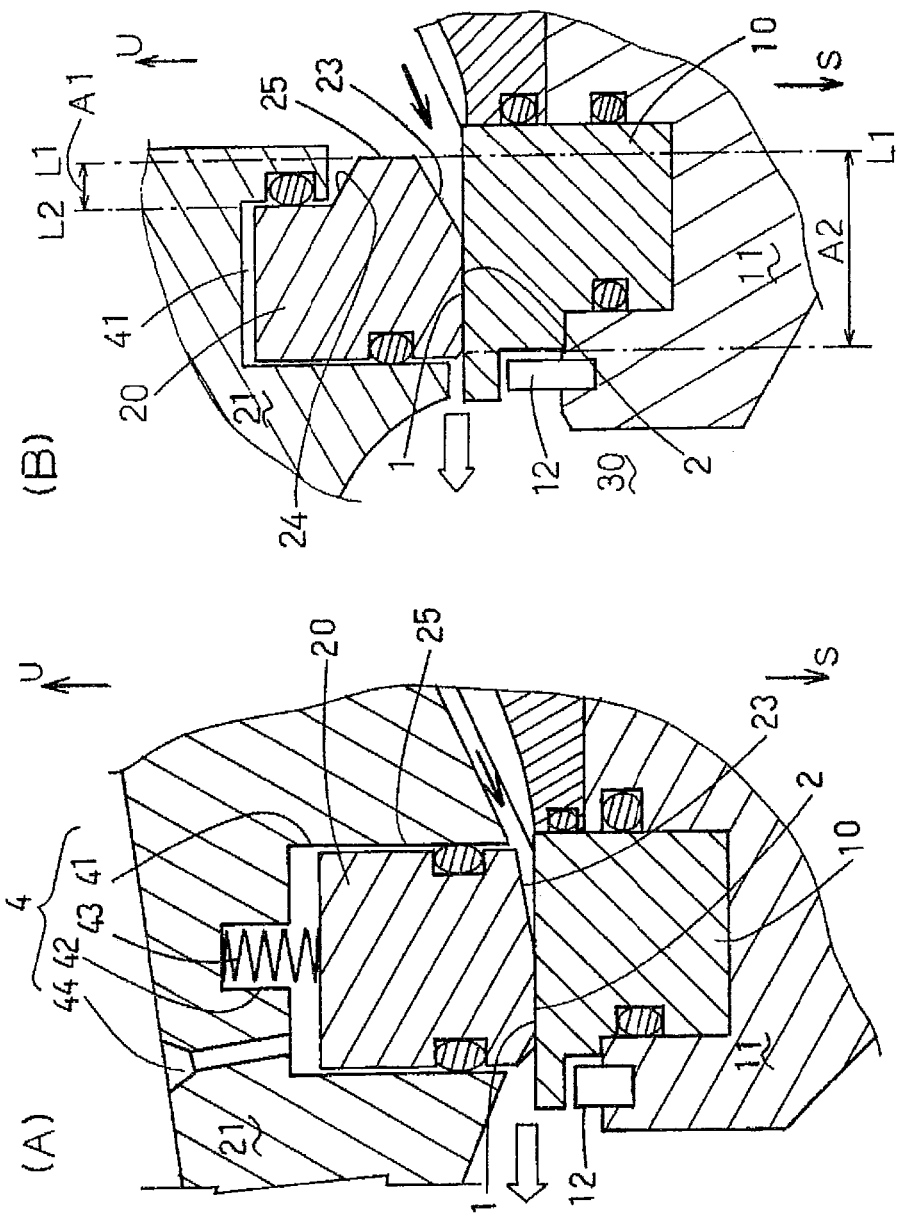
FIG. 12(A) is a schematic vertical sectional view showing an important part of another embodiment of a pressure-receiving surface in the apparatus shown in FIG. 1(A)
FIG. 12(B) is a schematic vertical sectional view showing an important part of still another embodiment of the apparatus.

A more preferable embodiment of the apparatus is shown in FIG. 12(A). As shown in this figure, the second processing member 20 has the second processing surface 2 and a pressure-receiving surface 23 which is positioned inside, and situated next to, the second processing surface 2. Hereinafter, the pressure-receiving surface 23 is also referred to as a separation-regulating surface 23. As shown in the figure, the separation-regulating surface 23 is an inclined surface.

As described above, the ring-accepting part 41 is formed in the bottom (i.e. a lower part) of the second holder 21, and the second processing member 20 is accepted in the ring-accepting part 41. The second processing member 20 is held by the second holder 21 so as not to be rotated with a baffle (not shown). The second processing surface 2 is exposed from the second holder 21.

In this embodiment, a material to be processed is introduced inside the first processing member 10 and the second processing member 20 between the processing surfaces 1 and 2, and the processed material is discharged to the outside of the first processing member 10 and the second processing member 20.

The surface-approaching pressure imparting mechanism 4 presses by pressure the second processing surface 2 against the first processing surface 1 to make them contacted with or close to each other, and generates a fluid film of predetermined thickness by the balance between the surface-approaching pressure and the force, e.g. fluid pressure, of separating the processing surfaces 1 and 2 from each other. In other words, the distance between the processing surfaces 1 and 2 is kept in a predetermined minute space by the balance between the forces.

Specifically, the surface-approaching pressure imparting mechanism 4 in this embodiment is comprised of the ring-accepting part 41, a spring-accepting part 42 arranged in the depth of the ring-accepting part 41, that is, in the deepest part of the ring-accepting part 41, a spring 43, and an air introduction part 44.

However, the surface-approaching pressure imparting mechanism 4 may be the one including at least one member selected from the ring-accepting part 41, the spring-accepting part 42, the spring 43, and the air introduction part 44.

The ring-accepting part 41 has the second processing member 20 fit into it with play to enable the second processing member 20 to be displaced vertically deeply or shallowly, that is, vertically in the ring-accepting part 41.

One end of the spring 43 is abutted against the depth of the spring-accepting part 42, and the other end of the spring 43 is abutted against the front (i.e., the upper part) of the second processing member 20 in the ring-accepting part 41. In FIG. 1, only one spring 43 is shown, but a plurality of springs 44 are preferably used to press various parts of the second processing member 20. This is because as the number of springs 43 increases, pressing pressure can be given more uniformly to the second processing member 20. Accordingly, several to a few dozen springs 43 comprising a multi-spring type preferably attach to the second holder 21.

In this embodiment, air can be introduced through the air introduction part 44 into the ring-accepting part 41. By such introduction of air, air pressure together with pressure by the spring 43 can be given as pressing pressure from the space, as a pressurizing chamber, between the ring-accepting part 41 and the second processing member 20 to the second processing member 20. Accordingly, adjusting the pressure of air introduced through the air introduction part 44 can regulate the surface-approaching pressure of the second processing surface 2 toward the first processing surface 1 during operation. A mechanism of generating pressing pressure with another fluid pressure such as oil pressure can be utilized in place of the air introduction part 44 utilizing air pressure.

The surface-approaching pressure imparting mechanism 4 not only supplies and regulates a part of the pressing pressure, that is, the surface-approaching pressure, but also serves as a displacement regulating mechanism and a buffer mechanism.

Specifically, the surface-approaching pressure imparting mechanism 4 as a displacement regulating mechanism can maintain initial pressing pressure by regulating air pressure against the change in the axial direction caused by elongation or abrasion at the start of or in the operation. As described above, the surface-approaching pressure imparting mechanism 4 uses a floating mechanism of maintaining the second processing member 20 so as to be displaced, thereby also functioning as a buffer mechanism for micro-vibration or rotation alignment.

Now, the state of the thus constituted processing apparatus during use is described with reference to FIG. 1(A).

At the outset, a first fluid to be processed is pressurized with the fluid pressure imparting mechanism p1 and introduced through the first introduction part d1 into the internal space of the sealed case. On the other hand, the first processing member 10 is rotated with the rotation of the rotary shaft 50 by the rotation drive member. The first processing surface 1 and the second processing surface 2 are thereby rotated relatively with a minute space kept therebetween.

The first processed fluid is formed into a fluid film between the processing surfaces 1 and 2 with a minute space kept therebetween, and a second fluid to be processed which is introduced through the second introduction part d2 flows into the fluid film between the processing surfaces 1 and 2 to comprise a part of the fluid film. By this, the first and second processed fluids are mixed with each other, and a uniform reaction of both of the fluids being reacted with each other is promoted to form a reaction product. When the reaction is accompanied by separation, relatively uniform and fine particles can be formed. Even when the reaction is not accompanied by separation, a uniform mixing (uniform reaction when the mixing is accompanied by reaction) can be realized. The separated product may be further finely pulverized by shearing between the first processing surface 1 and the second processing surface 2 with the rotation of the first processing surface 1. The first processing surface 1 and the second processing surface 2 are regulated to form a minute space of 1 μm to 1 mm, particularly 1 μm to 10 μm, thereby realizing a uniform mixing (uniform reaction when the mixing is accompanied by reaction) and enabling formation of superfine particles of several nm in diameter.

The product is discharged from the processing surfaces 1 and 2 through an outlet 32 of the case 3 to the outside of the case. The discharged product is atomized in a vacuum or depressurized atmosphere with a well-known decompression device and converted into liquid in the atmosphere to collide with each other, then what trickled down in the liquid is able to be collected as degassed liquid.

In this embodiment, the processing apparatus is provided with a case, but may be carried out without a case. For example, a decompression tank for degassing, that is, a vacuum tank, is arranged, and the processing apparatus may be arranged in this tank. In this case, the outlet mentioned above is naturally not arranged in the processing apparatus.

As described above, the first processing surface 1 and the second processing surface 2 can be regulated to form a minute space in the order of μm which cannot be formed by arranging mechanical clearance. Now, this mechanism is described.

The first processing surface 1 and the second processing surface 2 are capable of approaching to and separating from each other, and simultaneously rotate relative to each other. In this example, the first processing surface 1 rotates, and the second processing surface 2 approaches to and separates from the first processing surface with a structure capable of moving in the axial direction (floating structure).

In this example, therefore, the position of the second processing surface 2 in the axial direction is arranged accurately in the order of μm by the balance between forces, that is, the balance between the surface-approaching pressure and the separating pressure, thereby establishing a minute space between the processing surfaces 1 and 2.

As shown in FIG. 12(A), the surface-approaching pressure includes the pressure by air pressure (positive pressure) from the air introduction part 44 by the surface-approaching pressure imparting mechanism 4, the pressing pressure with the spring 43, and the like.

The embodiments shown in FIG. 12 to FIG. 15 and FIG. 17 are shown by omitting the second introduction part d2 to simplify the drawings. In this respect, these drawings may be assumed to show sections at a position not provided with the second introduction part d2. In the figures, U and S show upward and downward directions respectively.

On the other hand, the separating force include the fluid pressure acting on the pressure-receiving surface at the separating side, that is, on the second processing surface 2 and the separation regulating surface 23, the centrifugal force resulting from rotation of the first processing member 10, and the negative pressure when negative pressure is applied to the air introduction part 44.

When the apparatus is washed, the negative pressure applied to the air introduction part 44 can be increased to significantly separate the processing surfaces 1 and 2 from each other, thereby facilitating washing.

By the balance among these forces, the second processing surface 2 while being remote by a predetermined minute space from the first processing surface 1 is stabilized, thereby realizing establishment with accuracy in the order of µm.

The separating force is described in more detail.

With respect to fluid pressure, the second processing member 20 in a closed flow path receives feeding pressure of a processed fluid, that is, fluid pressure, from the fluid pressure imparting mechanism p. In this case, the surfaces opposite to the first processing surface in the flow path, that is, the second processing surface 2 and the separation regulating surface 23, act as pressure-receiving surfaces at the separating side, and the fluid pressure is applied to the pressure-receiving surfaces to generate a separating force due to the fluid pressure.

With respect to centrifugal force, the first processing member 10 is rotated at high speed, centrifugal force is applied to the fluid, and a part of this centrifugal force acts as separating force in the direction in which the processing surfaces 1 and 2 are separated from each other.

When negative pressure is applied from the air introduction part 44 to the second processing member 20, the negative pressure acts as separating force.

In the foregoing description of the present invention, the force of separating the first and second processing surfaces 1 and 2 from each other has been described as a separating force, and the above-mentioned force is not excluded from the separating force.

By forming a balanced state of the separating force and the surface-approaching pressure applied by the surface-approaching pressure imparting mechanism 4 via the processed fluid between the processing surfaces 1 and 2 in the flow path of the closed processed fluid, a uniform reaction is realized between the processing surfaces 1 and 2, and simultaneously a fluid film suitable for crystallization and separation of microscopic reaction products is formed as described above. In this manner, this apparatus can form a forced fluid film between the processing surfaces 1 and 2 via which a minute space not achievable with a conventional mechanical apparatus can be kept between the processing surfaces 1 and 2, and microparticles can be formed highly accurately as the reaction product.

In other words, the thickness of the fluid film between the processing surfaces 1 and 2 is regulated as desired by regulating the separating force and surface-approaching pressure, thereby realizing a necessary uniform mixing (when the mixing is accompanied by reaction, uniform reaction) to form and process microscopic products. Accordingly, when the thickness of the fluid film is to be decreased, the surface-approaching pressure or separating force may be regulated such that the surface-approaching pressure is made relatively higher than the separating force. When the thickness of the fluid film is to be increased, the separating force or surface-approaching pressure may be regulated such that the separating force is made relatively higher than the surface-approaching pressure.

When the surface-approaching pressure is increased, air pressure, that is, positive pressure is applied from the air introduction part 44 by the surface-approaching pressure imparting mechanism 4, or the spring 43 is changed to the one having higher pressing pressure, or the number of springs may be increased.

When the separating force is to be increased, the feeding pressure of the fluid pressure imparting mechanism p1 is increased, or the area of the second processing surface 2 or the separation regulating surface 23 is increased, or in addition, the rotation of the second processing member 20 is regulated to increase centrifugal force or reduce pressure from the air introduction part 44. Alternatively, negative pressure may be applied. The spring 43 shown is a pressing spring that generates pressing pressure in an extending direction, but may be a pulling spring that generates a force in a compressing direction to constitute a part or the whole of the surface-approaching pressure imparting mechanism 4.

When the separating force is to be decreased, the feeding pressure of the fluid pressure imparting mechanism p1 is reduced, or the area of the second processing surface 2 or the separation regulating surface 23 is reduced, or in addition, the rotation of the second processing member 20 is regulated to decrease centrifugal force or increase pressure from the air introduction part 44. Alternatively, negative pressure may be reduced.

Further, properties of a processed fluid, such as viscosity, can be added as a factor for increasing or decreasing the surface-approaching pressure and separating force, and regulation of such properties of a processed fluid can be performed as regulation of the above factor.

In the separating force, the fluid pressure exerted on the pressure-receiving surface at the separating side, that is, the second processing surface 2 and the separation regulating surface 23 is understood as a force constituting an opening force in mechanical seal.

In the mechanical seal, the second processing member 20 corresponds to a compression ring, and when fluid pressure is applied to the second processing member 20, the force of separating the second processing member 20 from the first processing member 10 is regarded as opening force.

More specifically, when the pressure-receiving surfaces at a separating side, that is, the second processing surface 2 and the separation regulating surface 23 only are arranged in the second processing member 20 as shown in the first embodiment, all feeding pressure constitutes the opening force. When a pressure-receiving surface is also arranged at the backside of the second processing member 20, specifically in the case of FIG. 12(B) and FIG. 17 described later, the difference between the feeding pressure acting as a separating force and the feeding pressure acting as surface-approaching pressure is the opening force.

Now, other embodiments of the second processing member 20 are described with reference to FIG. 12(B).

As shown in FIG. 12(B), an approach regulating surface 24 facing upward, that is, at the other side of the second processing surface 2, is disposed at the inner periphery of the second processing member 20 exposed from the ring-accepting part 41.

That is, the surface-approaching pressure imparting mechanism 4 in this embodiment is comprised of a ring-accepting part 41, an air introduction part 44, and the approach regulating surface 24. However, the surface-approaching pressure imparting mechanism 4 may be one including at least one member selected from the ring-accepting part 41, the spring-accepting part 42, the spring 43, the air introduction part 44, and the approach regulating surface 24.

The approach regulating surface 24 receives predetermined pressure applied to a processed fluid to generate a force of approaching the second processing surface 2 to the first processing surface 1, thereby functioning in feeding surface-approaching pressure as a part of the surface-approaching pressure imparting mechanism 4. On the other hand, the second processing surface 2 and the separation regulating surface 23 receive predetermined pressure applied to a processed fluid to generate a force of separating the second processing surface 2 from the first processing surface 1, thereby functioning in feeding a part of the separating force.

The approach regulating surface 24, the second processing surface 2 and the separation regulating surface 23 are pressure-receiving surfaces receiving feeding pressure of the processed fluid, and depending on its direction, exhibits different actions, that is, generation of the surface-approaching pressure and generation of a separating force.

The ratio (area ratio A1/A2) of a projected area A1 of the approach regulating surface 24 projected on a virtual plane perpendicular to the direction of approaching and separating the processing surfaces, that is, in the direction of rising and setting of the second ring 20, to a total area A2 of the projected area of the second processing surface 2 and the separating side pressure-receiving area 23 of the second processing member 20 projected on the virtual plane is called balance ratio K which is important for regulation of the opening force.

Both the top of the approach regulating surface 24 and the top of the separating side pressure-receiving surface 23 are defined by the inner periphery 25 of the circular second regulating part 20, that is, by top line L1. Accordingly, the balance ratio is regulated for deciding the place where base line L2 of the approach regulating surface 24 is to be placed.

That is, in this embodiment, when the feeding pressure of the processed fluid is utilized as opening force, the total projected area of the second processing surface 2 and the separation regulating surface 23 is made larger than the projected area of the approach regulating surface 24, thereby generating an opening force in accordance with the area ratio.

The opening force can be regulated by the pressure of the processed fluid, that is, the fluid pressure, by changing the balance line, that is, by changing the area A1 of the approach regulating surface 24.

Sliding surface actual surface pressure P, that is, the fluid pressure out of the surface-approaching pressure, is calculated according to the following equation:

$$P = P1 \times (K-k) + Ps$$

wherein P1 represents the pressure of a processed fluid, that is, fluid pressure; K represents the balance ratio; k represents an opening force coefficient; and Ps represents a spring and back pressure.

By regulating this balance line to regulate the sliding surface actual surface pressure P, the space between the processing surfaces 1 and 2 is formed as a desired minute space, thereby forming a fluid film of a processed fluid to make the product minute and effecting uniform mixing (reaction) processing.

Usually, as the thickness of a fluid film between the processing surfaces 1 and 2 is decreased, the product can be made finer. On the other hand, as the thickness of the fluid film is increased, processing becomes rough and the throughput per unit time is increased. By regulating the sliding surface actual surface pressure P on the sliding surface, the space between the processing surfaces 1 and 2 can be regulated to realize the desired uniform mixing (when the mixing is accompanied by reaction, uniform reaction) and to give the minute product. Hereinafter, the sliding surface actual surface pressure P is referred to as surface pressure P.

From this relation, it is concluded that when the product is to be made coarse, the balance ratio may be decreased, the surface pressure P may be decreased, the space may be increased and the thickness of the film may be increased. On the other hand, when the product is to be made finer, the balance ratio may be increased, the surface pressure P may be increased, the space may be decreased and the thickness of the film may be decreased.

As a part of the surface-approaching pressure imparting mechanism 4, the approach regulating surface 24 is formed, and at the position of the balance line, the surface-approaching pressure may be regulated, that is, the space between the processing surfaces may be regulated.

As described above, the space is regulated in consideration of the pressing pressure of the spring 43 and the air pressure of the air introduction part 44. Regulation of the fluid pressure, that is, the feeding pressure of the processed fluid, and regulation of the rotation of the first processing member 10 for regulating centrifugal force, that is, the rotation of the first holder 11, are also important factors to regulate the space.

As described above, this apparatus is constituted such that for the second processing member 20 and the first processing member 10 that rotates relative to the second processing member 20, a predetermined fluid film is formed between the processing surfaces by pressure balance among the feeding pressure of the processed fluid, the rotation centrifugal force, and the surface-approaching pressure. At least one of the rings is formed in a floating structure by which alignment such as run-out is absorbed to eliminate the risk of abrasion and the like.

The embodiment shown in FIG. 1(A) also applies to the embodiment in FIG. 12(B) except that the regulating surface is arranged.

Figure 17:
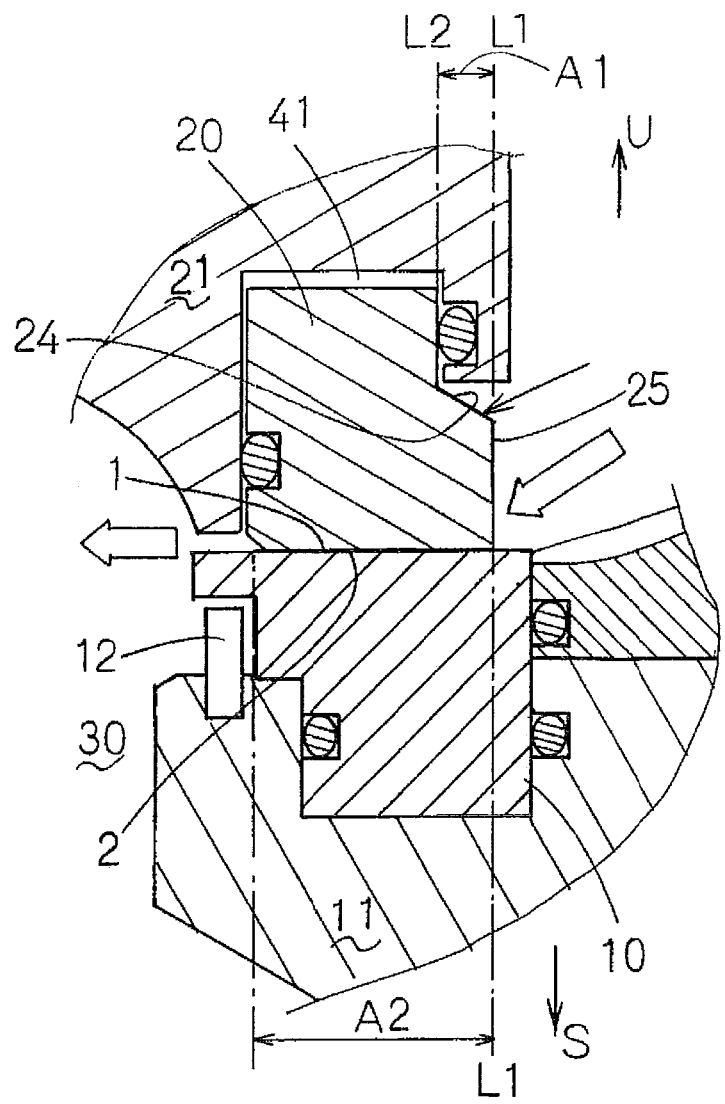
FIG. 17 is a schematic vertical sectional view showing an important part of still another embodiment of the apparatus shown in FIG. 12(A).

The embodiment shown in FIG. 12(B) can be carried out without arranging the pressure-receiving surface 23 on the separating side, as shown in FIG. 17.

When the approach regulating surface 24 is arranged as shown in the embodiment shown in FIG. 12(B) and FIG. 17, the area A1 of the approach regulating surface 24 is made larger than the area A2, whereby all of the predetermined pressure exerted on the processed fluid functions as surface-approaching pressure, without generating an opening force. This arrangement is also possible, and in this case, both the processing surfaces 1 and 2 can be balanced by increasing other separating force.

With the area ratio described above, the force acting in the direction of separating the second processing surface 2 from the first processing surface 1 is fixed as the resultant force exerted by the fluid.

Figure 13:
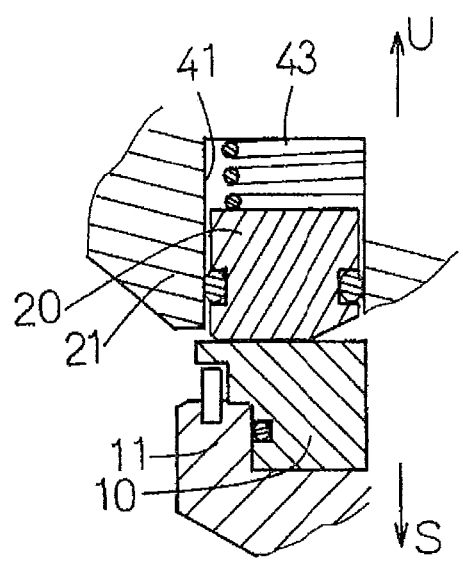
FIG. 13 is a schematic vertical sectional view showing an important part of another embodiment of a surface-approaching pressure imparting mechanism 4 in the apparatus shown in FIG. 12(A).

In this embodiment, as described above, the number of springs 43 is preferably larger in order to impart uniform stress on the sliding surface, that is, the processing surface. However, the spring 43 may be a single coil-type spring as shown in FIG. 13. As shown in the figure, this spring is a single coil spring having a center concentric with the circular second processing member 20.

The space between the second processing member 20 and the second holder 21 is sealed air-tightly with methods well known in the art.

Figure 14:
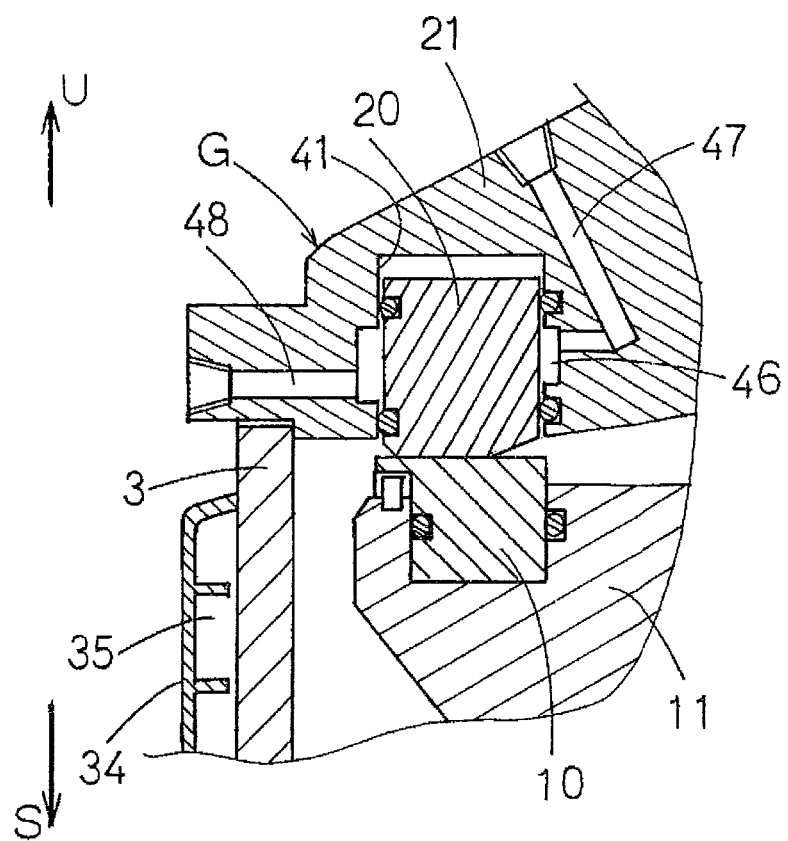
FIG. 14 is a schematic vertical sectional view showing an important part of another embodiment of the apparatus shown in FIG. 12(A), which is provided with a temperature regulating jacket.

As shown in FIG. 14, the second holder 21 is provided with a temperature regulation jacket 46 capable of regulating the temperature of the second processing member 20 by cooling or heating. Numerical 3 in FIG. 14 is the above-mentioned case, and the case 3 is also provided with a jacket 35 for the same purpose of temperature regulation.

The temperature regulation jacket 46 for the second holder 21 is a water-circulating space formed at a side of the ring-accepting part 41 and communicates with paths 47 and 48 leading to the outside of the second holder 21. One of the paths 47 and 48 introduces a cooling or heating medium into the temperature regulation jacket 46, and the other discharges the medium.

The temperature regulation jacket 35 for the case 3 is a path for passing heating water or cooling water, which is arranged between the outer periphery of the case 3 and a covering part 34 for covering the outer periphery of the case 3.

In this embodiment, the second holder 21 and the case 3 are provided with the temperature regulation jacket, but the first holder 11 can also be provided with such a jacket.

Figure 15:
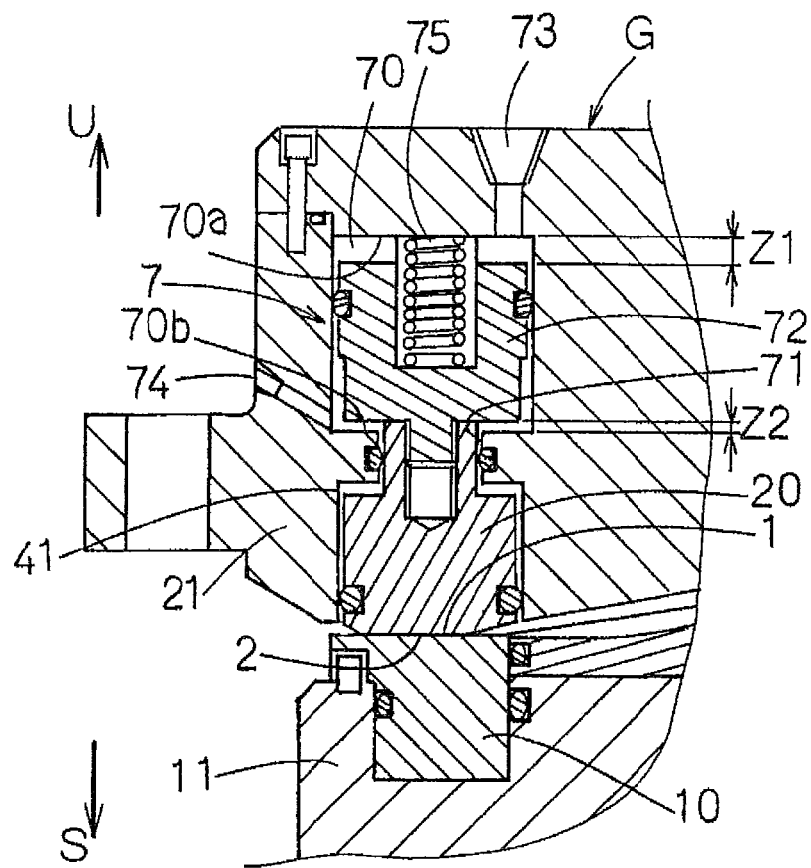
FIG. 15 is a schematic vertical sectional view showing an important part of still another embodiment of the surface-approaching pressure imparting mechanism 4 in the apparatus shown in FIG. 12(A).

As a part of the surface-approaching pressure imparting mechanism 4, a cylinder mechanism 7 shown in FIG. 15 may be arranged besides the members described above.

The cylinder mechanism 7 includes a cylinder space 70 arranged in the second holder 21, a communicating part 71 that communicates the cylinder space 70 with the ring-accepting part 41, a piston 72 that is accepted in the cylinder space 70 and connected via the communication part 71 to the second processing member 20, a first nozzle 73 that communicates to the upper part of the cylinder space 70, a second nozzle 74 in a lower part of the cylinder space 70, and a pressing body 75 such as spring between the upper part of the cylinder space 70 and the piston 72.

The piston 72 can slide vertically in the cylinder space 70, and the second processing member 20 can slide vertically with sliding of the piston 72, to change the gap between the first processing surface 1 and the second processing surface 2.

Although not shown in the figure, specifically, a pressure source such as a compressor is connected to the first nozzle 73, and air pressure, that is, positive pressure is applied from the first nozzle 73 to the upper part of the piston 72 in the cylinder space 70, thereby sliding the piston 72 downward, to allow the second processing member 20 to narrow the gap between the first and second processing surfaces 1 and 2. Although not shown in the figure, a pressure source such as a compressor is connected to the second nozzle 74, and air pressure, that is, positive pressure is applied from the second nozzle 74 to the lower part of the piston 72 in the cylinder space 70, thereby sliding the piston 72 upward, to allow the second processing member 20 to widen the gap between the first and second processing surfaces 1 and 2, that is, to enable it to move in the direction of opening the gap. In this manner, the surface-approaching pressure can be regulated by air pressure with the nozzles 73 and 74.

Even if there is a space between the upper part of the second processing member 20 in the ring-accepting part 41 and the uppermost part of the ring-accepting part 41, the piston 7 is arranged so as to abut against the uppermost part 70a of the cylinder space 70, whereby the uppermost part 70a of the cylinder space 70 defines the upper limit of the width of the gap between the processing surfaces 1 and 2. That is, the piston 7 and the uppermost part 70a of the cylinder space 70 function as a separation preventing part for preventing the separation of the processing surfaces 1 and 2 from each other, in other words, function in regulating the maximum opening of the gap between both the processing surfaces 1 and 2.

Even if the processing surfaces 1 and 2 do not abut on each other, the piston 7 is arranged so as to abut against a lowermost part 70b of the cylinder space 70, whereby the lowermost part 70b of the cylinder space 70 defines the lower limit of the width of the gap between the processing surfaces 1 and 2. That is, the piston 7 and the lowermost part 70b of the cylinder space 70 function as an approach preventing part for preventing the approaching of the processing surfaces 1 and 2 each other, in other words, function in regulating the minimum opening of the gap between both the processing surfaces 1 and 2.

In this manner, the maximum and minimum openings of the gap are regulated, while a distance z1 between the piston 7 and the uppermost part 70a of the cylinder space 70, in other words, a distance z2 between the piston 7 and the lowermost part 70b of the cylinder space 70, is regulated with air pressure by the nozzles 73 and 74.

The nozzles 73 and 74 may be connected to a different pressure source respectively, and further may be connected to a single pressure source alternatively or switched the connections to the sources.

The pressure source may be a source applying positive or negative pressure. When a negative pressure source such as a vacuum is connected to the nozzles 73 and 74, the action described above goes to the contrary.

In place of the other surface-approaching pressure imparting mechanism 4 or as a part of the surface-approaching pressure imparting mechanism 4, such cylinder mechanism 7 is provided to set the pressure of the pressure source connected to the nozzle 73 and 74, and the distances z1 and z2 according to the viscosity and properties of the fluid to be processed in a fashion to bring the thickness value of fluid film of the fluid to a desired level under a shear force to realize a uniform reaction for forming fine particles. Particularly, such cylinder mechanism 7 can be used to increase the reliability of cleaning and sterilization by forcing the sliding part open and close during cleaning and steam sterilization.

As shown in FIG. 16(A) to FIG. 16(C), the first processing surface 1 of the first processing member 10 may be provided with groove-like depressions 13 . . . 13 extending in the radial direction, that is, in the direction from the center to the outside of the first processing member 10. In this case, as shown in FIG. 16(A), the depressions 13 . . . 13 can be curved or spirally elongated on the first processing surface 1, and as shown in FIG. 16(B), the individual depressions 13 may be bent at a right angle, or as shown in FIG. 16(C), the depressions 13 . . . 13 may extend straight radially.

As shown in FIG. 16(D), the depressions 13 in FIG. 16(A) to FIG. 16(C) preferably deepen gradually in the direction toward the center of the first processing surface 1. The groove-like depressions 13 may continue in sequence or intermittence.

Formation of such depression 13 may correspond to the increase of delivery of the processed fluid or to the decrease of calorific value, while having effects of cavitation control and fluid bearing.

Figure 16:
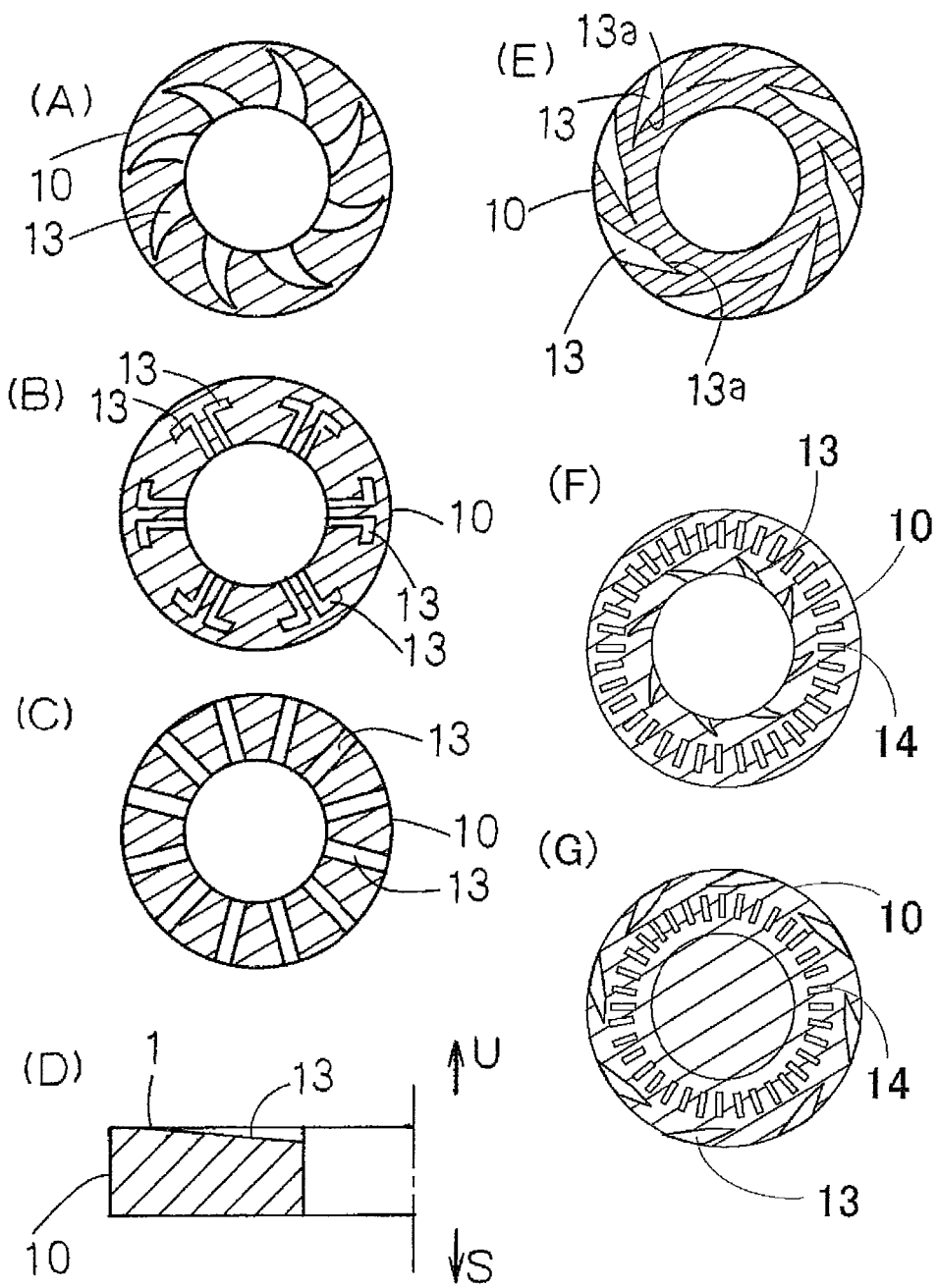
FIG. 16(A) is a schematic transverse sectional view showing an important part of still another embodiment of the apparatus shown in FIG. 12(A), FIG. 16(B), FIG. 16(C) and FIG. 16(E) to FIG. 16(G) are schematic transverse sectional views each showing an important part of still another embodiment of the apparatus.
FIG. 16(D) is a partially cut schematic vertical sectional view showing an important part of still another embodiment of the apparatus.

In the embodiments shown in FIG. 16, the depressions 13 are formed on the first processing surface 1, but may be formed on the second processing surface 2 or may be formed on both the first and second processing surfaces 1 and 2.

When the depressions 13 or tapered sections are not provided on the processing surface or are arranged unevenly on a part of the processing surface, the influence exerted by the surface roughness of the processing surfaces 1 and 2 on the processed fluid is greater than that by the above depressions 13. Accordingly, in this case, the surface roughness should be reduced, that is, the surface should be fine-textured, as the particle size of the processed fluid are to be decreased. Particularly, regarding the surface roughness of the processing surface, the mirror surface, that is, a surface subjected to mirror polishing is advantageous in realizing uniform mixing (when the mixing is accompanied by reaction, uniform reaction) for the purpose of uniform mixing (reaction), and in realizing crystallization and separation of fine monodisperse products for the purpose of obtaining microparticles.

In the embodiments shown in FIG. 12 to FIG. 17, structures other than those particularly shown are the same as in the embodiments shown in FIG. 1(A) or FIG. 11(C).

In the embodiments described above, the case is closed. Alternatively, the first processing member 10 and the second processing member 20 may be closed inside but may be open outside. That is, the flow path is sealed until the processed fluid has passed through the space between the first processing surface 1 and the second processing surface 2, to allow the processed fluid to receive the feeding pressure, but after the passing, the flow path may be opened so that the processed fluid after processing does not receive feeding pressure.

The fluid pressure imparting mechanism p1 preferably uses a compressor as a pressure device described above, but if predetermined pressure can always be applied to the processed fluid, another means may be used. For example, the own weight of the processed fluid can be used to apply certain pressure constantly to the processed fluid.

In summary, the processing apparatus in each embodiment described above is characterized in that predetermined pressure is applied to a fluid to be processed, at least two processing surfaces, that is, a first processing surface 1 and a second processing surface 2 capable of approaching to and separating from each other are connected to a sealed flow path through which the processed fluid receiving the predetermined pressure flows, a surface-approaching pressure of approaching the processing surfaces 1 and 2 each other is applied to rotate the first processing surface 1 and the second processing surface 2 relative to each other, thereby allowing a fluid film used for seal in mechanical seal to be generated out of the processed fluid, and the fluid film is leaked out consciously (without using the fluid film as seal) from between the first processing surface 1 and the second processing surface 2, contrary to mechanical seal, whereby mixing (reaction) processing is realized between the processed fluid formed into a film between the surfaces 1 and 2, and the product is recovered.

By this epoch-making method, the space between the processing surfaces 1 and 2 can be regulated in the range of 1 μm to 1 mm, particularly 1 μm to 10 μm.

In the embodiment described above, a flow path for a sealed fluid is constituted in the apparatus, and the processed fluid is pressurized with the fluid pressure imparting mechanism p arranged at the side of the introduction part (for the first processing fluid) in the processing apparatus.

Alternatively, the flow path for the processed fluid may be opened without pressurization with the fluid pressure imparting mechanism p.

Figure 18:
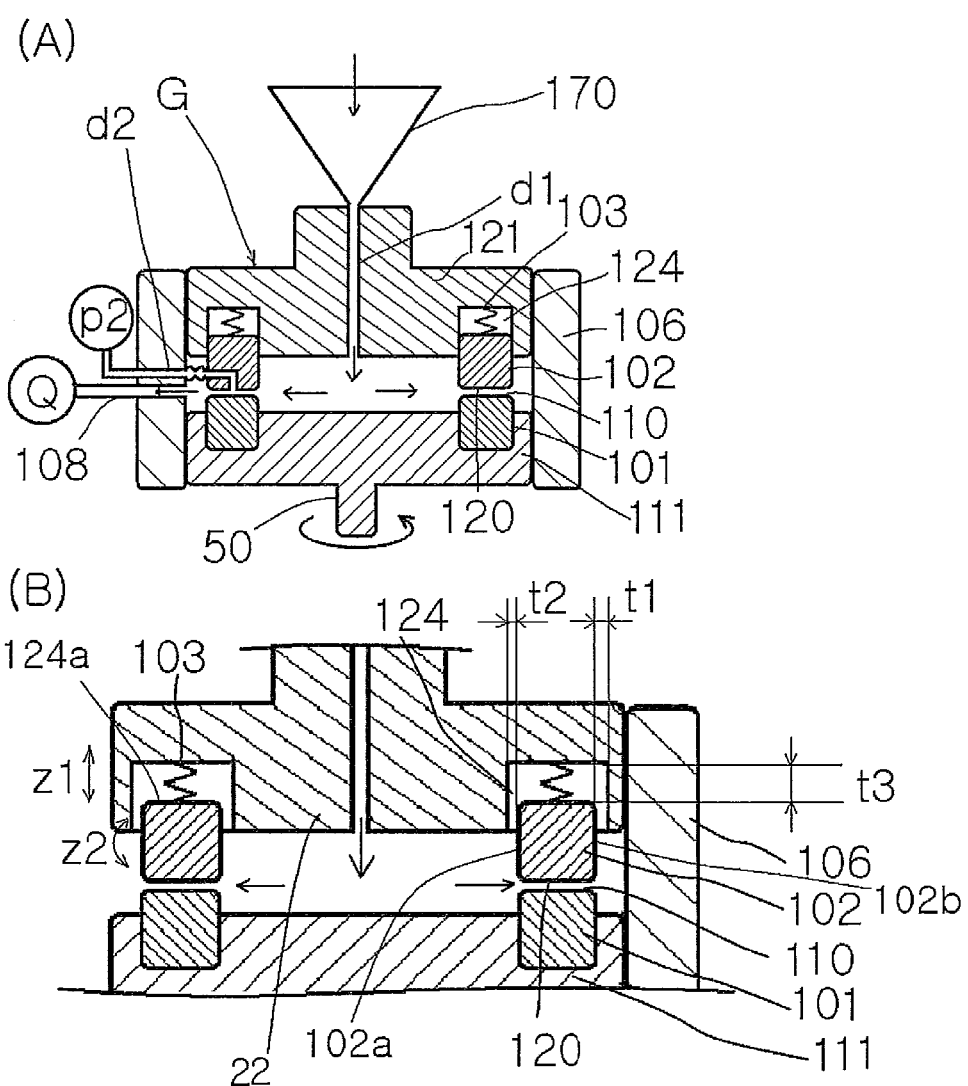
FIG. 18(A) is a schematic vertical sectional view showing the concept of still another embodiment of the apparatus used for carrying out the present invention.
FIG. 18(B) is a partially cut explanatory view showing an important part of the apparatus.
Figure 19:
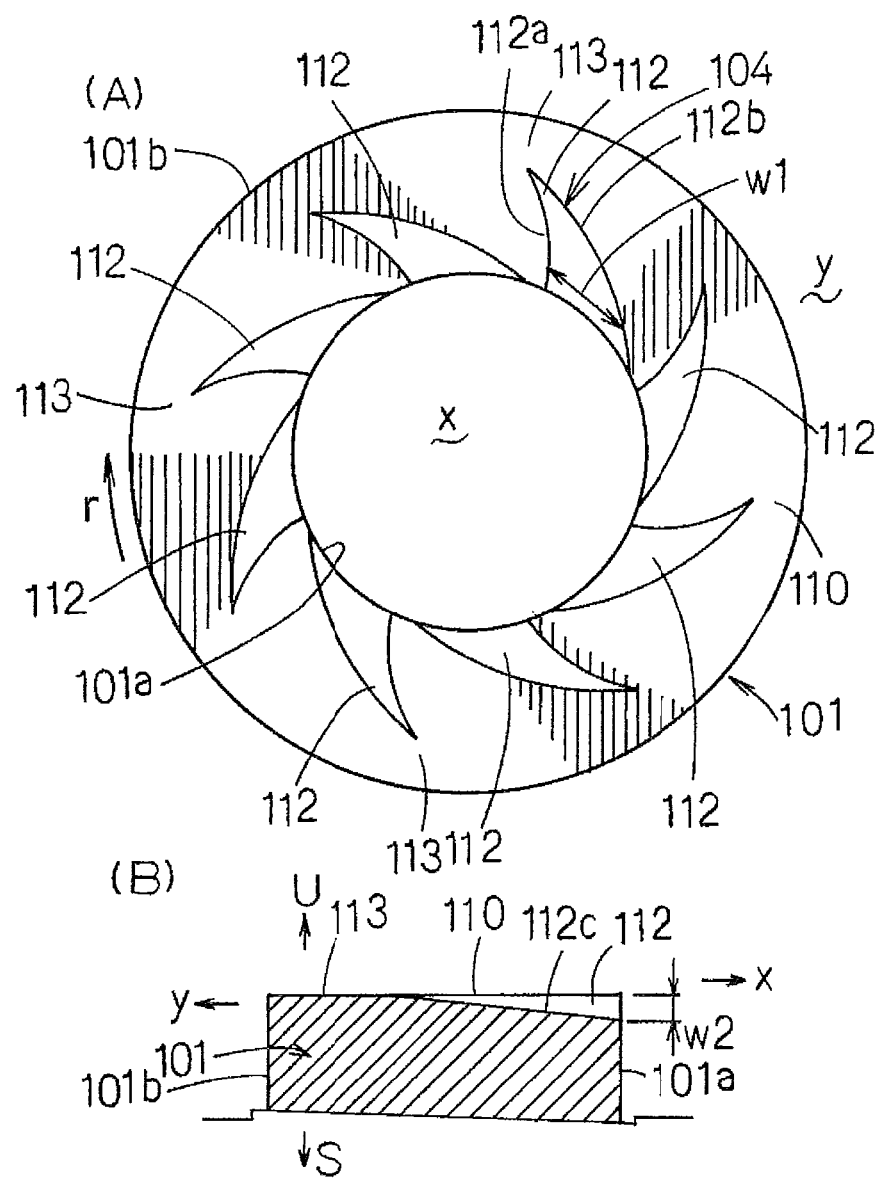
FIG. 19(A) is a plane view of a first processing member 1 in the apparatus shown in FIG. 12(A)
FIG. 19(B) is a schematic vertical sectional view showing an important part thereof.
Figure 20:
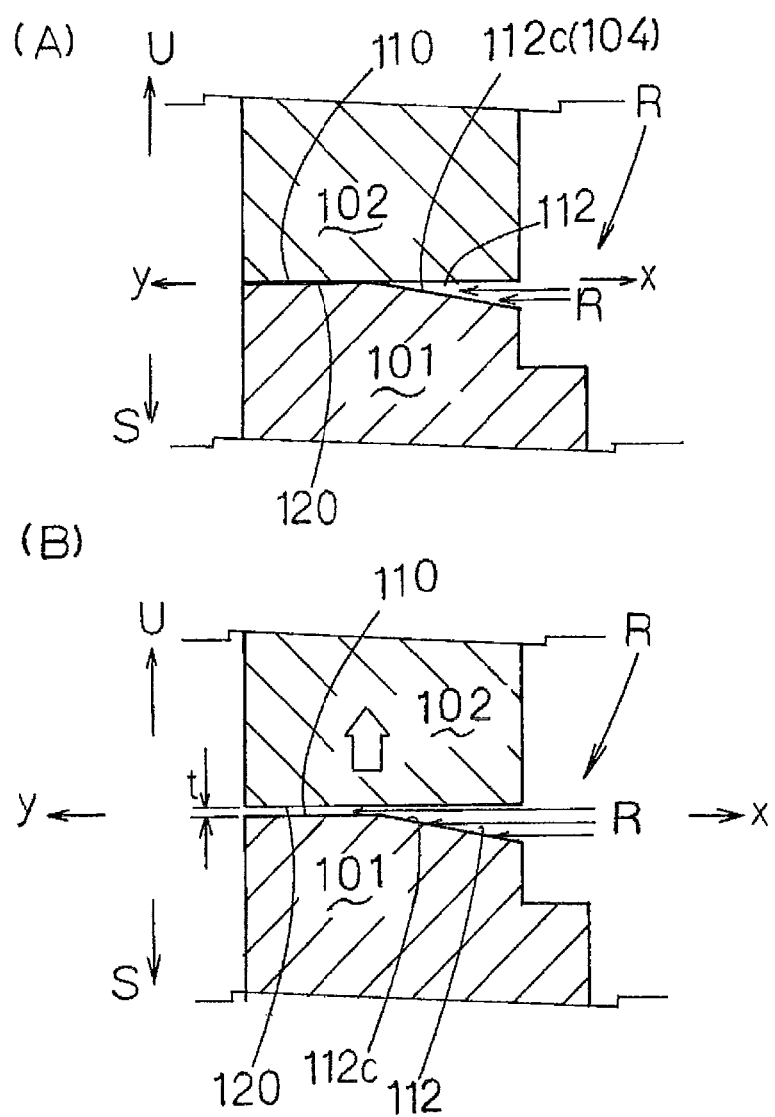
FIG. 20(A) is a schematic vertical sectional view showing an important part of first and second processing members 1 and 2 in the apparatus shown in FIG. 12(A)
FIG. 20(B) is a schematic vertical sectional view showing an important part of the first and second processing members 1 and 2 with a minute gap.

One embodiment of the processing apparatus is shown in FIG. 18 to FIG. 20. The processing apparatus illustrated in this embodiment is an apparatus including a degassing mechanism, that is, a mechanism of removing a liquid from the formed processed product thereby finally securing objective solids (crystals) only.

FIG. 18(A) is a schematic vertical sectional view of the processing apparatus, and FIG. 18(B) is its partially cut enlarged sectional view. FIG. 19 is a plane view of the first processing member 1 arranged in the processing apparatus in FIG. 18. FIG. 20 is a partially cut schematic vertical sectional view showing an important part of the first and second processing members 101 and 102 in the processing apparatus.

As described above, the apparatus shown in FIG. 18 to FIG. 20 is the one into which a fluid as the object of processing, that is, a processed fluid, or a fluid carrying the object of processing, is to be introduced at atmospheric pressure.

In FIG. 18(B) and FIG. 20, the second introduction part d2 is omitted for simplicity of the drawing (these drawings can be regarded as showing a section at the position where the second introduction part d2 is not arranged).

As shown in FIG. 18(A), this processing apparatus includes a reaction apparatus G and a decompression pump Q. This reaction apparatus G includes a first processing member 101 as a rotating member, a first holder 111 for holding the processing member 101, a second processing member 102 that is a member fixed to the case, a second holder 121 having the second processing member 102 fixed thereto, a bias mechanism 103, a dynamical pressure generating mechanism 104 (FIG. 19(A)), a drive part which rotates the first processing member 101 with the first holder 111, a housing 106, a first introduction part d1 which supplies (introduces) a first processed fluid, and a discharge part 108 that discharges the fluid to the decompression pump Q. The drive part is not shown.

The first processing member 101 and the second processing member 102 are cylindrical bodies that are hollow in the center. The processing members 101 and 102 are members wherein the bottoms of the processing members 101 and 102 in a cylindrical form are processing surfaces 110 and 120 respectively.

The processing surfaces 110 and 120 have a mirror-polished flat part. In this embodiment, the processing surface 120 of the second processing member 102 is a flat surface subjected as a whole to mirror polishing. The processing surface 110 of the first processing member 101 is a flat surface as a whole like the second processing member 102, but has a plurality of grooves 112 . . . 112 in the flat surface as shown in FIG. 19(A). The grooves 112 . . . 112 while centering on the first processing member 101 in a cylindrical form extend radially toward the outer periphery of the cylinder.

The processing surfaces 110 and 120 of the first and second processing members 101 and 102 are mirror-polished such that the surface roughness Ra comes to be in the range of 0.01 μm to 1.0 μm. By this mirror polishing, Ra is regulated preferably in the range of 0.03 μm to 0.3 μm.

The material for the processing members 101 and 102 is one which is rigid and capable of mirror polishing. The rigidity of the processing members 101 and 102 is preferably at least 1500 or more in terms of Vickers hardness. A material having a low linear expansion coefficient or high thermal conductance is preferably used. This is because when the difference in coefficient of expansion between a part which generates heat upon processing and other parts is high, distortion is generated and securement of suitable clearance is influenced.

As the material for the processing members 101 and 102, it is preferable to use particularly SIC, that is, silicon carbide, SIC having a Vickers hardness of 2000 to 2500, SIC having a Vickers hardness of 3000 to 4000 coated thereon with DLC (diamond-like carbon), WC, that is, tungsten carbide having a Vickers hardness of 1800, WC coated thereon with DLC, and boron ceramics represented by $ZrB_2$, BTC and $B_4C$ having a Vickers hardness of 4000 to 5000.

The housing 106 shown in FIG. 18, the bottom of which is not shown though, is a cylinder with a bottom, and the upper part thereof is covered with the second holder 121. The second holder 121 has the second processing member 102 fixed to the lower surface thereof, and the introduction part d1 is arranged in the upper part thereof. The introduction part d1 is provided with a hopper 170 for introducing a fluid or a processed material from the outside.

Although not shown in the figure, the drive part includes a power source such as a motor and a shaft 50 that rotates by receiving power from the power source.

As shown in FIG. 18(A), the shaft 50 is arranged in the housing 106 and extends vertically. Then, the first holder 111 is arranged on the top of the shaft 50. The first holder 111 is to hold the first processing member 101 and is arranged on the shaft 50 as described above, thereby allowing the processing surface 110 of the first processing member 101 to correspond to the processing surface 120 of the second processing member 102.

The first holder 111 is a cylindrical body, and the first processing member 101 is fixed on the center of the upper surface. The first processing member 101 is fixed so as to be integrated with the first holder 111, and does not change its position relative to the first holder 111.

On the other hand, a receiving depression 124 for receiving the second processing member 102 is formed on the center of the upper surface of the second holder 121.

The receiving depression 124 has a circular cross-section. The second processing member 102 is accepted in the cylindrical receiving depression 124 so as to be concentric with the receiving depression 124.

The structure of the receiving depression 124 is similar to that in the embodiment as shown in FIG. 1(A) (the first processing member 101 corresponds to the first ring 10, the first holder 111 to the first holder 11, the second processing member 102 to the second ring 20, and the second holder 121 to the second holder 21).

Then, the second holder 121 is provided with the bias mechanism 103. The bias mechanism 103 preferably uses an elastic body such as spring. The bias mechanism 103 corresponds to the surface-approaching pressure imparting mechanism 4 in FIG. 1(A) and has the same structure. That is, the bias mechanism 103 presses that side (bottom) of the second processing member 102 which is opposite to the processing surface 120 and biases each position of the second processing member 102 uniformly downward to the first processing member 101.

On the other hand, the inner diameter of the receiving depression 124 is made larger than the outer diameter of the second processing member 102, so that when arranged concentrically as described above, a gap t1 is arranged between outer periphery 102b of the second processing member 102 and inner periphery of the receiving depression 124, as shown in FIG. 18(B).

Similarly, a gap t2 is arranged between inner periphery 102a of the second processing member 102 and outer periphery of the central part 22 of the receiving depression 124, as shown in FIG. 18(B).

The gaps t1 and t2 are those for absorbing vibration and eccentric behavior and are set to be in a size to secure operational dimensions or more and to enable sealing. For example, when the diameter of the first processing member 101 is 100 mm to 400 mm, the gaps t1 and t2 are preferably 0.05 mm to 0.3 mm, respectively.

The first holder 111 is fixed integrally with the shaft 50 and rotated with the shaft 50. The second processing member 102 is not rotated relative to the second holder 121 by a baffle (not shown). However, for securing 0.1 μm to 10 μm clearance necessary for processing, that is, the minute gap t between the processing surfaces 110 and 120 as shown in FIG. 20(B), a gap t3 is arranged between the bottom of the receiving depression 124, that is, the top part, and the surface facing a top part 124a of the second processing member 102, that is, the upper part. The gap t3 is established in consideration of the clearance and the vibration and elongation of the shaft 50.

As described above, by the provision of the gaps t1 to t3, the first processing member 101 can move not only in the direction of approaching to and separating from the second processing member 102, but also relative to the center and direction of the processing surface 110, that is, relative to the directions z1 and z2.

That is, in this embodiment, the bias mechanism 103 and the gaps t1 to t3 constitute a floating mechanism, and by this floating mechanism, the center and inclination of at least the second processing member 102 are made variable in the small range of several μm to several mm. The run-out and expansion of the rotary shaft and the surface vibration and vibration of the first processing member 101 are absorbed.

The groove 112 on the polishing surface 110 of the first processing member 101 is described in more detail. The rear end of the groove 112 reaches the inner periphery 101a of the first processing member 101, and its top is elongated toward the outside y of the first processing member 101, that is, toward the outer periphery. As shown in FIG. 19(A), the sectional area of the groove 112 is gradually decreased in the direction from the center x of the circular first processing member 101 to the outside y of the first processing member 101, that is, toward the outer periphery.

The distance w1 of the left and right sides 112a and 112b of the groove 112 is decreased in the direction from the center x of the first processing member 101 to the outside y of the first processing member 101, that is, toward the outer periphery. As shown in FIG. 19(B), the depth w2 of the groove 112 is decreased in the direction from the center x of the first processing member 101 to the outside y of the first processing member 101, that is, toward the outer periphery. That is, the bottom 112c of the groove 112 is decreased in depth in the direction from the center x of the first processing member 101 to the outside y of the first processing member 101, that is, toward the outer periphery.

As described above, the groove 112 is gradually decreased both in width and depth toward the outside y, that is, toward the outer periphery, and its sectional area is gradually decreased toward the outside y. Then, the top of the groove 112, that is, the y side, is a dead end. That is, the top of the groove 112, that is, the y side does not reach the outer periphery 101b of the first processing member 101, and an outer flat surface 113 is interposed between the top of the groove 112 and the outer periphery 101b. The outer flat surface 113 is a part of the processing surface 110.

In the embodiment shown in FIG. 19, the left and right sides 112a and 112b and the bottom 112c of the groove 112 constitute a flow path limiting part. This flow path limiting part, the flat part around the groove 112 of the first processing member 101, and the flat part of the second processing member 102 constitute the dynamical pressure generating mechanism 104.

However, only one of the width and depth of the groove 112 may be constituted as described above to decrease the sectional area.

While the first processing member 101 rotates, the dynamical pressure generating mechanism 104 generates a force in the direction of separating the processing members 101 and 102 from each other to secure a desired minute space between the processing members 101 and 102 by a fluid passing through the space between the processing members 101 and 102. By generation of such dynamical pressure, a 0.1 μm to 10 μm minute space can be generated between the processing surfaces 110 and 120. A minute space like that can be regulated and selected depending on the object of processing, but is preferably 1 μm to 6 μm, more preferably 1 μm to 2 μm. This apparatus can realize a uniform mixing (uniform reaction when the mixing is accompanied by reaction) and form microparticles by the minute space, which are not achieved in the prior art.

The grooves 112 . . . 112 may extend straight from the center x to the outside y. In this embodiment, however, as shown in FIG. 19(A), the grooves 112 are curved to extend such that with respect to a rotation direction r of the first processing member 101, the center x of the groove 112 is positioned in front of the outside y of the groove 112.

In this manner, the grooves 112 . . . 112 are curved to extend so that the separation force by the dynamical pressure generating mechanism 104 can be effectively generated.

Then, the working of this apparatus is described.

As shown in FIG. 18(A), a first processed fluid R which has been introduced from a hopper 170 and has passed through the first introduction part d1, passes through the hollow part of the circular second processing member 102, and the fluid that has received the centrifugal force resulting from rotation of the first processing member 101 enters the space between the processing members 101 and 102, and uniform mixing (reaction) and, in any case, generation of microparticles are effected and processed between the processing surface 110 of the rotating first processing member 101 and the processing surface 120 of the second processing member 102, then exits from the processing members 101 and 102 and is then discharged from the discharge part 108 to the side of the decompression pump Q (hereinafter, the first processed fluid R is referred to simply as a fluid R, if necessary).

In the foregoing description, the fluid R that has entered the hollow part of the circular second processing member 102 first enters the groove 112 of the rotating first processing member 101 as shown in FIG. 20(A). On the other hand, the processing surfaces 110 and 120 that are mirror-polished flat parts are kept airtight even by passing a gas such as air or nitrogen. Accordingly, even if the centrifugal force by rotation is received, the fluid cannot enter through the groove 112 into the space between the processing surfaces 110 and 120 that are pushed against each other by the bias mechanism 103. However, the fluid R gradually runs against both the sides 112a and 112b and the bottom 112c of the groove 112 formed as a flow path limiting part to generate dynamical pressure acting in the direction of separating the processing surfaces 110 and 120 from each other. As shown in FIG. 20(B), the fluid R can thereby exude from the groove 112 to the flat surface, to secure a minute gap t, that is, clearance, between the processing surfaces 110 and 120. Then, a uniform reaction and generation of microparticles are effected and processed between the mirror-polished flat surfaces. The groove 112 has been curved so that the centrifugal force is applied more accurately to the fluid to make generation of dynamical pressure more effectively.

In this manner, the processing apparatus can secure a minute and uniform gap, that is, clearance, between the mirror surfaces, that is, the processing surfaces 110 and 120, by the balance between the dynamical pressure and the bias force by the bias mechanism 103. By the structure described above, the minute gap can be as superfine as 1 μm or less.

By utilizing the floating mechanism, the automatic regulation of alignment between the processing surfaces 110 and 120 becomes possible, and the clearance in each position between the processing surfaces 110 and 120 can be prevented from varying against physical deformation of each part by rotation or generated heat, and the minute gap in each position can be maintained.

In the embodiment described above, the floating mechanism is a mechanism arranged for the second holder 121 only. Alternatively, the floating mechanism can be arranged in the first holder 111 instead of, or together with, the second holder 121.

Figure 21:
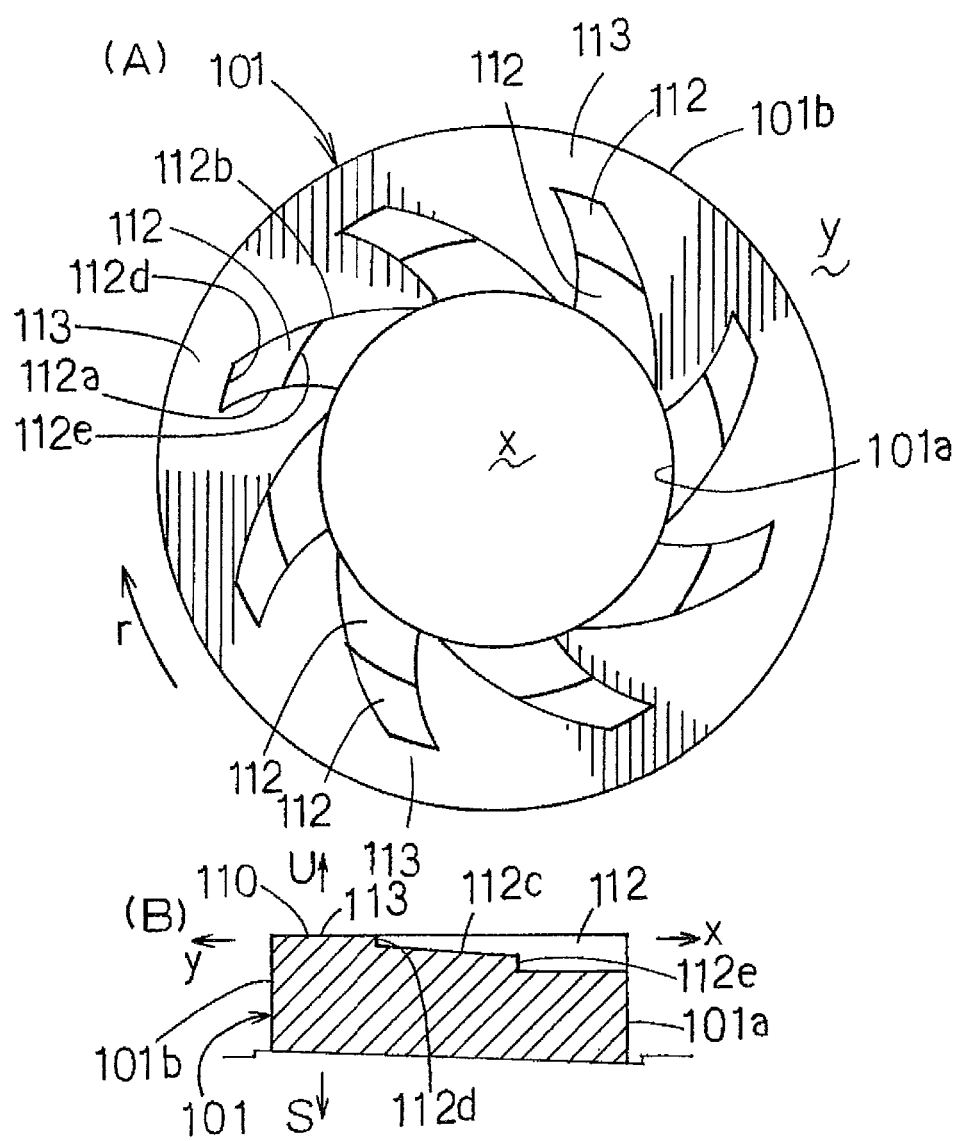
FIG. 21(A) is a plane view of another embodiment of the first processing member 1.
FIG. 21(B) is a schematic vertical sectional view showing an important part thereof.
Figure 22:
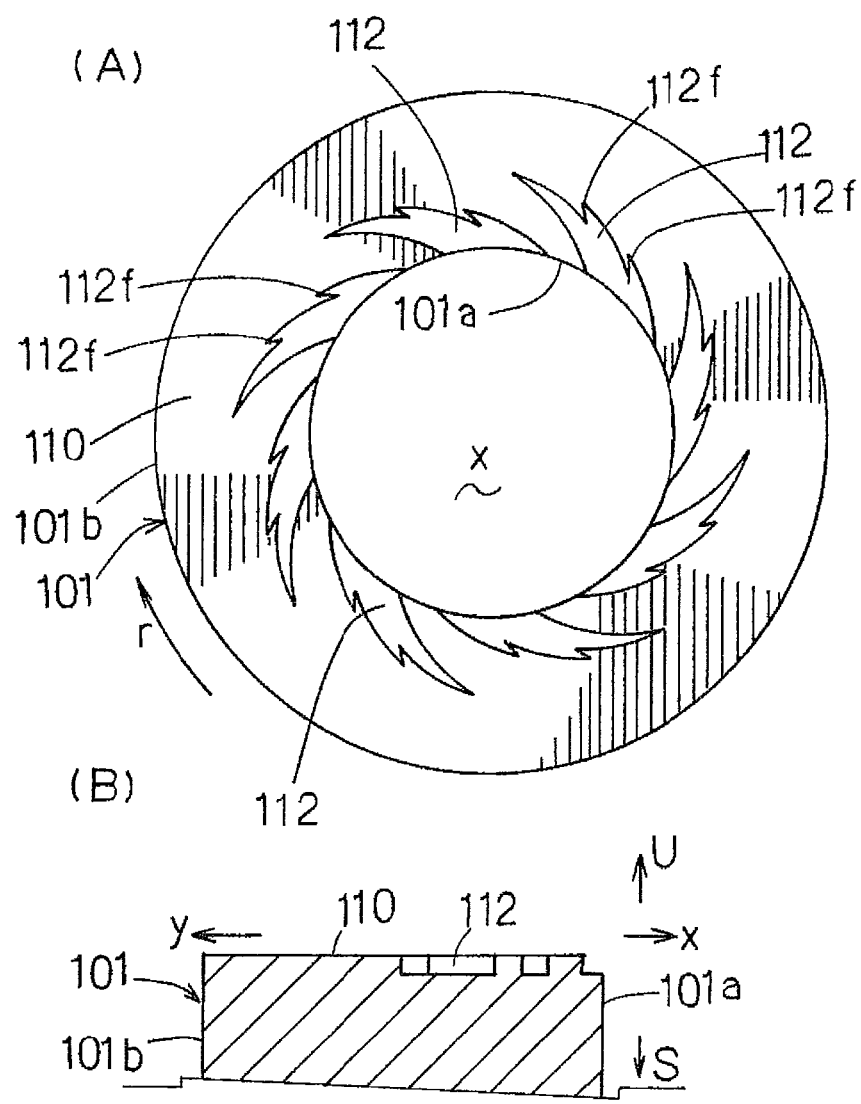
FIG. 22(A) is a plane view of still another embodiment of the first processing member 1.
FIG. 22(B) is a schematic vertical sectional view showing an important part thereof.
Figure 23:
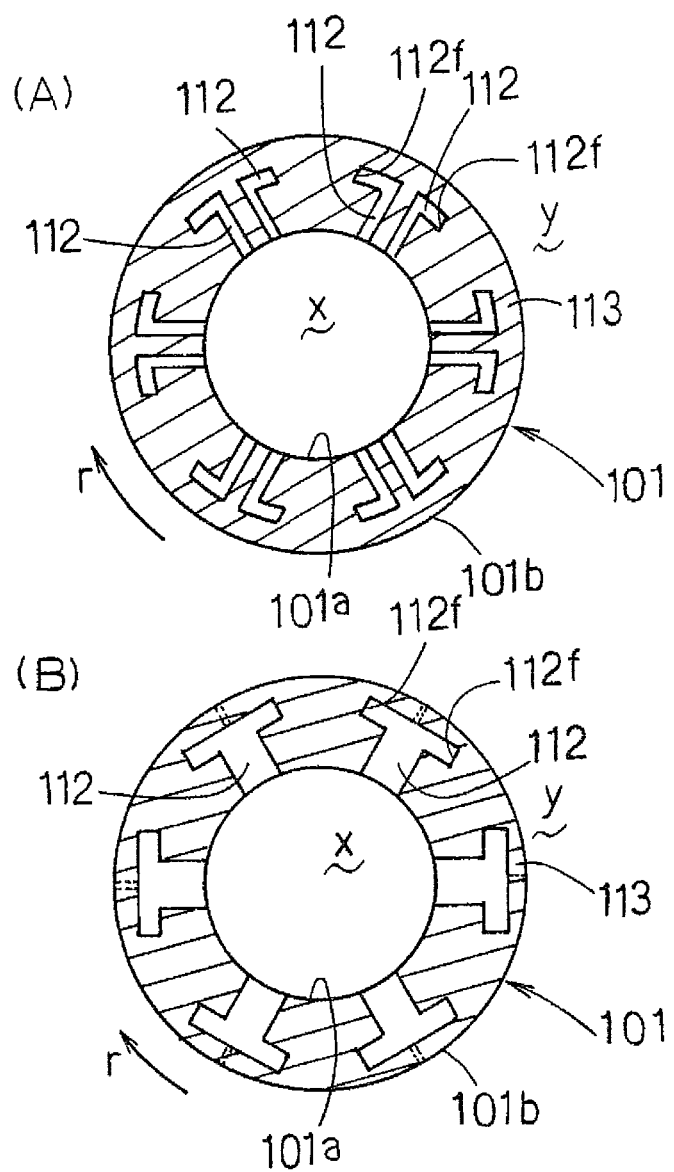
FIG. 23(A) is a plane view of still another embodiment of the first processing member 1.
FIG. 23(B) is a plane view of still another embodiment of the first processing member 1.

Other embodiments of the groove 112 are shown in FIG. 21 to FIG. 23.

As shown in FIG. 21(A) and FIG. 21(B), the groove 112 can be provided at the top with a flat wall surface 112d as a part of the flow path limiting part. In the embodiment shown in FIG. 14, a step 112e is arranged between the first wall surface 112d and the inner periphery 101a in the bottom 112c, and the step 112e also constitutes a part of the flow path limiting part.

As shown in FIG. 22(A) and FIG. 22(B), the groove 112 includes a plurality of branches 112f . . . 112f, and each branch 112f narrows its width thereby being provided with a flow path limiting part.

With respect to the embodiments in FIG. 14 and FIG. 15, structures other than those particularly shown are similar to those of embodiments as shown in FIG. 1(A), FIG. 11(C), and FIG. 18 to FIG. 20.

In the embodiments described above, at least either the width or depth of the groove 112 is gradually decreased in size in the direction from inside to outside the first processing member 101, thereby constituting a flow path limiting part. Alternatively, as shown in FIG. 23(A) or FIG. 23(B), the groove 112 can be provided with a termination surface 112f without changing the width and depth of the groove 112, and the termination surface 112f of the groove 112 can serve as a flow path limiting part. As shown the embodiments in FIG. 19, FIG. 21 and FIG. 22, the width and depth of the groove 112 can be changed as described above thereby slanting the bottom and both sides of the groove 112, so that the slanted surfaces serves as a pressure-receiving part toward the fluid to generate dynamical pressure. In the embodiment shown in FIG. 23(A) and FIG. 23(B), on the other hand, the termination surface of the groove 112 serves as a pressure-receiving part toward the fluid to generate dynamical pressure.

In the embodiment shown in FIG. 23(A) and FIG. 23(B), at least one of the width and depth of the groove 112 may also be gradually decreased in size.

The structure of the groove 112 is not limited to the one shown in FIG. 19 and FIG. 21 to FIG. 23 and can be provided with a flow path limiting part having other shapes.

For example, in the embodiments shown in FIG. 19 and FIG. 21 to FIG. 23, the groove 112 does not penetrate to the outer side of the first processing member 101. That is, there is an outer flat surface 113 between the outer periphery of the first processing member 101 and the groove 112. However, the structure of the groove 112 is not limited to such embodiment, and the groove 112 may reach the outer periphery of the first processing member 101 as long as the dynamical pressure can be generated.

For example, in the case of the first processing member 101 shown in FIG. 23(B), as shown in the broken line, a part having a smaller sectional area than other sites of the groove 112 can be formed on the outer flat surface 113.

The groove 112 may be formed so as to be gradually decreased in size in the direction from inside to outside as described above, and the part (terminal) of the groove 112 that had reached the outer periphery of the first processing member 101 may have the minimum sectional area (not shown). However, the groove 112 preferably does not penetrate to the outer periphery of the first processing member 101 as shown in FIG. 19 and FIG. 21 to FIG. 23, in order to effectively generate dynamical pressure.

Now, the embodiments shown in FIG. 18 to FIG. 23 are summarized.

This fluid processing apparatus is a processing apparatus wherein a rotating member having a flat processing surface and a fixed member having the same flat processing surface are opposite to each other so as to be concentric with each other, and while the rotating member is rotated, a material to be reacted is fed through an opening of the fixed member and subjected to a reaction between the opposite flat processing surfaces of both members, wherein the rotating member is provided with a pressurizing mechanism by which pressure is generated to maintain clearance without mechanically regulating clearance and enables 1 μm to 6 μm microscopic clearance not attainable by mechanical regulation of clearance, thereby significantly improving an ability to uniformize the mixing (reaction) and in some cases, an ability to pulverize the formed particles.

That is, this processing apparatus have a rotating member and a fixed member each having a flat processing surface in the outer periphery thereof and has a sealing mechanism in a plane on the flat processing surface, thereby providing a high speed rotation processing apparatus generating hydrostatic force, hydrodynamic force, or aerostatic-aerodynamic force. The force generates a minute space between the sealed surfaces, and provides a reaction processing apparatus with a function of non-contact and mechanically safe and high-level pulvelization and uniformizing of reactions. One factor for forming this minute space is due to the rotation speed of the rotating member, and the other factor is due to a pressure difference between the introduction side and discharge side of a processed material (fluid). When a pressure imparting mechanism is not arranged in the introduction side, that is, when the processed material. (fluid) is introduced at atmospheric pressure, there is no pressure difference, and thus the sealed surfaces should be separated by only the rotation speed of the rotating member. This is known as hydrodynamic or aerodynamic force.

FIG. 18(A) shows the apparatus wherein a decompression pump Q is connected to the discharge part of the reaction apparatus G, but as described above, the reaction apparatus G may be arranged in a decompression tank T without arranging the housing 106 and the decomposition pump Q, as shown in FIG. 24(A).

In this case, the tank T is decompressed in a vacuum or in an almost vacuum, whereby the processed product formed in the reaction apparatus G is sprayed in a mist form in the tank T, and the processed material colliding with, and running down along, the inner wall of the tank T can be recovered, or a gas (vapor) separated from the processed material and filled in an upper part of the tank T, unlike the processed material running down along the wall, can be recovered to obtain the objective product after processing.

As shown in FIG. 24(B), when the decompression pump Q is used, an airtight tank T is connected via the decompression pump Q to the processing apparatus G, whereby the processed material after processing can be formed into mist to separate and extract the objective product.

As shown in FIG. 24(C), the decompression pump Q is connected directly to the processing apparatus G, and the decompression pump Q and a discharge part for fluid R, different from the decompression pump Q, are connected to the tank T, whereby the objective product can be separated. In this case, a gasified portion is sucked by the decompression pump Q, while the fluid R (liquid portion) is discharged from the discharge part separately from the gasified portion.

In the embodiments described above, the first and second processed fluids are introduced via the second holders 21 and 121 and the second rings 20 and 102 respectively and mixed and reacted with each other.

Now, other embodiments with respect to introduction of fluids to be processed into the apparatus are described.

As shown in FIG. 1(B), the processing apparatus shown in FIG. 1(A) is provided with a third introduction part d3 to introduce a third fluid to be processed into the space between the processing surfaces 1 and 2, and the third fluid is mixed and reacted with the first processed fluid as well as the second processed fluid.

By the third introduction part d3, the third fluid to be mixed with the first processed fluid is fed to the space between the processing surfaces 1 and 2. In this embodiment, the third introduction part d3 is a fluid flow path arranged in the second ring 20 and is open at one end to the second processing surface 2 and has a third fluid feed part p3 connected to the other end.

In the third fluid feed part p3, a compressor or another pump can be used.

The opening of the third introduction part d3 in the second processing surface 2 is positioned outside, and more far from, the rotation center of the first processing surface 1 than the opening of the second introduction part d2. That is, in the second processing surface 2, the opening of the third introduction part d3 is located downstream from the opening of the second introduction part d2. A gap is arranged between the opening of the third introduction d3 and the opening of the second introduction part d2 in the radial direction of the second ring 20.

With respect to structures other than the third introduction d3, the apparatus shown in FIG. 1(B) is similar to that in the embodiment as in FIG. 1(A). In FIG. 1(B) and further in FIG. 1(C), FIG. 1(D) and FIG. 2 to FIG. 11 described later, the case 3 is omitted to simplify the drawings. In FIG. 9(B), FIG. 9(C), FIG. 10, FIG. 11(A) and FIG. 11(B), a part of the case 3 is shown.

As shown in FIG. 1(C), the processing apparatus shown in FIG. 1(B) is provided with a fourth introduction part d4 to introduce a fourth fluid to be processed into the space between the processing surfaces 1 and 2, and the fourth fluid is mixed and reacted with the first processed fluid as well as the second and third processed fluids.

By the fourth introduction part d4, the fourth fluid to be mixed with the first processed fluid is fed to the space between the processing surfaces 1 and 2. In this embodiment, the fourth introduction part d4 is a fluid flow path arranged in the second ring 20, is open at one end to the second processing surface 2, and has a fourth fluid feed part p4 connected to the other end.

In the fourth fluid feed part p4, a compressor or another pump can be used.

The opening of the fourth introduction part d4 in the second processing surface 2 is positioned outside, and more far from, the rotation center of the first processing surface 1 than the opening of the third introduction part d3. That is, in the second processing surface 2, the opening of the fourth introduction part d4 is located downstream from the opening of the third introduction part d3.

With respect to structures other than the fourth introduction part d4, the apparatus shown in FIG. 1(C) is similar to that in the embodiment as in FIG. 1(B).

Five or more introduction parts further including a fifth introduction part, a sixth introduction part and the like can be arranged to mix and react five or more fluids to be processed with one another (not shown).

As shown in FIG. 1(D), the first introduction part d1 arranged in the second holder 21 in the apparatus in FIG. 1(A) can, similar to the second introduction part d2, be arranged in the second processing surface 2 in place of the second holder 21. In this case, the opening of the first introduction part d1 is located at the upstream side from the second introduction part d2, that is, it is positioned nearer to the rotation center than the second introduction part d2 in the second processing surface 2.

In the apparatus shown in FIG. 1(D), the opening of the second introduction part d2 and the opening of the third introduction part d3 both are arranged in the second processing surface 2 of the second ring 20. However, arrangement of the opening of the introduction part is not limited to such arrangement relative to the processing surface. Particularly as shown in FIG. 2(A), the opening of the second introduction part d2 can be arranged in a position adjacent to the second processing surface 2 in the inner periphery of the second ring 20. In the apparatus shown in FIG. 2(A), the opening of the third introduction part d3 is arranged in the second processing surface 2 similarly to the apparatus shown in FIG. 1(B), but the opening of the second introduction part d2 can be arranged inside the second processing surface 2 and adjacent to the second processing surface 2, whereby the second processed fluid can be immediately introduced onto the processing surfaces.

In this manner, the opening of the first introduction part d1 is arranged in the second holder 21, and the opening of the second introduction part d2 is arranged inside the second processing surface 2 and adjacent to the second processing surface 2 (in this case, arrangement of the third introduction part d3 is not essential), so that particularly in reaction of a plurality of processed fluids, the processed fluid introduced from the first introduction part d1 and the processed fluid introduced from the second introduction part d2 are introduced, without being reacted with each other, into the space between the processing surfaces 1 and 2, and then both the fluids can be reacted first between the processing surfaces 1 and 2. Accordingly, the structure described above is suitable for obtaining a particularly reactive processed fluid.

The term "adjacent" is not limited to the arrangement where the opening of the second introduction part d2 is contacted with the inner side of the second ring 20 as shown in FIG. 2(A). The distance between the second ring 20 and the opening of the second introduction part d2 may be such a degree that a plurality of processed fluids are not completely mixed and reacted with one another prior to introduction into the space between the processing surfaces 1 and 2. For example, the opening of the second introduction part d2 may be arranged in a position near the second ring 20 of the second holder 21. Alternatively, the opening of the second introduction part d2 may be arranged on the side of the first ring 10 or the first holder 11.

In the apparatus shown in FIG. 1(B), a gap is arranged between the opening of the third introduction part d3 and the opening of the second introduction part d2 in the radial direction of the second ring 20, but as shown in FIG. 2(B), the second and third processed fluids can be introduced into the space between the processing surfaces 1 and 2, without providing such gap, thereby immediately joining both the fluids together. The apparatus shown in FIG. 2(B) can be selected depending on the object of processing.

In the apparatus shown in FIG. 1(D), a gap is also arranged between the opening of the first introduction part d1 and the opening of the second introduction part d2 in the radial direction of the second ring 20, but the first and second processed fluids can be introduced into the space between the processing surfaces 1 and 2, without providing such gap, thereby immediately joining both the fluids together. Such arrangement of the opening can be selected depending on the object of processing.

Figure 3:
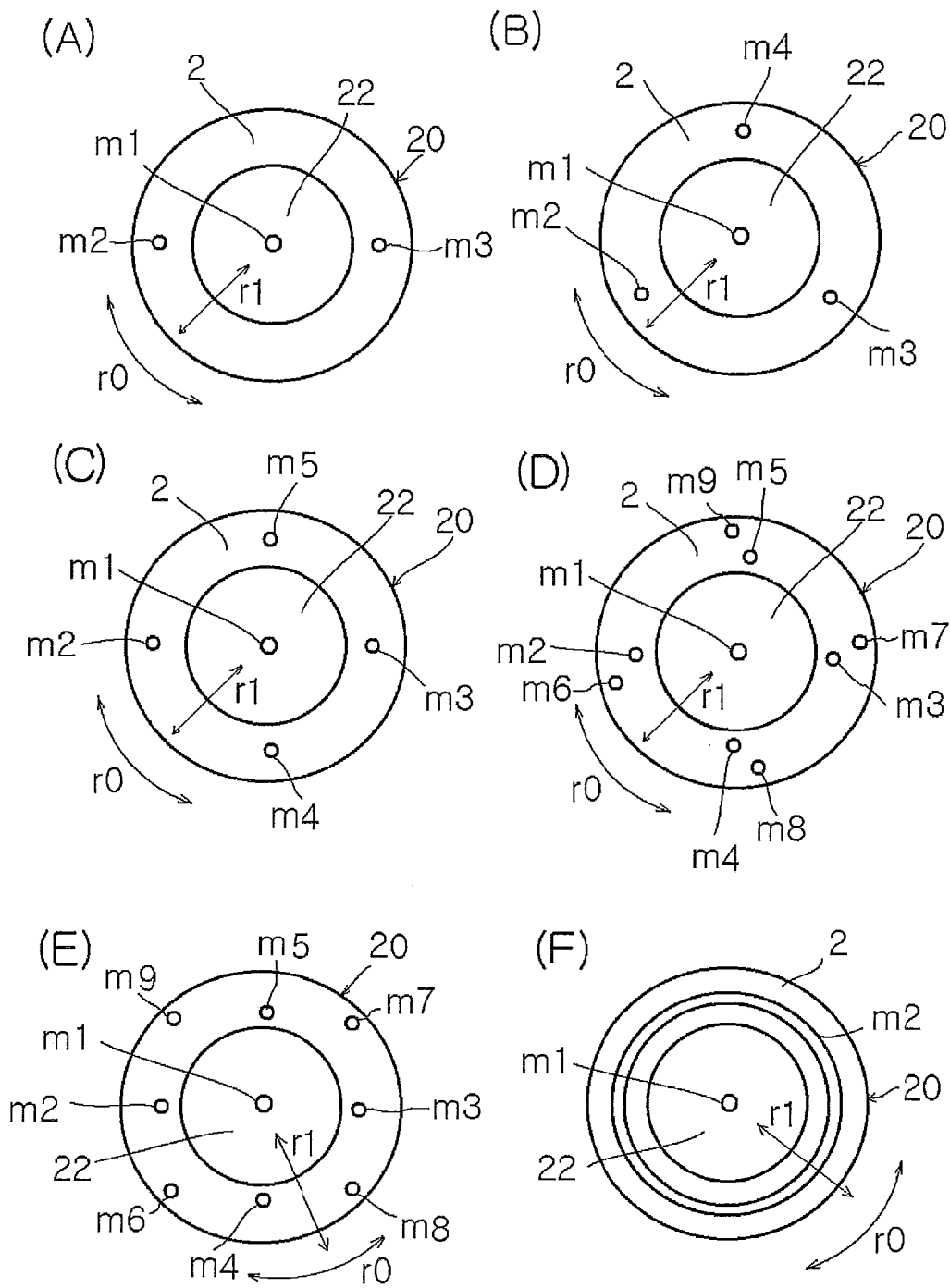
FIG. 3(A) is a schematic bottom view showing an important part of the apparatus shown in FIG. 2(C)
FIG. 3(B) is a schematic bottom view showing an important part of another embodiment of the apparatus.
FIG. 3(C) is a schematic bottom view showing an important part of still another embodiment of the apparatus.
FIG. 3(D) is a schematic bottom view showing the concept of still another embodiment of the apparatus.
FIG. 3(E) is a schematic bottom view showing the concept of still another embodiment of the apparatus.
FIG. 3(F) is a schematic bottom view showing the concept of still another embodiment of the apparatus FIG. 4(A) to FIG. 4(D) each show a schematic vertical sectional view showing the concept of still another embodiment of the apparatus shown in FIG. 1.

In the embodiment shown in FIG. 1(B) and FIG. 1(C), the opening of the third introduction part d3 is arranged in the second processing surface 2 downstream from the opening of the second introduction part d2, in other words, outside the opening of the second introduction part d2 in the radial direction of the second ring 20. Alternatively, as shown in FIG. 2(C) and FIG. 3(A), the opening of the third introduction part d3 and the opening of the second introduction part d2 can be arranged in the second processing surface 2 in positions different in a circumferential direction r0 of the second ring 20. In FIG. 3, numeral m1 is the opening (first opening) of the first introduction part d1, numeral m2 is the opening (second opening) of the second introduction part d2, numeral m3 is the opening (third opening) of the third introduction part d3, and numeral r1 is the radical direction of the ring.

When the first introduction part d1 is arranged in the second ring 20, as shown in FIG. 2(D), the opening of the first introduction part d1 and the opening of the second introduction part d2 can be arranged in the second processing surface 2 in positions different in the circumferential direction of the second ring 20.

In the apparatus shown in FIG. 3(A), the openings of two introduction parts are arranged in the second processing surface 2 of the second ring 20 in positions different in the circumferential direction r0, but as shown in FIG. 3(B), the openings of three introduction parts can be arranged in positions different in the circumferential direction r0 of the ring, or as shown in FIG. 3(C), the openings of four introduction parts can be arranged in positions different in the circumferential direction r0 of the ring. In FIG. 3 (B) and FIG. 3(C), numeral m4 is the opening of the fourth introduction part, and in FIG. 3(C), numeral m5 is the opening of the fifth introduction part. Five or more openings of introduction parts may be arranged in positions different in the circumferential direction r0 of the ring (not shown).

In the apparatuses above, the second to fifth introduction parts can introduce different fluids, that is, the second, third, fourth and fifth fluids. On the other hand, the second to fifth openings m2 to m5 can introduce the same fluid, that is, the second fluid into the space between the processing surfaces. In this case, the second to fifth introduction parts are connected to the inside of the ring and can be connected to one fluid feed part, that is, the second fluid feed part p2 (not shown).

A plurality of openings of introduction parts arranged in positions different in the circumferential direction r0 of the ring can be combined with a plurality of openings of introduction parts arranged in positions different in the radial direction r1 of the ring.

For example, as shown in FIG. 3(D), the openings m2 to m9 of eight introduction parts are arranged in the second processing surface 2, wherein four openings m2 to m5 of them are arranged in positions different in the circumferential direction r0 of the ring and identical in the radial direction r1 of the ring, and the other four openings m6 to m9 are arranged in positions different in the circumferential direction r0 of the ring and identical in the radial direction r1 of the ring. Then, the other openings m6 to m9 are arranged outside the radial direction r of the four openings m2 to m5. The outside openings and inside openings may be arranged in positions identical in the circumferential direction r0 of the ring, but in consideration of rotation of the ring, may be arranged in positions different in the circumferential direction r0 of the ring as shown in FIG. 3(D). In this case too, the openings are not limited to arrangement and number shown in FIG. 3(D).

For example, as shown in FIG. 3(E), the outside opening in the radial direction can be arranged in the apex of a polygon, that is, in the apex of a rectangle in this case, and the inside opening in the radial direction can be positioned on one side of the rectangle. As a matter of course, other arrangements can also be used.

When the openings other than the first opening m1 feed the second processed fluid into the space between the processing surfaces, each of the openings may be arranged as continuous openings in the circumferential direction r0 as shown in FIG. 3(F), instead of being arranged discretely in the circumferential direction r0 of the processing surface.

As shown in FIG. 4(A), depending on the object of processing, the second introduction part d2 arranged in the second ring 20 in the apparatus shown in FIG. 1(A) can be, similar to the first introduction part d1, arranged in the central portion 22 of the second holder 21. In this case, the opening of the second introduction part d2 is positioned with a gap outside the opening of the first introduction part d1 positioned in the center of the second ring 20. As shown in FIG. 4(B), in the apparatus shown in FIG. 4(A), the third introduction part d3 can be arranged in the second ring 20. As shown in FIG. 4(C), in the apparatus shown in FIG. 4(A), the second and third processed fluids can be introduced into the space inside the second ring 20 without arranging a gap between the opening of the first introduction part d1 and the opening of the second introduction part d2, so that both the fluids can immediately join together. As shown in FIG. 4(D), depending on the object of processing, in the apparatus shown in FIG. 4(A), the third introduction part d3 can be, similar to the second introduction part d2, arranged in the second holder 21. Four or more introduction parts may be arranged in the second holder 21 (not shown).

As shown in FIG. 5(A), depending on the object of processing, in the apparatus shown in FIG. 4(D), the fourth introduction part d4 can be arranged in the second ring 20, so that the fourth processed fluid may be introduced into the space between the processing surfaces 1 and 2.

As shown in FIG. 5(B), in the apparatus shown in FIG. 1(A), the second introduction part d2 can be arranged in the first ring 10, and the opening of the second introduction part d2 can be arranged in the first processing surface 1.

As shown in FIG. 5(C), in the apparatus shown in FIG. 5(B), the third introduction part d3 can be arranged in the first ring 10, and the opening of the third introduction part d3 and the opening of the second introduction part d2 can be arranged in the first processing surface 1 in positions different in the circumferential direction of the first ring 10.

As shown in FIG. 5(D), in the apparatus shown in FIG. 5(B), the first introduction part d1 can be arranged in the second ring 20 instead of arranging the first introduction part d1 in the second holder 21, and the opening of the first introduction part d1 can be arranged in the second processing surface 2. In this case, the openings of the first and second introduction parts d1 and d2 are arranged in positions identical in the radial direction of the ring.

As shown in FIG. 6(A), in the apparatus shown in FIG. 1(A), the third introduction part d3 can be arranged in the first ring 10, and the opening of the third introduction part d3 can be arranged in the first processing surface 1. In this case, both the openings of the second and third introduction parts d2 and d3 are arranged in positions identical in the radial direction of the ring. However, both the openings may be arranged in positions different in the radial direction of the ring.

In the apparatus shown in FIG. 5(C), the openings are arranged in positions identical in the radial direction of the first ring 10 and simultaneously arranged in positions different in the circumferential direction (that is, rotation direction) of the first ring 10, but in this apparatus, as shown in FIG. 6(B), both the openings of the second and third introduction parts d2 and d3 can be arranged in positions different in the radical direction of the first ring 10. In this case, as shown in FIG. 6(B), a gap can be arranged between both the openings of the second and third introduction parts d2 and d3 in the radial direction of the first ring 10, or without arranging the gap, the second and third processed fluids may immediately join together (not shown).

As shown in FIG. 6(C), the first introduction part d1 together with the second introduction part d2 can be arranged in the first ring 10 instead of arranging the first introduction part d1 in the second holder 21. In this case, in the first processing surface 1, the opening of the first introduction part d1 is arranged upstream (inside the radial direction of the first ring 10) from the opening of the second introduction part d2. A gap is arranged between the opening of the first introduction part d1 and the opening of the second introduction part d2 in the radial direction of the first ring 10. Alternatively, such gap may not be arranged (not shown).

As shown in FIG. 6(D), both the openings of the first introduction part d1 and the second introduction part d2 can be arranged in positions different in the circumferential direction of the first ring 10 in the first processing surface 1 in the apparatus shown in FIG. 6(C).

In the embodiment shown in FIG. 6(C) and FIG. 6(D), three or more introduction parts may be arranged in the first ring 10, and in the second processing surface 2, so the respective openings may be arranged in positions different in the circumferential direction or in positions different in the radial direction of the ring (not shown). For example, the arrangement of openings in the second processing surface 2, shown in FIG. 3(B) to FIG. 3(F), can also be used in the first processing surface 1.

As shown in FIG. 7(A), in the apparatus shown in FIG. 1(A), the second introduction part d2 can be arranged in the first holder 11 instead of arranging the part d2 in the second ring 20. In this case, the opening of the second introduction part d2 is arranged preferably in the center of the central shaft of rotation of the first ring 10, in the site surrounded with the first ring 10 on the upper surface of the first holder 11.

As shown in FIG. 7(B), in the embodiment shown in FIG. 7(A), the third introduction part d3 can be arranged in the second ring 20, and the opening of the third introduction part d3 can be arranged in the second processing surface 2.

As shown in FIG. 7(C), the first introduction part d1 can be arranged in the first holder 11 instead of arranging the part d1 in the second holder 21. In this case, the opening of the first introduction part d1 is arranged preferably in the central shaft of rotation of the first ring 10, in the site surrounded with the first ring 10 on the upper surface of the first holder 11. In this case, as shown in the figure, the second introduction part d2 can be arranged in the first ring 10, and its opening can be arranged in the first processing surface 1. In this case, the second introduction part d2 can be arranged in the second ring 20, and its opening can be arranged in the second processing surface 2 (not shown).

As shown in FIG. 7(D), the second introduction part d2 shown in FIG. 7(C) together with the first introduction part d1 can be arranged in the first holder 11. In this case, the opening of the second introduction part d2 is arranged in the site surrounded with the first ring 10 on the upper surface of the first holder 11. In this case, the second introduction part d2 arranged in the second ring 20 may serve as the third introduction part d3 in FIG. 7(C).

In the embodiments shown in FIG. 1 to FIG. 7, the first holder 11 and the first ring 10 are rotated relative to the second holder 21 and the second ring 20, respectively. As shown in FIG. 8(A), in the apparatus shown in FIG. 1(A), the second holder 2 may be provided with a rotary shaft 51 rotating with the turning force from the rotation drive member, to rotate the second holder 21 in a direction opposite to the first holder 11. The rotation drive member may be arranged separately from the one for rotating the rotary shaft 50 of the first holder 11 or may receive power from the drive part for rotating the rotary shaft 50 of the first holder 11 by a power transmission means such as a gear. In this case, the second holder 2 is formed separately from the case, and shall, like the first holder 11, be rotatably accepted in the case.

As shown in FIG. 8(B), in the apparatus shown in FIG. 8(A), the second introduction part d2 can be, similarly in the apparatus in FIG. 7(B), arranged in the first holder 11 in place of the second ring 20.

In the apparatus shown in FIG. 8(B), the second introduction part d2 can be arranged in the second holder 21 in place of the first holder 11 (not shown). In this case, the second introduction part d2 is the same as one in the apparatus in FIG. 4(A). As shown in FIG. 8(C), in the apparatus shown in FIG. 8(B), the third introduction part d3 can be arranged in the second ring 20, and the opening of the third introduction part d3 can be arranged in the second processing surface 2.

As shown in FIG. 8(D), the second holder 21 only can be rotated without rotating the first holder 11. Even in the apparatuses shown in FIG. 1(B) to FIG. 7, the second holder 21 together with the first holder 11, or the second holder 21 alone, can be rotated (not shown).

As shown in FIG. 9(A), the second processing member 20 is a ring, while the first processing member 10 is not a ring and can be a rotating member provided directly with a rotary shaft 50 similar to that of the first holder 11 in other embodiments. In this case, the upper surface of the first processing member 10 serves as the first processing surface 1, and the processing surface is an evenly flat surface which is not circular (that is, hollow-free). In the apparatus shown in FIG. 9(A), similarly in the apparatus in FIG. 1(A), the second introduction part d2 is arranged in the second ring 20, and its opening is arranged in the second processing surface 2.

As shown in FIG. 9(B), in the apparatus shown in FIG. 9(A), the second holder 21 is independent of the case 3, and a surface-approaching pressure imparting mechanism 4 such as an elastic body for approaching to and separating from the first processing member 10 provided with the second ring 20 can be provided between the case 3 and the second holder 21. In this case, as shown in FIG. 9(C), the second processing member 20 is not a ring, but is a member corresponding to the second holder 21, and the lower surface of the member can serve as the second processing surface 2. As shown in FIG. 10(A), in the apparatus shown in FIG. 9(C), the first processing member 10 is not a ring either, and in other embodiments similarly in the apparatus shown in FIG. 9(A) and FIG. 9(B), the site corresponding to the first holder 11 can serve as the first processing member 10, and its upper surface can serve as the first processing surface 1.

In the embodiments described above, at least the first fluid is supplied from the first processing member 10 and the second processing member 20, that is, from the central part of the first ring 10 and the second ring 20, and after processing (mixing and reaction) of the other fluids, the processed fluid is discharged to the outside in the radial direction.

Alternatively, as shown in FIG. 10(B), the first fluid can be supplied in the direction from the outside to the inside of the first ring 10 and second ring 20. In this case, the outside of the first holder 11 and the second holder 21 is sealed with the case 3, the first introduction part d1 is arranged directly in the case 3, and the opening of the introduction part is arranged in a site inside the case and corresponding to the abutting position of the rings 10 and 20, as shown in the figure. In the apparatus in FIG. 1(A), a discharge part 36 is arranged in the position in which the first introduction part d1 is arranged, that is, in the central position of the ring 1 of the first holder 11. The opening of the second introduction part d2 is arranged in the opposite side of the opening of the case behind the central shaft of rotation of the holder. However, the opening of the second introduction part d may be, similar to the opening of the first introduction part d1, arranged in a site inside the case and corresponding to the abutting position of the rings 10 and 20. As described above, the embodiment is not limited to the one where the opening of the second introduction part d2 is formed to the opposite side of the opening of the first introduction part d1.

In this case, the outside of the diameter of both the rings 10 and 20 is on the upstream side, and the inside of both the rings 10 and 20 is on the downstream side.

As such, as shown in FIG. 16(E), when the processed fluid moves from outside to inside, the first processing surface 1 of the first processing member 10 may also be provided with groove-like depressions 13 . . . 13 extending in the direction from outside to inside of the first processing member 10. When the groove-like depressions 13 . . . 13 are formed, the balance ratio K described above is preferably set as 100% or more of unbalance type. As a result, dynamical pressure is generated in the groove-like depressions 13 . . . 13 upon rotating, the first and second processing surfaces 1 and 2 can rotate in a surely non-contact state, so that the risk of abrasion and the like due to contact can be eliminated. In the embodiment shown in FIG. 16(E), the separating force due to the pressure of the processed fluid is generated in an inner end 13a of the depressions 13.

As shown in FIG. 10(C), in the apparatus shown in FIG. 10(B), the second introduction part d2, which is arranged in the side of the case 3, can be arranged in the first ring 10 in space of the mentioned position, and its opening can be arranged in the first processing surface 1. In this case, as shown in FIG. 10(D), the first processing member 10 is not formed as a ring. Similarly in the apparatuses shown in FIG. 9(A), FIG. 9(B) and FIG. 10(A), in other embodiments, the site corresponding to the first holder 11 is the first processing member 10, its upper surface being the first processing surface 1, the second introduction part d2 being arranged in the first processing member 10, and its opening may be arranged in the first processing surface 1.

As shown in FIG. 11(A) in the apparatus shown in FIG. 10(D), the second processing member 20 is not formed as a ring, and in other embodiments, the member corresponding to the second holder 21 serves as the second processing member 20, and its lower surface serves as the second processing surface 2. Then, the second processing member 20 is a member independent of the case 3, and the same surface-approaching pressure imparting mechanism 4 as one in the apparatuses shown in FIG. 9(B), FIG. 9(C) and FIG. 10(A) can be arranged between the case 3 and the second processing member 20.

As shown in FIG. 11(B), the second introduction part d2 in the apparatus shown in FIG. 11(A) serves as the third introduction part d3, and separately the second introduction part d2 can be arranged. In this case, the opening of the second introduction part d2 is arranged upstream from the opening of the third introduction part d3 in the second processing surface 2.

Figure 4:
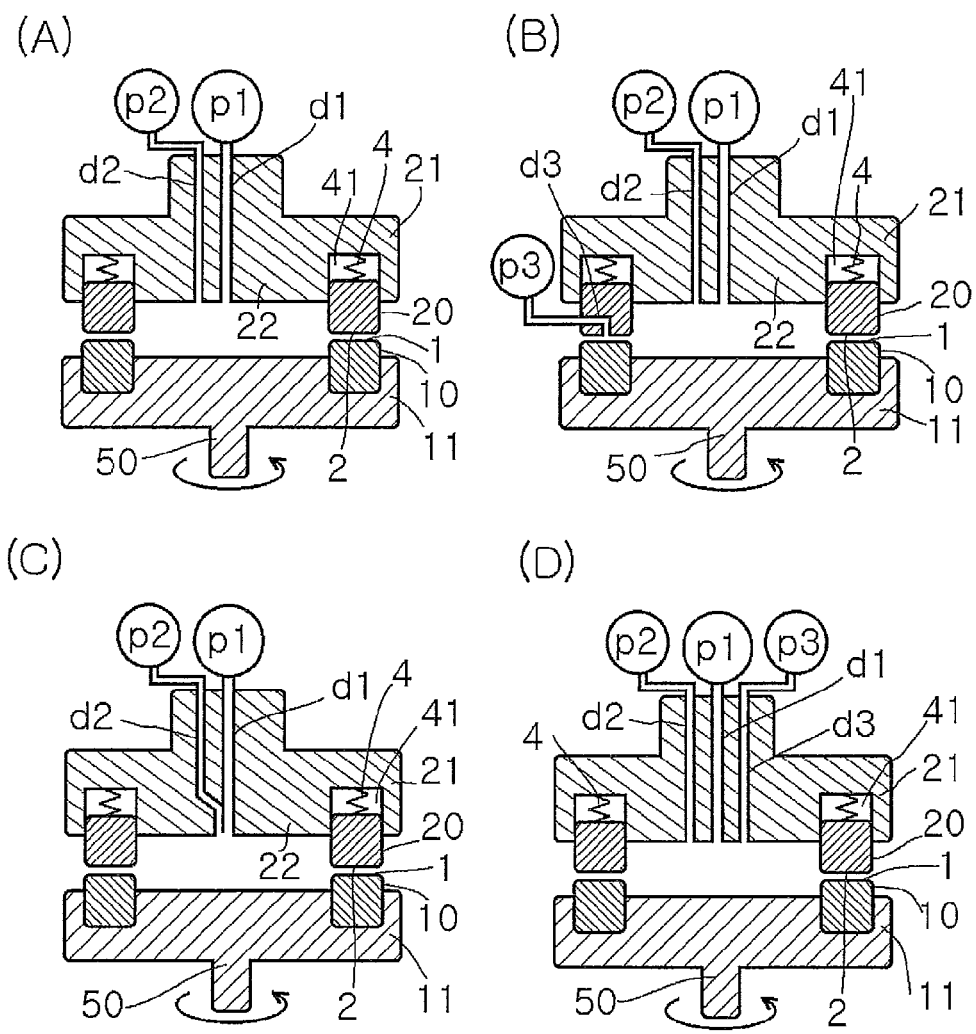
Figure 5:
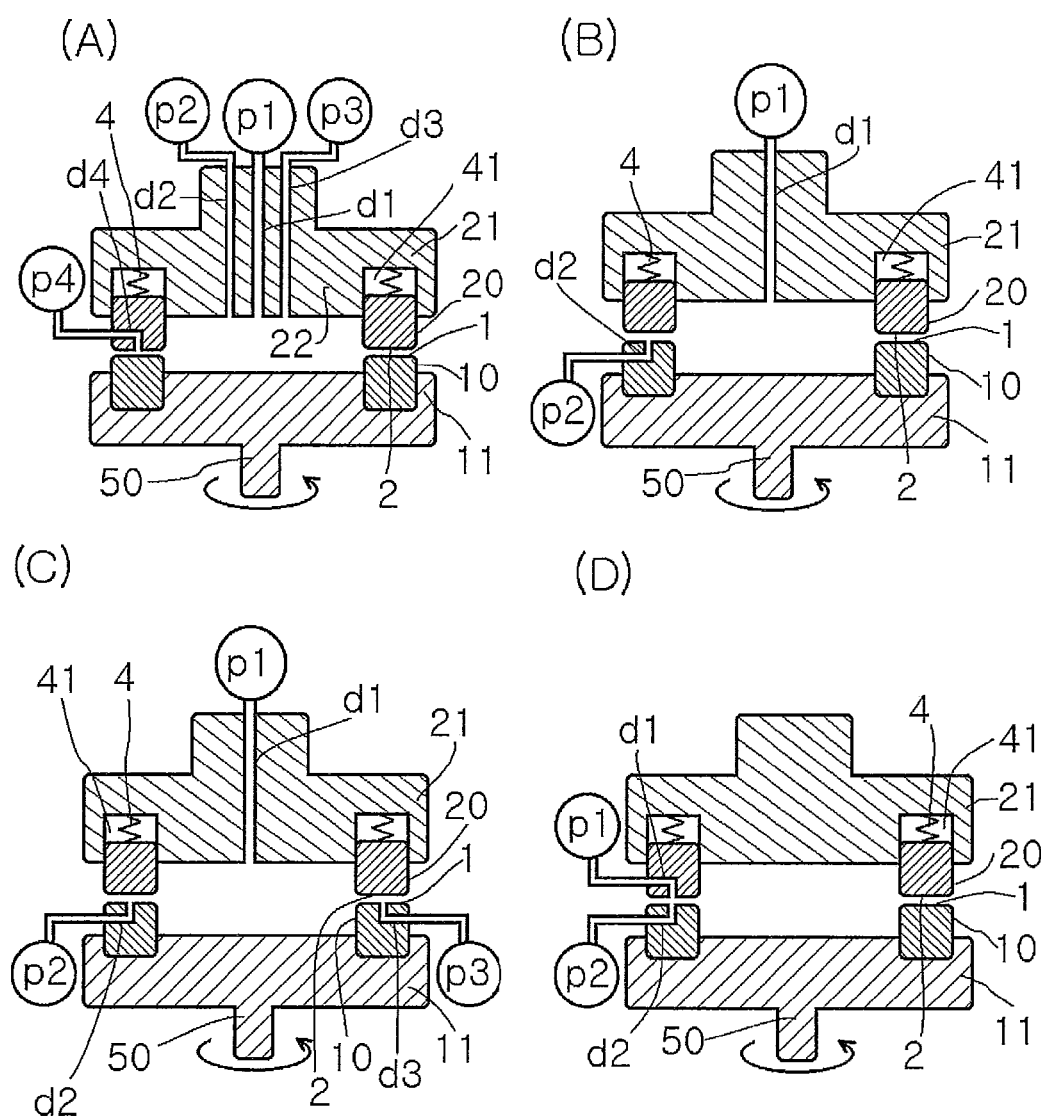
FIG. 5(A) to FIG. 5(D) each show a schematic vertical sectional view showing the concept of still another embodiment of the apparatus shown in FIG. 1.
Figure 6:
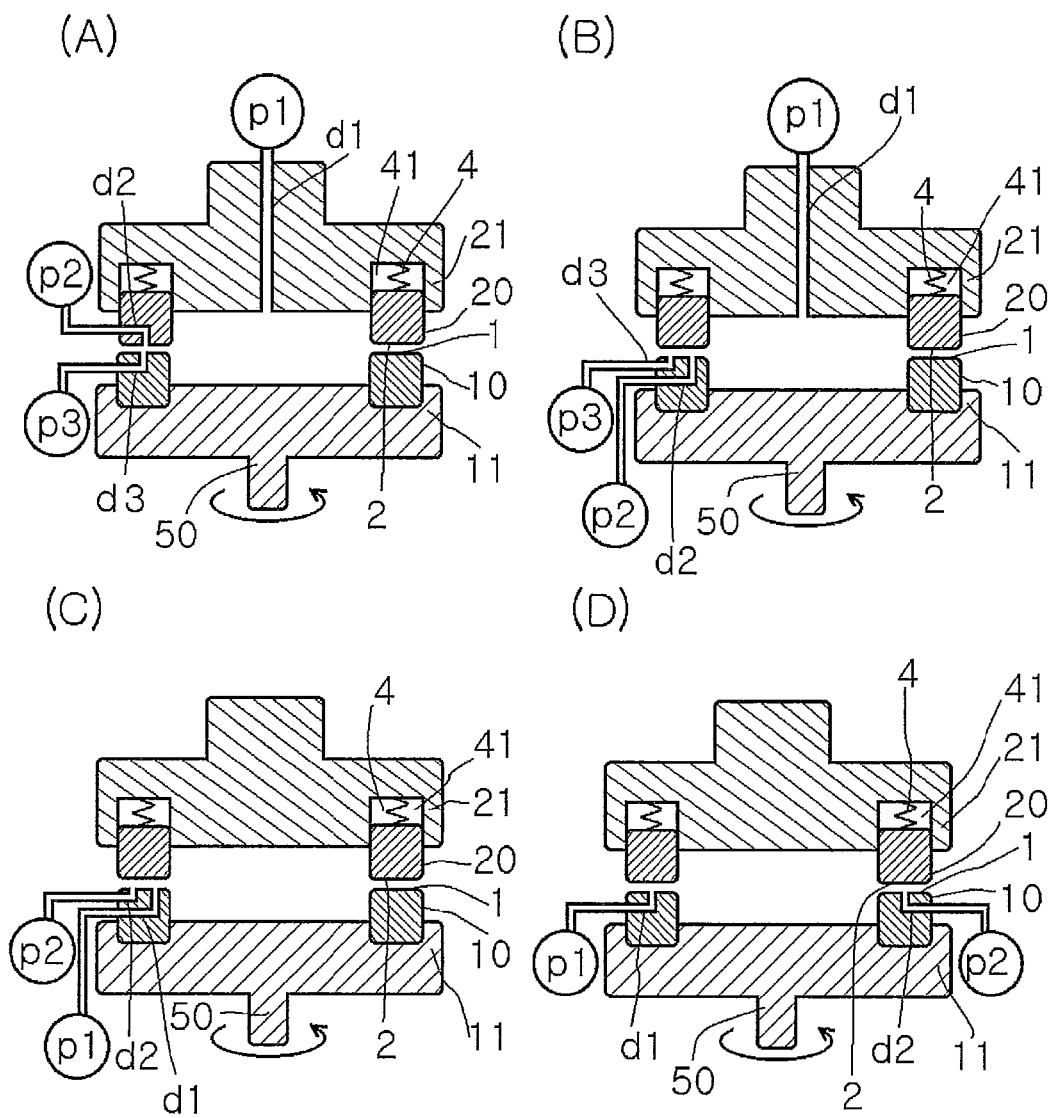
FIG. 6(A) to FIG. 6(D) each show a schematic vertical sectional view showing the concept of still another embodiment of the apparatus shown in FIG. 1.
Figure 7:
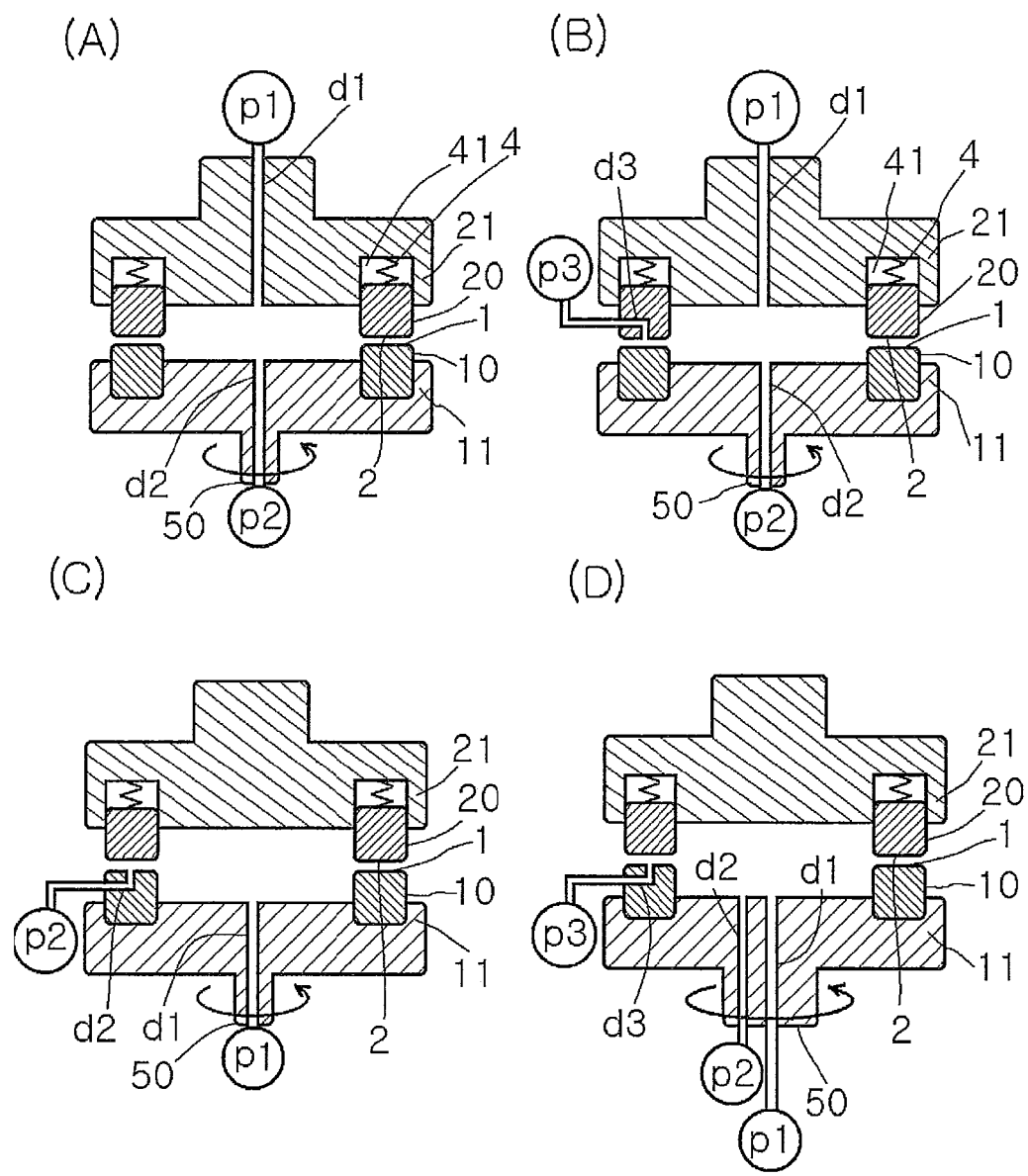
FIG. 7(A) to FIG. 7(D) each show a schematic vertical sectional view showing the concept of still another embodiment of the apparatus shown in FIG. 1.
Figure 8:
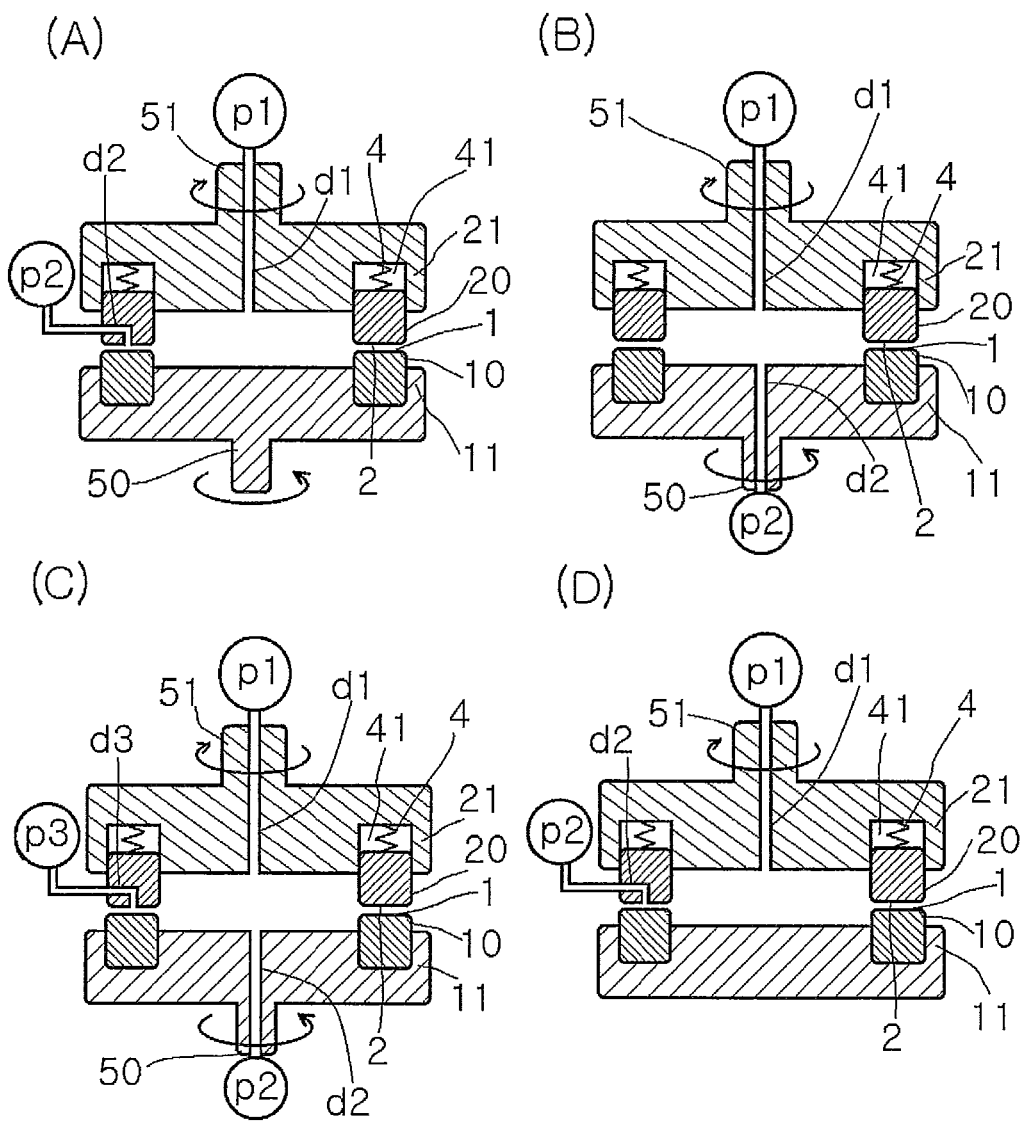
FIG. 8(A) to FIG. 8(D) each show a schematic vertical sectional view showing the concept of still another embodiment of the apparatus shown in FIG. 1.
Figure 10:
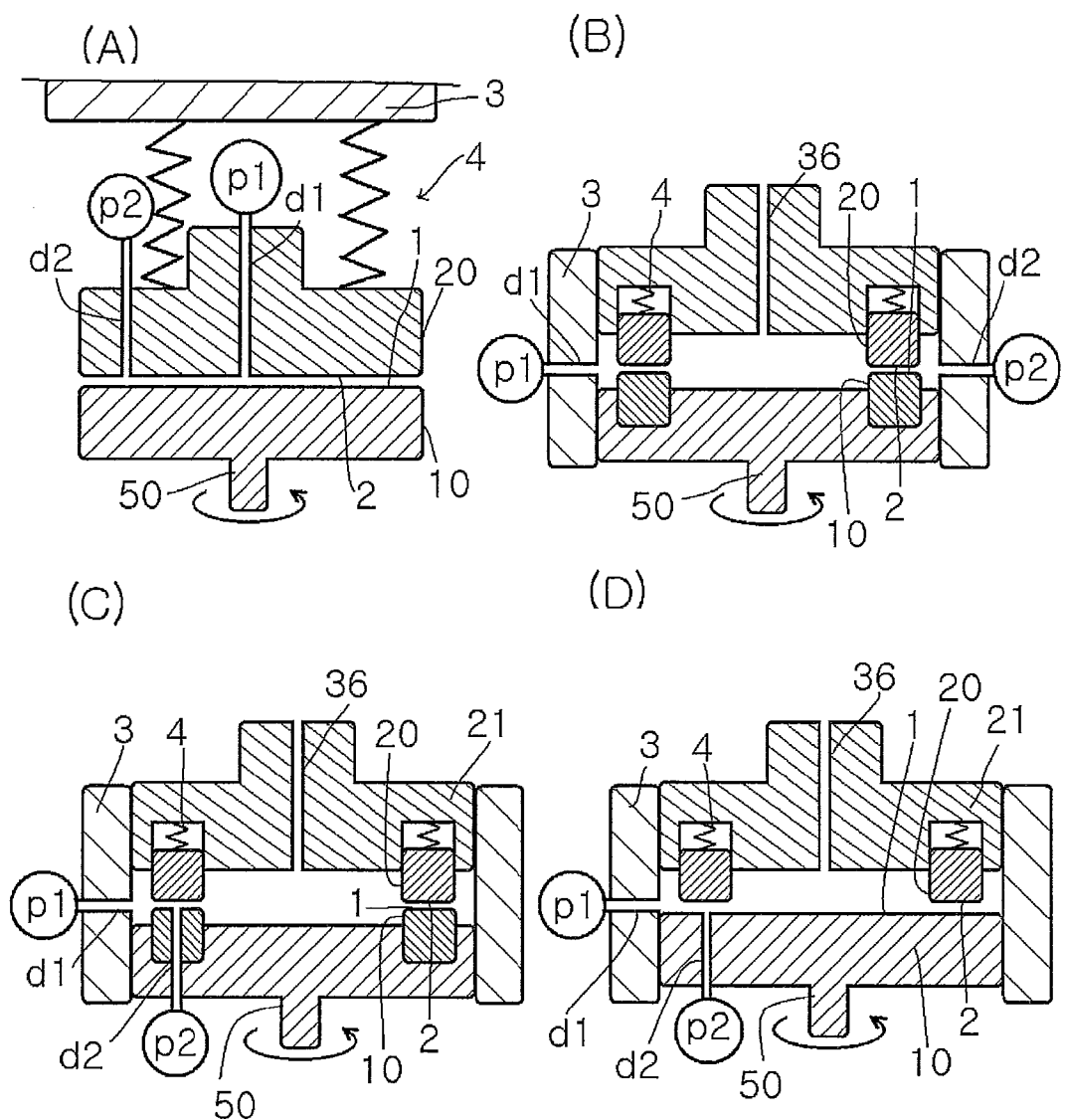
FIG. 10(A) to FIG. 10(D) each show a schematic vertical sectional view showing the concept of still another embodiment of the apparatus shown in FIG. 1.

In the apparatuses shown in FIG. 4 and the apparatuses shown in FIG. 5(A), FIG. 7(A), FIG. 7(B), FIG. 7(D), FIG. 8(B) and FIG. 8(C), other processed fluids flow into the first processed fluid before reaching the processing surfaces 1 and 2, and these apparatuses are not suitable for the fluid which is rapidly crystallized or separated. However, these apparatuses can be used for the fluid having a low reaction speed.

The processing apparatus suitable for carrying out the method according to the present invention is summarized as follows.

As described above, the processing apparatus comprises a fluid pressure imparting mechanism that imparts predetermined pressure to a processed fluid, at least two processing members, that is, a first processing member 10 arranged in a sealed fluid flow path through which a processed fluid at the predetermined pressure flows and a second processing member 20 capable of approaching to and separating from the first processing member 10, at least two processing surfaces of a first processing surface 1 and a second processing surface 2 arranged in a position in which they are faced with each other in the processing members 10 and 20, and a rotation drive mechanism that relatively rotates the first processing member 10 and the second processing member 20, wherein at least two processed fluids are mixed and reacted between the processing surfaces 1 and 2. Of the first processing member 10 and the second processing member 20, at least the second processing member 20 has a pressure-receiving surface, at least a part of the pressure-receiving surface is comprised of the second processing surface 2, and the pressure-receiving surface receives pressure applied by the fluid pressure imparting mechanism to at least one of the fluids to generate a force to move in the direction of separating the second processing surface 2 from the first processing surface 1. In this apparatus, the processed fluid that has received said pressure passes through the space between the first processing surface 1 and the second processing surface 2 capable of approaching to and separating from each other, thereby generating a desired mixing (reaction) between the processed fluids with the processed fluids being passed between the processing surfaces 1 and 2 and forming a fluid film of predetermined thickness.

In this processing apparatus, at least one of the first processing surface 1 and the second processing surface 2 is preferably provided with a buffer mechanism for regulation of micro-vibration and alignment.

In this processing apparatus, one of or both the first processing surface 1 and the second processing surface 2 is preferably provided with a displacement regulating mechanism capable of regulating the displacement in the axial direction caused by abrasion or the like thereby maintaining the thickness of a fluid film between the processing surfaces 1 and 2.

In this processing apparatus, a pressure device such as a compressor for applying predetermined feeding pressure to a fluid can be used as the fluid pressure imparting mechanism.

As the pressure device, a device capable of regulating an increase and decrease in feeding pressure is used. This is because the pressure device should be able to keep established pressure constant and should be able to regulate an increase and decrease in feeding pressure as a parameter to regulate the distance between the processing surfaces.

The processing apparatus can be provided with a separation preventing part for defining the maximum distance between the first processing surface 1 and the second processing surface 2 and preventing the processing surfaces 1 and 2 from separating from each other by the maximum distance or more.

The processing apparatus can be provided with an approach preventing part for defining the minimum distance between the first processing surface 1 and the second processing surface 2 and preventing the processing surfaces 1 and 2 from approaching to each other by the minimum distance or less.

The processing apparatus can be one wherein both the first processing surface 1 and the second processing surface 2 are rotated in opposite directions.

The processing apparatus can be provided with a temperature-regulating jacket for regulating the temperature of either or both of the first processing surface 1 and the second processing surface 2.

The processing apparatus is preferably one wherein at least a part of either or both of the first processing surface 1 and the second processing surface 2 is mirror-polished.

The processing apparatus can be one wherein one of or both the first processing surface 1 and the second processing surface 2 is provided with depressions.

The processing apparatus preferably includes, as a means for feeding one processed fluid to be mixed (reacted) with another processed fluid, a separate introduction path independent of a path for another processed fluid, at least one of the first processing surface and the second processing surface is provided with an opening leading to the separate introduction path, and another processed fluid sent through the separate introduction path is introduced into the processed fluid.

The processing apparatus for carrying out the present invention comprises a fluid pressure imparting mechanism that imparts predetermined pressure to a fluid, at least two processing surfaces of a first processing surface 1 and a second processing surface 2 capable of approaching to and separating from each other which are connected to a sealed fluid flow path through which the processed fluid at the predetermined pressure is passed, a surface-approaching pressure imparting mechanism that imparts surface-approaching pressure to the space between the processing surfaces 1 and 2, and a rotation drive mechanism that relatively rotates the first processing surface 1 and the second processing surface 2, whereby at least two processed fluids are mixed (reacted) between the processing surfaces 1 and 2, at least one processed fluid pressurized with the fluid pressure imparting mechanism is passed through the space between the first processing surface 1 and the second processing surface 2 rotating to each other and supplied with surface-approaching pressure, and another processed fluid is passed, so that the processed fluid pressurized with the fluid pressure imparting mechanism, while being passed between the processing surfaces and forming a fluid film of predetermined thickness, is mixed with another processed fluid, whereby a desired mixing (reaction) is caused between the processed fluids.

The surface-approaching pressure imparting mechanism can constitute a buffer mechanism of regulating micro-vibration and alignment and a displacement regulation mechanism in the apparatus described above.

The processing apparatus for carrying out the present invention comprises a first introduction part that introduces, into the apparatus, at least one of two processed fluids to be mixed (reacted), a fluid pressure imparting mechanism p that is connected to the first introduction part and imparts pressure to the processed fluid, a second introduction part that introduces at least the other fluid of the two processed fluids to be mixed (reacted), at least two processing members, that is, a first processing member 10 arranged in a sealed fluid flow path through which the other processed fluid is passed and a second processing member 20 capable of relatively approaching to and separating from the first processing member 10, at least two processing surfaces, that is, a first processing surface 1 and a second processing surface 2 arranged so as to be opposite to each other in the processing members 10 and 20, a holder 21 that accepts the second processing member 20 so as to expose the second processing surface 2, a rotation drive mechanism that relatively rotates the first processing member 10 and the second processing member 20, and a surface-approaching pressure imparting mechanism 4 that presses the second processing member 20 against the first processing surface 1 such that the second processing surface 2 is contacted against or made close to the first processing surface 1, wherein the processed fluids are mixed (reacted) between the processing surfaces 1 and 2, the holder 21 is provided with an opening of the first introduction part and is not movable so as to influence the space between the processing surfaces 1 and 2, at least one of the first processing member 10 and the second introduction part 20 is provided with an opening of the second introduction part, the second processing member 20 is circular, the second processing surface 2 slides along the holder 21 and approaches to and separates from the first processing surface 1, the second processing member 20 includes a pressure-receiving surface, the pressure-receiving surface receives pressure applied by the fluid pressure imparting mechanism p to the processed fluid to generate a force to move in the direction of separating the second processing surface 2 from the first processing surface 1, at least a part of the pressure-receiving surface is comprised of the second processing surface 2, one of the processed fluids to which pressure was applied is passed through the space between the first processing surface 1 and the second processing surface 2 rotating to each other and capable of approaching to and separating from each other, and the other processed fluid is supplied to the space between the processing surfaces 1 and 2, whereby both the processed fluids form a fluid film of predetermined thickness and pass through the space between both the processing surfaces 1 and 2, the passing processed fluid are mixed thereby promoting a desired mixing (reaction) between the processed fluids, and the minimum distance for generating the fluid film of predetermined thickness is kept between the processing surfaces 1 and 2 by the balance between the surface-approaching pressure by the surface-approaching pressure imparting mechanism 4 and the force of separating the processing surfaces 1 and 2 from each other by the fluid pressure imparted by the fluid pressure imparting mechanism p.

In this processing apparatus, the second introduction part can be, similarly being connected to the first introduction part, arranged to be connected to a separate fluid pressure imparting mechanism and to be pressurized. The processed fluid introduced from the second introduction part is not pressurized by the separate fluid pressure imparting mechanism, but is sucked and supplied into the space between the processing surfaces 1 and 2 by negative pressure generated in the second introduction part by the fluid pressure of the processed fluid introduced into the first introduction part. Alternatively, the other processed fluid flows downward by its weight in the second introduction part and can be supplied into the space between the processing surfaces 1 and 2.

As described above, the apparatus is not limited to the one wherein the opening of the first introduction part as an inlet for feeding the other processed fluid into the apparatus is arranged in the second holder, and the opening of the first introduction part may be arranged in the first holder. The opening of the first introduction part may be formed with at least one of the processing surfaces. However, when the processed fluid to be previously introduced into the space between the processing surfaces 1 and 2 should, depending on the reaction, be supplied from the first introduction part, the opening of the second introduction part as an inlet for feeding the other processed fluid into the apparatus should be arranged downstream from the opening of the first introduction part in any of the processing surfaces.

As the fluid processing apparatus for carrying out the present invention, the following apparatus can be used.

This processing apparatus comprises a plurality of introduction parts that separately introduce two or more processed fluids to be mixed (reacted), a fluid pressure imparting mechanism p that imparts pressure to at least one of the two or more processed fluids, at least two processing members, that is, a first processing member 10 arranged in a sealed fluid flow path through which the processed fluid is passed and a second processing member 20 capable of relatively approaching to and separating from the first processing member 10, at least two processing surfaces 1 and 2, that is, a first processing surface 1 and a second processing surface 2 arranged in a position in which they are faced with each other in the processing members 10 and 20, and a rotation drive mechanism that relatively rotates the first processing member 10 and the second processing member 20, wherein the processed fluids are mixed (reacted) between the processing surfaces 1 and 2, at least the second processing member 20 of the first processing member 10 and the second processing member 20 includes a pressure-receiving surface, at least a part of the pressure-receiving surface is comprised of the second processing surface 2, the pressure-receiving surface receives pressure applied by the fluid pressure imparting mechanism to the processed fluid to generate a force to move in the direction of separating the second processing surface 2 from the first processing surface 1, the second processing member 20 includes an approach regulating surface 24 that is directed to the opposite side of the second processing surface 2, the approach regulating surface 24 receives predetermined pressure applied to the processed fluid to generate a force to move in the direction of approaching the second processing surface 2 to the first processing surface 1, a force to move in the direction of separating the second processing surface 2 from the first processing surface 1 as a resultant force of total pressure received from the processed fluid is determined by the area ratio of the projected area of the approach regulating surface 24 in the approaching and separating direction to the projected area of the pressure-receiving surface in the approaching and separating direction, the processed fluid to which pressure was applied is passed through the space between the first processing surface 1 and the second processing surface 2 that rotate relative to each other and capable of approaching to and separating from each other, the other processed fluid to be mixed (reacted) with the processed fluid is mixed in the space between the processing surfaces, and the mixed processed fluid forms a fluid film of predetermined thickness and simultaneously passes through the space between the processing surfaces 1 and 2, thereby giving a desired product while passing through the space between the processing surfaces.

The fluid processing method according to the present invention is summarized as follows. The fluid processing method comprises applying predetermined pressure to a first fluid, connecting at least two processing surfaces, that is, a first processing surface 1 and a second processing surface 2, which are capable of approaching to and separating from each other, to a sealed fluid flow path through which the processed fluid that has received the predetermined pressure is passed, applying a surface-approaching pressure of approaching the first processing surface 1 and the second processing surface 2 each other, rotating the first processing surface 1 and the second processing surface 2 relative to each other, and introducing the processed fluid into the space between the processing surfaces 1 and 2, wherein the second processed fluid to be mixed (reacted) with the processed fluid is introduced through a separate flow path into the space between the processing surfaces 1 and 2 thereby mixing (reacting) both the processed fluids, the predetermined pressure applied to at least the first processed fluid functions as a separating force for separating the processing surfaces 1 and 2 from each other, and the separating force and the surface-approaching pressure are balanced via the processed fluid between the processing surfaces 1 and 2, whereby the distance between the processing surfaces 1 and 2 is kept in a predetermined minute space, the processed fluid is passed as a fluid film of predetermined thickness through the space between the processing surfaces 1 and 2, and when both the processed fluids are uniformly mixed (reacted) with each other while passing and accompanied by separation, a desired reaction product is crystallized or separated.

Figure 25:
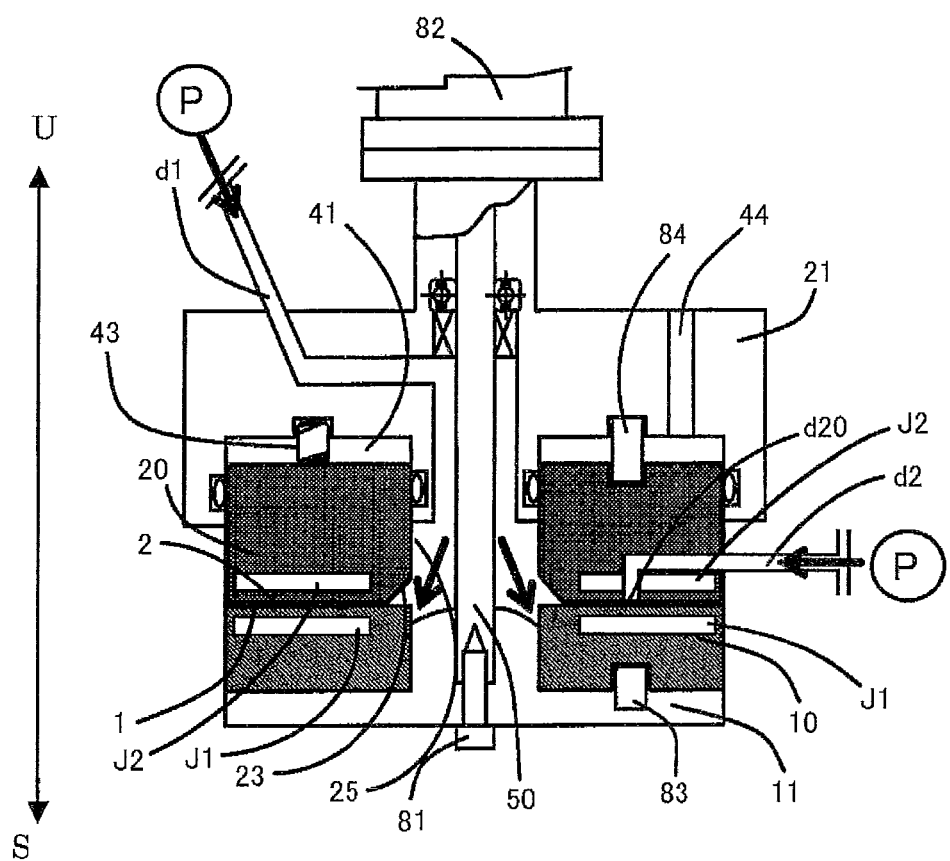
FIG. 25 is a schematic vertical sectional view showing outline of the apparatus of the present invention.

Hereinafter, other embodiments of the present invention are described in detail. FIG. 25 is a schematic sectional view of a fluid processing apparatus wherein materials to be processed are processed between processing surfaces, at least one of which rotates relative to the other, and which are capable of approaching to and separating from each other. FIG. 26(A) is a schematic plane view of the first processing surface in the apparatus shown in FIG. 25, and FIG. 26(B) is an enlarged view of an important part of the processing surface in the apparatus shown in FIG. 25. In FIG. 27(A) is a sectional view of the second introduction path, and FIG. 27(B) is an enlarged view of an important part for explaining the second introduction path.

In FIG. 25, arrows U and S show upward and downward directions respectively. In FIG. 26(A) and FIG. 27(B), arrow R shows the direction of rotation. In FIG. 27(B), arrow C shows the direction of centrifugal force (radial direction).

This apparatus uses at least two fluids, at least one of which contains at least one kind of material to be processed, and the fluids join together in the space between the processing surfaces arranged to be opposite so as to be able to approach to and separate from each other, at least one of which rotates relative to the other, thereby forming a thin film fluid, and the materials to be processed are processed in the thin film fluid. The "process" includes not only a form in which the processed material is reacted, but also a form in which only mixing or dispersion is conducted without accompanying reaction.

As shown in FIG. 25, this apparatus includes a first holder 11, a second holder 21 arranged over the first holder 11, a fluid pressure imparting mechanism P and a surface-approaching pressure imparting mechanism. The surface-approaching pressure imparting mechanism is comprised of a spring 43 and an air introduction part 44.

The first holder 11 is provided with a first processing member 10 and a rotary shaft 50. The first processing member 10 is a circular body called a maintaining ring and provided with a mirror-polished first processing surface 1. The rotary shaft 50 is fixed to the center of the first holder 11 with a fixing device 81 such as a bolt and is connected at its rear end to a rotation drive device 82 (rotation drive mechanism) such as a motor, and the drive power of the rotation drive device 82 is transmitted to the first holder 11 thereby rotating the first holder 11. The first processing member 10 is integrated with the first holder 11 and rotated.

A receiving part capable of receiving the first processing member 10 is arranged on the upper part of the first holder 11, wherein the first processing member 10 has been fixed to the first holder 11 by insertion to the receiving part. The first processing member 10 has been fixed with a rotation preventing pin 83 so as not to be rotated relative to the first holder 11. However, a method such as fitting by burning may be used for fixing in place of the rotation-preventing pin 83 in order to prevent rotation.

The first processing surface 1 is exposed from the first holder 11 and faced with the second holder 21. The material for the first processing surface includes ceramics, sintered metal, abrasion-resistant steel, other hardened metals, and rigid materials subjected to lining, coating or plating.

The second holder 21 is provided with a second processing member 20, a first introduction part d1 for introducing a fluid from the inside of the processing member, a spring 43 as a surface-approaching pressure imparting mechanism, and an air introduction part 44.

The second processing member 20 is a circular member called a compression ring and includes a second processing surface 2 subjected to mirror polishing and a pressure-receiving surface 23 (referred to hereinafter as separation regulating surface 23) which is located inside the second processing surface 2 and adjacent to the second processing surface 2. As shown in the figure, the separation regulating surface 23 is an inclined surface. The method of the mirror polishing to which the second processing surface 2 was subjected is the same as that to the first processing surface 1. The material for the second processing member 20 may be the same as one for the first processing member 10. The separation regulating surface 23 is adjacent to the inner periphery 25 of the circular second processing member 20.

A ring-accepting part 41 is formed in the bottom (lower part) of the second holder 21, and the second processing member 20 together with an O-ring is accepted in the ring-accepting part 41. The second processing member 20 is accepted with a rotation preventive 84 so as not to be rotated relative to the second holder 21. The second processing surface 2 is exposed from the second holder 21. In this state, the second processing surface 2 is faced with the first processing surface 1 of the first processing member 10.

The ring-accepting part 41 arranged in the second holder 21 is a depression for mainly accepting that side of the second ring 20 which is opposite to the processing surface 2 and is a groove formed in a circular form when viewed in a plane.

The ring-accepting part 41 is formed in a larger size than the second ring 20 and accepts the second ring 20 with sufficient clearance between itself and the second ring 20.

By this clearance, the second processing member 20 is accepted in the ring-accepting part 41 such that it can be displaced not only in the axial direction of the accepting part 41 but also in a direction perpendicular to the axial direction. The second processing member 20 is accepted in the ring-accepting part 41 such that the central line (axial direction) of the second processing member 20 can be displaced so as not to be parallel to the axial direction of the ring-accepting part 41.

The spring 43 is arranged as a processing member-biasing part in at least the ring-accepting part 41 of the second holder 21. The spring 43 biases the second processing member 20 toward the first processing member 10. As another bias method, air pressure such as one in the air introduction part 44 or another pressurization means for applying fluid pressure may be used to bias the second processing member 20 held by the second holder 21 in the direction of approaching the second processing member 20 to the first processing member 10.

The surface-approaching pressure imparting mechanism such as the spring 43 or the air introduction part 44 biases each position (each position in the processing surface) in the circumferential direction of the second processing member 20 evenly toward the first processing member 10. The first introduction part d1 is arranged on the center of the second holder 21, and the fluid which is pressure-fed from the first introduction part d1 to the outer periphery of the processing member is first introduced into the space surrounded with the second processing member 20 held by the second holder 21, the first processing member 10, and the first holder 11 that holds the first processing member 10. Then, the feeding pressure (supply pressure) of the fluid by the fluid pressure imparting mechanism P is applied to the pressure-receiving surface 23 arranged in the second processing member 20, in the direction of separating the second processing member 20 from the first processing member 10 against the bias of the biasing part.

Figure 29:
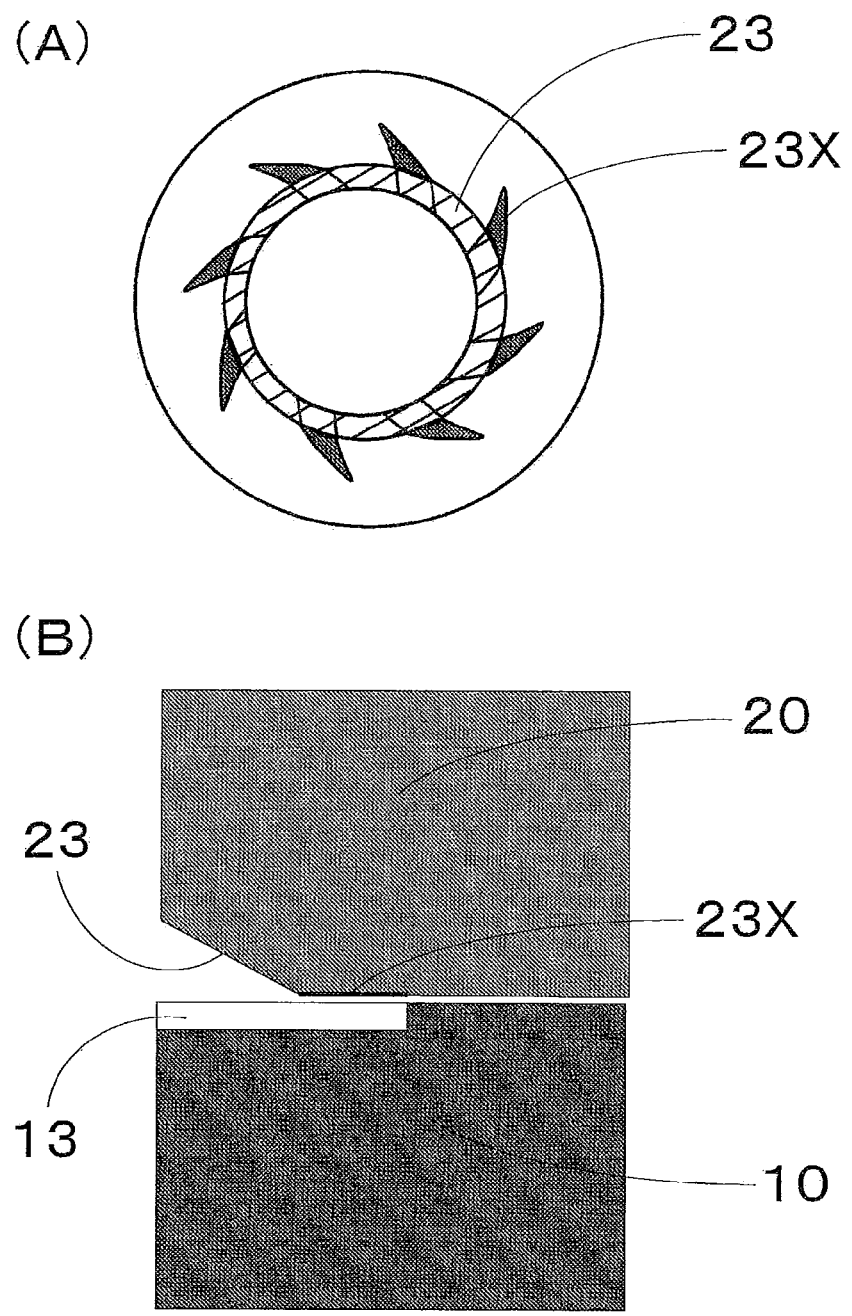
FIG. 29 is a diagram for explaining a pressure-receiving surface arranged in the processing member.

For simplifying the description of other components, only the pressure-receiving surface 23 is described, and as shown in FIG. 29(A) and FIG. 29(B), properly speaking, together with the pressure-receiving surface 23, apart 23X not provided with the pressure-receiving surface 23, out of the projected area in the axial direction relative to the second processing member 20 in a grooved depression 13 described later, serves as a pressure-receiving surface and receives the feeding pressure (supply pressure) of the fluid by the fluid pressure imparting mechanism P.

The apparatus may not be provided with the pressure-receiving surface 23. In this case, as shown in FIG. 26(A), the effect (micro-pump effect) of introduction of the processed fluid into the space between the processing surfaces formed by rotation of the first processing surface 1 provided with the grooved depression 13 formed to function the surface-approaching pressure imparting mechanism may be used. The micro-pump effect is an effect by which the fluid in the depression advances with speed toward the end in the circumferential direction by rotation of the first processing surface 1 and then the fluid sent to the end of the depression 13 further receives pressure in the direction of inner periphery of the depression 13 thereby finally receiving pressure in the direction of separating the processing surface and simultaneously introducing the fluid into the space between the processing surfaces. Even if the first processing surface 1 is not rotated, the pressure applied to the fluid in the depression 13 arranged in the first processing surface 1 finally acts on the second processing surface 2 to be separated as a pressure-receiving surface.

For the depression 13 arranged on the processing surface, its total area in the horizontal direction relative to the processing surface, and the depth, number, and shape of depressions, can be established depending on the physical properties of a fluid containing reactants and reaction products.

The pressure-receiving surface 23 and the depression 13 may be arranged in the same apparatus.

The depression 13 is a depression having a depth of 1 μm to 50 μm, preferably 3 μm to 20 μm, which is arranged on the processing surface, the total area thereof in the horizontal direction is, not particularly limited, 5% to 50%, preferably 15% to 25%, based on the whole of the processing surface, the number of depressions is, not particularly limited, 3 to 50, preferably 8 to 24, and the depression extends in a curved or spiral form on the processing surface or bends at a right angle, having depth changing continuously, so that fluids with high to low viscosity, even containing solids, can be introduced into the space between the processing surfaces stably by the micro-pump effect. The depressions arranged on the processing surface may be connected to one another or separated from one another in the side of introduction, that is, inside the processing surface.

As described above, the pressure-receiving surface 23 is inclined. This inclined surface (pressure-receiving surface 23) is formed such that the distance in the axial direction between the upstream end in the direction of flow of the processed fluid and the processing surface of the processing member provided with the depression 13 is longer than the distance between the downstream end and the aforesaid processing surface. The downstream end of this inclined surface in the direction of flow of the processed fluid is arranged preferably on the projected area in the axial direction of the depression 13.

Specifically, as shown in FIG. 28(A), a downstream end 60 of the inclined surface (pressure-receiving surface 23) is arranged on the projected area in the axial direction of the depression 13. The angle θ1 of the inclined surface to the second processing surface 2 is preferably in the range of 0.1° to 85°, more preferably in the range of 10° to 55°, still more preferably in the range of 15° to 45°. The angle θ1 can vary depending on properties of the processed product before processing. The downstream end 60 of the inclined surface is arranged in the region extending from the position apart downstream by 0.01 mm from an upstream end 13-b to the position apart upstream by 0.5 mm from a downstream end 13-c in the depression 13 arranged in the first processing surface 1. The downstream end 60 of the inclined surface is arranged more preferably in the region extending from the position apart downstream by 0.05 mm from the upstream end 13-b to the position apart upstream by 1.0 mm from the downstream end 13-c. Like the angle of the inclined surface, the position of the downstream end 60 can vary depending on properties of a material to be processed. As shown in FIG. 28(B), the inclined surface (pressure-receiving surface 23) can be a curved surface. The material to be processed can thereby be introduced more uniformly.

The depressions 13 may be connected to one another or separated from one another as described above. When the depressions 13 are separated, the upstream end at the innermost peripheral side of the first processing surface 1 is 13-b, and the upstream end at the outermost peripheral side of the first processing surface 1 is 13-c.

In the foregoing description, the depression 13 was formed on the first processing surface 1 and the pressure-receiving surface 23 was formed on the second processing surface 2. On the contrary, the depression 13 may be formed on the second processing surface 2, and the pressure-receiving surface 23 may be formed on the first processing surface 1.

Alternatively, the depression 13 is formed both on the first processing surface 1 and the second processing surface 2, and the depression 13 and the pressure-receiving surface 23 are alternately arranged in the circumferential direction of each of the respective processing surfaces 1 and 2, whereby the depression 13 formed on the first processing surface 1 and the pressure-receiving surface 23 formed on the second processing surface 2 are faced with each other and simultaneously the pressure-receiving surface 23 formed on the first processing surface 1 and the depression 13 formed on the second processing surface 2 are faced with each other.

A groove different from the depression 13 can be formed on the processing surface. Specifically, as shown in FIG. 16(F) and FIG. 16(G), a radially extending novel depression 14 instead of the depression 13 can be formed outward in the radial direction (FIG. 16(F)) or inward in the radial direction (FIG. 16(G)). This is advantageous for prolongation of retention time between the processing surfaces or for processing a highly viscous fluid.

The groove different from the depression 13 is not particularly limited with respect to the shape, area, number of depressions, and depth. The groove can be formed depending on the object.

The second introduction part d2 independent of the fluid flow path introduced into the processing surface and provided with the opening d20 leading to the space between the processing surfaces is formed on the second processing member 20.

Specifically, as shown in FIG. 27(A), the direction of introduction of the second introduction part d2 from the opening d20 of the second processing surface 2 is inclined at a predetermined elevation angle ($\theta 1$) relative to the second processing surface 2. The elevation angle ($\theta 1$) is arranged at more than 0° and less than 90°, and when the reaction speed is high, the angle ($\theta 1$) is preferably arranged at 1° to 45°.

As shown in FIG. 27(B), the direction of introduction of the second processing surface 2 from the opening d20 has directionality in a plane along the second processing surface 2. The direction of introduction of the second fluid is made apart in the outward direction in the component of the radial direction on the processing surface and in the forward direction in the component of the rotation direction of the fluid between the rotating processing surfaces. In other words, a predetermined angle ($\theta 2$) exists toward the rotation direction R from a reference line g drawn in the radially outward direction passing through the opening d20.

The angle ($\theta 2$) is also arranged at more than 0° and less than 90° at which the fluid is discharged from the opening d20 to the shaded region in FIG. 27(B). When the reaction speed is high, the angle ($\theta 2$) may be small, and when the reaction speed is low, the angle ($\theta 2$) is preferably arranged larger. This angle can vary depending on various conditions such as the type of fluid, the reaction speed, viscosity, and the rotation speed of the processing surface.

The bore diameter of the opening d20 is preferably 0.2 μm to 3000 μm, more preferably 10 μm to 1000 μm. When the diameter of the opening d20 does not substantially influence the flow of a fluid, the diameter of the second introduction part d2 may be established in this range. Depending on whether the fluid is intended to be transferred straight or dispersed, the shape of the opening d20 is preferably changed and can be changed depending on various conditions such as the type of fluid, reaction speed, viscosity, and rotation speed of the processing surface.

The opening d20 in the separate flow path may be arranged at a position nearer to the outer diameter than a position where the direction of flow upon introduction by the micro-pump effect from the depression arranged in the first processing surface 1 is converted into the direction of flow of a spiral laminar flow formed between the processing surfaces. That is, in FIG. 26(B), the distance n from the outermost side in the radial direction of the processing surface of the depression 13 arranged in the first processing surface 1 to the outside in the radial direction is preferably 0.5 mm or more. When a plurality of openings are arranged for the same fluid, the openings are arranged preferably concentrically. When a plurality of openings are arranged for different fluids, the openings are arranged preferably concentrically in positions different in radius. This is effective for the reactions such as cases (1) A+B→C and (2) C+D→E should occur in due order with avoiding a simultaneous reaction which should not occur, e.g., A+B+C→F, or for circumventing a problem that an intended reaction does not occur due to insufficient contact among the processed materials.

The processing members are dipped in a fluid, and a fluid obtained by mixing (reaction) between the processing surfaces can be directly introduced into a liquid outside the processing members or into a gas other than air.

Further, ultrasonic energy can be applied to the processed material just after being discharged from the space between the processing surfaces or from the processing surface.

Then, the case where temperature regulating mechanisms J1 and J2 are arranged in at least one of the first processing member 10 and the second processing member 20 for generating a temperature difference between the first processing surface 1 and the second processing surface 2 is described.

The temperature regulating mechanism is not particularly limited. A cooling part is arranged in the processing members 10 and 20 when cooling is intended. Specifically, a piping for passing ice water and various cooling media or a cooling element such as a Peltier device capable of electric or chemical cooling is attached to the processing members 10 and 20.

When heating is intended, a heating part is arranged in the processing members 10 and 20. Specifically, steam as a temperature regulating medium, a piping for passing various hot media, and a heating element such as an electric heater capable of electric or chemical heating is attached to the processing members 10 and 20.

An accepting part for a new temperature regulating medium capable of directly contacting with the processing members may be arranged in the ring-accepting part. The temperature of the processing surfaces can be regulated by heat conduction of the processing members. Alternatively, a cooling or heating element may be embedded in the processing members 10 and 20 and electrified, or a path for passing a cooling medium may be embedded, and a temperature regulating medium (cooling medium) is passed through the path, whereby the temperature of the processing surfaces can be regulated from the inside. By way of example, the temperature regulating mechanisms J1 and J2 which are pipes (jackets) arranged inside the processing members 10 and 20 are shown in FIG. 25.

By utilizing the temperature regulating mechanisms J1 and J2, the temperature of one of the processing surfaces is made higher than that of the other, to generate a temperature difference between the processing surfaces. For example, the first processing member 10 is heated to 60° C. by any of the methods, and the second processing member 20 is set at 15° C. by any of the methods. In this case, the temperature of the fluid introduced between the processing surfaces is changed from 60° C. to 15° C. in the direction from the first processing surface 1 to the second processing surface 2. That is, the fluid between the processing surfaces has a temperature gradient. The fluid between the processing surfaces initiates convection due to the temperature gradient, and a flow in a direction perpendicular to the processing surface is generated. The "flow in a direction perpendicular to the processing surface"

refers to a flow in which components flowing in a direction perpendicular to at least the processing surface are contained in flowing components.

Even when the first processing surface 1 or the second processing surface 2 rotates, the flow in a direction perpendicular to the processing surface is continued, and thus the flow in a direction perpendicular to the processing surface can be added to a spiral laminar flow between the processing surfaces caused by rotation of the processing surfaces. The temperature difference between the processing surfaces is 1° C. to 400° C., preferably 5° C. to 100° C.

The rotary shaft 50 in this apparatus is not limited to a vertically arranged shaft. For example, the rotation axis may be arranged at a slant. This is because the influence of gravity can be substantially eliminated by a thin fluid film formed between the processing surfaces 1 and 2 during processing. As shown in FIG. 25, the first introduction part d1 coincides with the shaft center of the second ring 20 in the second holder 21 and extends vertically. However, the first introduction part d1 is not limited to the one coinciding with the shaft center of the second ring 20, and as far as it can supply the first processing fluid to the space surrounded with the rings 10 and 20, the part d1 may be arranged at a position outside the shaft center in the central part 22 of the second holder 21 and may extend obliquely as well as vertically. Regardless of the angle at which the part d1 is arranged, a flow perpendicular to the processing surface can be generated by the temperature gradient between the processing surfaces.

When the temperature gradient of the fluid between the processing surfaces is low, heat conduction merely occurs in the fluid, but when the temperature gradient exceeds a certain border value, a phenomenon called Benard convection is generated in the fluid. This phenomenon is governed by Rayleigh number Ra, a dimensionless number, defined by the following equation:

$$Ra = L^3 \cdot g \cdot \beta \cdot \Delta T / (\alpha \cdot v)$$

wherein L is the distance between processing surfaces; g is gravitational acceleration; β is coefficient of volumetric thermal expansion of fluid; ν is dynamic viscosity of fluid; α is heat diffusivity of fluid; and ΔT is temperature difference between processing surfaces. The critical Rayleigh number at which Benard convection is initiated to occur, although varying depending on the properties of a boundary phase between the processing surface and the processed fluid, is regarded as about 1700. At a value higher than this value, Benard convection occurs. Under the condition where the Rayleigh number Ra is a large value of about $10^{10}$ or more, the fluid becomes a turbulent flow. That is, the temperature difference ΔT between the processing surfaces or the distance L between the processing surfaces in this apparatus are regulated such that the Rayleigh number Ra becomes 1700 or more, whereby a flow perpendicular to the processing surface can be generated between the processing surfaces, and the mixing (reaction) procedures described above can be carried out.

However, the Benard convection hardly occurs when the distance between the processing surfaces is about 1 μm to 10 μm. Strictly, when the Rayleigh number is applied to a fluid between the processing surfaces having a distance of 10 μm or less therebetween to examine the conditions under which Benard convection is generated, the temperature difference should be several thousands of degrees or more in the case of water, which is practically difficult. Benard convection is one related to density difference in temperature gradient of a fluid, that is, to gravity. When the distance between the processing surfaces is 10 μm or less, there is high possibility of minute gravity field, and in such a place, buoyancy convection is suppressed. That is, it is the case where the distance between the processing surfaces is 10 μm or more that Benard convection actually occurs.

When the distance between the processing surfaces is about 1 μm to 10 μm, convection is generated not due to density difference but due to surface tension difference of a fluid resulting from temperature gradient. Such convection is Marangoni convection. This phenomenon is governed by Marangoni number Ma, a dimensionless number, defined by the following equation:

$$Ma = \sigma \cdot \Delta T \cdot L / (\rho \cdot v \cdot \alpha)$$

wherein L is the distance between processing surfaces; ν is dynamic viscosity of fluid; α is heat diffusivity of fluid; ΔT is temperature difference between processing surfaces; ρ is density of fluid; and σ is temperature coefficient of surface tension (temperature gradient of surface tension). The critical Marangoni number at which Marangoni convection is initiated to occur is about 80, and under the conditions where the Marangoni number is higher than this value, Marangoni convection occurs. That is, the temperature difference ΔT between the processing surfaces or the distance L between the processing surfaces in this apparatus is regulated such that the Marangoni number Ma becomes 80 or more, whereby a flow perpendicular to the processing surface can be generated between the processing surfaces even if the distance therebetween is as small as 10 μm or less, and the mixing (reaction) procedures described above can be carried out.

For calculation of Rayleigh number, the following equations were used.

$$Ra = \frac{L^3 \cdot \beta \cdot g}{v \cdot \alpha} \Delta T \quad \text{[Equation 1]}$$

$$\Delta T = (T_1 - T_0)$$

$$\alpha = \frac{k}{\rho \cdot C_p}$$

L is the distance (m) between processing surfaces; β is coefficient of volumetric thermal expansion (1/K); g is gravitational acceleration (m/s²); ν is dynamic viscosity (m²/s); α is heat diffusivity (m²/s); ΔT is temperature difference (K) between processing surfaces; ρ is density (kg/m³); Cp is isobaric specific heat (J/kg·K); k is heat conductivity (W/m·K); $T_1$ is temperature (K) at high temperature side in processing surface; and $T_0$ is temperature (K) at low temperature side in processing surface.

When the Rayleigh number at which Benard convection is initiated to occur is the critical Rayleigh number $Ra_C$, the temperature difference $\Delta T_{C1}$ is determined as follows:

$$\Delta T_{C1} = \frac{Ra_C \cdot v \cdot \alpha}{L^3 \cdot \beta \cdot g} \quad \text{[Equation 2]}$$

For calculation of Marangoni number, the following equations were used.

$$Ma = \frac{\sigma_t \cdot L}{\rho \cdot v \cdot \alpha} \Delta T \quad \text{[Equation 3]}$$

$$\Delta T = (T_1 - T_0)$$

$$\alpha = \frac{k}{\rho \cdot C_p}$$

L is the distance (m) between processing surfaces; ν is dynamic viscosity (m²/s); α is heat diffusivity (m²/s); ΔT is temperature difference (K) between processing surfaces; ρ is density (kg/m³); Cp is isobaric specific heat (J/kg·K); k is heat conductivity (W/m·K); $\sigma_t$ is surface tension temperature coefficient (N/m·k); $T_1$ is temperature (K) of a high-temperature surface out of processing surface; and $T_0$ is temperature (K) of a low-temperature surface out of processing surface.

When the Marangoni number at which Marangoni convection is initiated to occur is the critical Marangoni number $Ma_C$, the temperature difference $\Delta T_{C2}$ is determined as follows:

$$\Delta T_{C2} = \frac{Ma_C \cdot \rho \cdot \nu \cdot \alpha}{\sigma_t \cdot L} \qquad \text{[Equation 4]}$$

In the present invention, the method to maintain the space between the processing surfaces of the fluid processing apparatus is not limited to one that utilizes pressure balance. The distance between the processing surfaces may be set mechanically, or the distance between the processing surfaces may be maintained by utilizing principles such as magnetic repulsion, magnetic floating, and electromagnetic repulsion. The materials for the processing surfaces 1 and 2 arranged to be opposite to each other so as to be able to approach to and separate from each other, at least one of which rotates relative to the other, are not particularly limited, and the processing surfaces 1 and 2 can be prepared by ceramics, sintered metals, abrasion-resistant steels, other metals subjected to hardening treatment, or hard materials subjected to lining, coating or plating. In the present invention, the distance between the processing surfaces 1 and 2 arranged to be opposite to each other so as to be able to approach to and separate from each other, at least one of which rotates relative to the other, is 0.1 μm to 100 μm, particularly preferably 1 μm to 10 μm.

Reaction such as separation, deposition, or crystallization occurs under forced uniform mixing between the processing surfaces arranged to be opposite to each other so as to be able to approach to and separate from each other, at least one of which rotates relative to the other. A particle size and monodispersity of microparticles can be controlled by appropriately arranging a revolution number of the processing members 10 and 20, a flow rate, a distance between the processing surfaces, concentration of a material, a dispersion medium, and so forth.

In the present invention, the mixing of fluids in the mixed flow path can be performed under the control of a laminar flow or under the control of a turbulent flow.

Further, the space between the processing surfaces may be heated or cooled, may be irradiated with microwaves. The space between the processing surfaces may also be irradiated with ultraviolet ray (UV) or may be supplied with ultrasonic energy. Particularly, when a temperature difference is set between the first processing surface 1 and the second processing surface 2, there is an advantage that the reaction can be promoted, since convection can be generated in a thin film fluid.

Specifically for heating or cooling, at least one of or both the processing member 10 and the processing member 20 can be provided, for example, with a heater or a jacket for passing a heat medium or a cooling medium, to heat or cool the thin film fluid. Alternatively, at least one of or both the processing member 10 and the processing member 20 can be provided with a microwave generator such as a magnetron for irradiation with microwave, thereby heating the processed fluid to promote the reaction. For irradiation with ultraviolet ray (UV), at least one of or both the processing member 10 and the processing member 20 may be provided, for example, with an element such as a UV lamp to irradiate the thin film fluid with ultraviolet (UV) from the corresponding processing surface. For supplying with ultrasonic energy, at least one of or both the processing member 10 and the processing member 20 can be provided, for example, with an ultrasonic wave oscillator. Alternatively, the mixing and reaction of fluids between the processing surfaces may be conducted in an ultrasonic wave atmosphere in a container.

The separation is conducted in a container capable of securing a depressurized or vacuum state, and at least a secondary side at which the fluid after processing is discharged can be depressurized or made vacuum to remove a gas generated during the separating reaction, to remove a gas contained in the fluid, or to remove the solvent of the fluid. Even when the separating of microparticles and removal of the solvent are simultaneously conducted, the fluid containing microparticles separated between the processing surfaces can thereby be discharged in an atomized state from the processing surfaces, so that the surface area of the fluid is increased and the efficiency of removal of the solvent is very high. Accordingly, processing of preparing copper phthalocyanine microparticles and removal of the solvent can be effected in substantially one step more easily than conventional.

As described above, the processing apparatus can be provided with a third introduction part d3 in addition to the first introduction part d1 and the second introduction part d2. In this case, for example, an poor solvent, a fluid containing a pigment solution, a surfactant solution, a surface modifying agent, and the like can be introduced separately through the respective introduction parts into the processing apparatus. By doing so, the concentration and pressure of each solution can be controlled separately, and the reaction of producing microparticles can be regulated more accurately. When the processing apparatus is provided with four or more introduction parts, the foregoing applies and fluids to be introduced into the processing apparatus can be subdivided in this manner.

The forced ultrathin film rotary reaction method can freely change the Reynolds number of its minute flow path and can thus form microparticles which are monodisperse and excellent in re-dispersibility, having an objective particle size, particle shape and crystal form. By their self-dischargeability, there is no clogging with products even in a reaction accompanied by separation, and a large pressure is not necessary. Accordingly, the method in the present invention is superior in safety, hardly mixed in with impurities caused by the apparatus, excellent in washing performance, thus can stably produce microparticles. In addition, the method can be scaled up depending on the intended amount of production, thus can provide a highly productive method for producing microparticles.

With regard to the method for surface modification of pigment microparticles in the present invention, one illustrative example as to a reaction to produce pigment microparticles and a method for surface modification thereof will be described in more detail hereunder.

It is to be noted here that the term "a modification group" in the present invention means "a functional group" or "a radical" that is introduced or bonded at least onto particle surface. This includes a functional group or a radical that is contained in a substance that is present on particle surface by adsorption or the like.

First, a fluid containing a solvent capable of being a poor solvent to a pigment solution is introduced as a first fluid through one flow path, that is, the first introduction part d1, into the space between the processing surfaces 1 and 2 arranged to be opposite to each other so as to be able to approach to and separate from each other, at least one of which rotates relative to the other, thereby forming a thin film fluid comprised of the first fluid between the processing surfaces.

Then, a fluid containing a pigment solution having a pigment dissolved therein is introduced as a second fluid directly into the thin film fluid comprised of the first fluid through another flow path, that is, the second introduction part d2.

As described above, the first fluid and the second fluid are instantly mixed with maintaining a state of a ultrathin film between the processing surfaces 1 and 2, the distance of which is regulated by the pressure balance between the supply pressure of the fluids and the pressure exerted between the rotating processing surfaces, thereby enabling to carry out the reaction producing the pigment microparticles.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

A combination of the first fluid and the second fluid is not particularly limited; a fluid that contains a pigment solution and a solvent capable of being a poor solvent that has lower solubility to the pigment than the pigment solution may be used to effect the present invention. It is to be noted here that "a good solvent" means that solubility of raw material microparticles is preferably 0.1% or higher by mass, or more preferably 0.5% or higher by mass, or still more preferably 1% or higher by mass, and "a poor solvent" means that solubility of raw material microparticles is preferably 0.01% or lower by mass, or more preferably 0.005% or lower by mass, or still more preferably 0.001% or lower by mass.

For example, a solvent for dissolving a pigment is not particularly limited, and in the case of an acidic aqueous solution, for example, sulfuric acid, hydrochloric acid, nitric acid or trifluoroacetic acid can be used. Further, amide solvents such as 1-methyl-2-pyrrolidinone, 1,3-dimethyl-2-imidazolidinone, 2-pyrrolidinone, ε-caprolactam, formamide, N-methylformamide, N,N-dimethylformamide, acetamide, N-methylacetamide, N,N-dimethylacetamide, N-methylpropanamide, and hexamethyl phosphoric triamide; dimethyl sulfoxide; pyridine; or their mixture can be used. Moreover, a pigment is dissolved in an organic solvent to which a solution containing an alkaline or acid substance is added, and that can be used as a pigment solution. An alkaline substance which is added to the organic solvent includes sodium hydroxide, potassium hydroxide, sodium methoxide, and sodium ethoxide, or the like. An acid substance, as the same described above, includes sulfuric acid, hydrochloric acid, nitric acid, trifluoroacetic acid, phosphoric acid, or the like.

A solvent capable of being a poor solvent to effect separating of a pigment is not particularly limited. A solvent having lower solubility to the pigment than the solvent in which the pigment is dissolved can be used. It is preferably selected from water, alcohol solvents, ketone solvents, ether solvents, aromatic solvents, carbon disulfide, aliphatic solvents, nitrile solvents, sulfoxide solvents, halogen solvents, ester solvents, ionic solutions, and mixed solvents of two or more thereof.

As described above, the first and second fluids are instantly mixed in an ultrathin film state kept between the processing surfaces 1 and 2, the distance of which is fixed by the pressure balance between the supply pressure of the fluid and the pressure exerted between the processing surfaces 1 and 2, thereby effecting the reaction of producing pigment microparticles.

(Surface Modification of Pigment Microparticles)

Surface modification of the obtained microparticles may be done simultaneously with separating of microparticles between the processing surfaces 1 and 2 or immediately after the separating, or after the microparticles are discharged from between the processing surfaces 1 and 2. With these operations, at least pigment surface is modified by introducing a modification group or the like.

One illustrative example of the case that surface modification of pigment microparticles obtained in the foregoing production method is effected between the processing surfaces 1 and 2 will be described hereunder.

Introduction of a modification group onto at least the surface of pigment microparticles can be carried out by containing a surface-modifying agent in a fluid to be introduced between the processing surfaces 1 and 2. The surface-modifying agent may be contained in any one of a pigment solution (a first fluid) and a poor solvent (a second fluid) or in both of them, or may be contained in a third fluid other than the pigment solution and the poor solvent. A combination of the first fluid and the second fluid is not particularly limited to said examples.

As mentioned above, a minute space of 1 mm or less is kept between two processing surfaces being capable of approaching to and separating from each other and rotating relative to each other; by using this minute space kept between two processing surfaces as a flow path of the fluid to be processed, a thin film fluid (forced thin film) of a fluid to be processed is formed. It is to be noted here that the term "thin film fluid (forced thin film)" means a flow in a state of a thin film not having a free surface.

In this thin film fluid (forced thin film), the second fluid diffuses rapidly and completely into the first fluid. In this thin film fluid (forced thin film), it is considered that there is no effect by gravity, and in addition, a pressure field and a velocity gradient of the fluids have an effect to facilitate diffusion and a reaction rate, so that a revolutionary reaction field for surface modification with dramatically high efficiency is formed. Accordingly, it is considered that separating of the pigment microparticles and surface modification of the pigment microparticles can be effected continuously and efficiently.

Specific examples of the surface modification group and the surface modifying agent will be described hereunder. However, the present invention is not limited to the following examples.

A kind of the modification group that is introduced at least onto pigment surface as the surface modification group is not particularly limited; when the aim of surface treatment is to improve dispersibility, the modification group may be selected according to, for example, a solvent to be used for dispersion and a dispersing agent. An example of the modification group includes a modification group having a polar group such as an acid group and a basic group; a salt structure of the foregoing polar groups; any one of a highly polar atom such as oxygen and sulfur, and a highly polariziability structure introduced with an aromatic ring or the like, or both; a hydrogen-bonding group, a hetero ring, and an aromatic ring. Example of the acid group includes a hydroxy group, a sulfonic acid group (sulfo group), a carboxylic acid group, a phosphoric acid group, and a boric acid group. Example of the basic group includes an amino group. An example of the hydrogen-bonding group includes a urethane moiety, a thiourethane moiety, a urea moiety, and a thiourea moiety.

Other acid group (acid functional group) is not particularly limited; example thereof includes —SO$_2$NHCH$_2$SO$_3$H, —SO$_2$NH(CH$_2$)$_2$SO$_3$H, —SO$_2$NH(CH$_2$)$_3$SO$_3$H, —SO$_2$NHC$_6$H$_4$SO$_3$H, —CH$_2$NHCOCH$_2$NHCH$_2$SO$_3$H, —CH$_2$NHCOCH$_2$NH(CH$_2$)$_2$SO$_3$H, —CH$_2$NHCOCH$_2$NH(CH$_2$)$_3$SO$_3$H, —CH$_2$NHCOCH$_2$NHC$_6$H$_4$SO$_3$H, —CONHCH$_2$SO$_3$H, —CONH(CH$_2$)$_2$SO$_3$H, —CONH(CH$_2$)$_3$SO$_3$H, —CONHC$_6$H$_4$SO$_3$H, —SO$_2$NH(CH$_2$)$_4$COOH, —SO$_2$NH(CH$_2$)$_6$COOH, —SO$_2$NHC$_6$H$_4$COOH, —CH$_2$NHCOCH$_2$NH(CH$_2$)$_4$COOH, —CH$_2$NHCOCH$_2$NH(CH$_2$)$_6$COOH, —CH$_2$NHCOCH$_2$NHC$_6$H$_4$COOH, —CONH(CH$_2$)$_4$COOH, —CONH(CH$_2$)$_6$COOH, and —CONHC$_6$H$_4$COOH.

For example, when surface of pigment microparticles is treated with an acid group, for example by sulfonation, surface treatment may be effected by including a sulfonating agent in the first fluid or in the second fluid as the surface modifying agent. When a solution that contains a sulfonating agent for pigment and is obtained by dissolving a pigment into a solution of the sulfonating agent is mixed between the processing surfaces 1 and 2 rotating relative to each other with an at least one solvent selected from the solvent being capable of a poor solvent, such as for example, water such as ion-exchanged water and ultrapure water, an alcohol such as methanol and ethanol, or a ketone such as acetone and methyl ethyl ketone, pigment microparticles whose surface is introduced with the sulfo group can be easily formed; and then a disperse solution of pigment microparticles whose surface is introduced with the sulfo group is discharged from the space between the processing surfaces 1 and 2.

The sulfonating agent is not particularly limited; and an example of the agent includes fuming sulfuric acid or concentrated sulfuric acid, chlorosulfuric acid, sulfur trioxide, fluorosulfuric acid, amidosulfuric acid, a complex of sulfur trioxide with a tertiary amine, an N-alkylsulfamide, sulfamic acid or a sulfonated pyridine salt, sulfur trioxide-pyridine complex, sulfur trioxide-dimethylformamide complex, sulfur trioxide-triethylamine complex, sulfur trioxide-trimethylamine complex, dioxane.2SO$_3$, and dioxane.SO$_3$.

A combination of the first fluid and the second fluid is not particularly limited. The sulfonating agent may be contained in the pigment solution, in the poor solvent, or in both, or may be contained in a third fluid other than the pigment solution and the poor solvent. An illustrative example includes a combination of the following two fluids; a solvent being capable of a poor solvent that separates a pigment, such as pure water and an alcohol, is used as the first fluid, while a pigment solution of a sulfonating agent, such as a pigment solution obtained by dissolving the pigment into fuming sulfuric acid, concentrated sulfuric acid, chlorosulfuric acid, or a mixture thereof, is used as the second fluid. Other example includes a combination of the following two fluids; a fluid containing a sulfonating agent, obtained by dissolving or dispersing into water or an alcohol a sulfonating agent such as amidosulfuric acid, sulfur trioxide, an alkylsulfamide, a sulfonated pyridine salt, sulfur trioxide-pyridine complex, sulfur trioxide-dimethyl formamide complex, sulfur trioxide-triethylamine complex, sulfur trioxide-trimethylamine complex, dioxane.2SO$_3$, and dioxane.SO$_3$, or a mixture thereof, is used as the poor solvent, and a pigment solution, not containing a sulfonating agent and obtained by dissolving the pigment into a solvent such as N-methyl pyrrolidone (NMP), is used as the second fluid.

When treatment other than sulfonation treatment, for example, treatment with a basic group is intended, treatment with a basic group can be easily effected by, for example, a method in which a basic compound is included in a first fluid or in a second fluid, or a basic compound is included in a third fluid.

The basic compound is not particularly limited; an example of the compound includes a salt of an alkaline metal such as Na and K, specifically a salt of an alkaline metal, such as sodium hydroxide, potassium hydroxide, sodium methoxide, and sodium ethoxide, or NH$_3$ and an organic amine. Any of a primary amine, a secondary amine, a tertiary amine, and a quaternary amine can be used as the organic amine. Specific example of the organic amine includes a primary amine such as ethyl amine, propyl amine, isopropyl amine, butyl amine, isobutyl amine, sec-butyl amine, ethanol amine, isopropanol amine, octyl amine, dodecyl amine, lauryl amine, stearyl amine, and oleyl amine; a secondary amine such as dimethyl amine, diethyl amine, dipropyl amine, diethanol amine, and distearyl amine; a tertiary amine such as trimethyl amine, triethyl amine, triethanol amine, triisopropanol amine, dimethyl ethanol amine, diethyl ethanol amine, n-butyl diethanol amine, N,N-dimethyl-1,3-diaminopropane, N,N-diethyl-1,3-diaminopropane, dimethyl octyl amine, dimethyl decyl amine, dimethyl lauryl amine, dimethyl myristyl amine, dimethyl palmityl amine, dimethyl stearyl amine, dimethyl behenyl amine, dilauryl monomethyl amine, and trioctyl amine; and a quaternary amine such as dimethyl didodecyl ammonium chloride, dimethyl dioleyl ammonium chloride, and trimethyl stearyl ammonium chloride.

A combination of the first fluid and the second fluid is not particularly limited. The basic compound may be contained in the pigment solution, in the poor solvent, or in both, or may be contained in a third fluid other than the pigment solution and the poor solvent. An illustrative example includes a combination of the following two fluids; a solvent being capable of a poor solvent that separates the pigment, such as pure water and an alcohol, is used as the first fluid, while a pigment solution of the basic compound, such as a pigment solution obtained by dissolving the pigment into the foregoing basic compound or a mixture thereof, is used as the second fluid. Other example includes a combination of the following two fluids; a fluid containing a basic compound and obtained by dissolving or dispersing the basic compound or a mixture thereof into water, an alcohol, or the like, is used as the poor solvent, and a pigment solution, obtained by dissolving a pigment into a solvent such as N-methylpyrrolidone (NMP) not containing the basic compound, is used as the second fluid. Still other example includes a solvent being capable of a poor solvent that can separate a pigment, such as pure water and an alcohol, is used as the first fluid, and a pigment solution, obtained by dissolving a pigment and containing a basic compound such as sodium hydroxide, potassium hydroxide, sodium methoxide, and sodium ethoxide, is used as the second fluid. Further still other example includes a fluid, containing a basic compound and obtained by dissolving or dispersing the basic compound or a mixture thereof in water, an alcohol, or the like, is used as the poor solvent, and a pigment solution obtained by dissolving the pigment into a solvent not containing a basic material such as N-methylpyrrolidone (NMP), pyridine, NMP-pyridine mixed solvent, or the like, is used as the second fluid.

To effect this treatment with a basic group, pH of a mixture fluid to effect separating of pigment microparticles is controlled at preferably 7 or higher before the treatment, or pH of a fluid discharged from the space between the processing surfaces 1 and 2 is controlled at preferably 7 or higher before the treatment. Especially in the case that a hydroxy group is introduced onto surface of pigment microparticles, the hydroxy group can be easily introduced by using a basic compound such as sodium hydroxide and potassium hydroxide in the foregoing method for producing pigment microparticles.

In addition, a basic compound may be further added into a disperse body of a pigment whose surface has been treated with sulfonation by the foregoing method, thereby forming a modification group having a salt structure obtained by neutralizing at least a part of the acid group previously formed on the pigment surface with the basic compound, or alternatively, the treatment with a basic group may be effected by displacing the acid group with the basic group. Still in addition, the neutralization (salt formation) by the basic compound may be effected between the processing surfaces 1 and 2, by such a method that uses, for example, a third flow path in the fluid processing apparatus.

As to an example of other modification groups, in the case that surface modification of pigment microparticles is effected by modification groups such as, for example, —OM, —COOM, —CO—, —$SO_3M$, —$SO_2NH_2$, —$RSO_2M$, —$PO_3HM$, —$PO_3M_2$, —$SO_2NHCOR$, —$NH_3$, —$NH_2$, and —$NR_3$ (in the formulae, M represents a hydrogen atom, an alkaline metal, an ammonium, or an organic ammonium; R represents an alkyl group having 1 to 12 carbon atoms, a phenyl group optionally containing a substituent group, a naphthyl group optionally containing a substituent group, an alkylene group having 1 to 12 carbon atoms, a phenylene group optionally containing a substituent group, or a naphthylene group optionally containing a substituent group), a substance that contains the above functional group may be used. The modifying agent containing the above functional group is not particularly limited; and an example of the agent includes an aqueous polymer such as polyethylene glycol, polyvinyl alcohol, polyvinyl pyrrolidone, sodium polyacrylate, sodium alginate, sodium carboxymethyl cellulose, xanthan gum, carrageenan, pullulan, and gelatin. A combination of the first fluid and the second fluid is not particularly limited. The aqueous polymer may be contained in the pigment solution, in the poor solvent, or in both, or may be contained in a third fluid other than the pigment solution and the poor solvent.

When surface treatment with the aim other than to improve dispersion is intended, for example, pigment surface is intended to be made water-repellent, lipophilic, or friendly to an organic solvent, the first fluid or the second fluid is made to contain a surface modifying agent which contains a lipophilic functional group, thereby effecting hydrohobizing treatment by introducing the lipophilic functional group as the modification group onto surface of the pigment microparticles that are discharged from the space between the processing surfaces 1 and 2. The lipophilic functional group is not particularly limited; the group may be selected, according to aimed pigment microparticles and a solvent to be used, from the group such as —$C_nH_{2n+1}$ and —$C_6H_5$. The modifying agent that contains the lipophilic group is not particularly limited; an example of the agent includes: a paraffin such as petrolatum, paraffin wax, and liquid paraffin: silicone oil other than the foregoing polyether-modified silicone, such as dimethyl silicone oil, methyl phenyl silicone oil, an alkyl-modified silicone oil, a polyether-modified silicone oil, a fluorosilicone oil, and a silicone oil having a terminal functional group: a long-chain fatty acid such as caprylic acid, capric acid, lauric acid, palmitic acid, stearic acid, and oleic acid, or an ester thereof; and a natural oil and fat such as beef tallow, lard, cod oil, coconut oil, and palm oil. A combination of the first fluid and the second fluid is not particularly limited. The surface modifying agent having the lipophilic functional group may be contained in the pigment solution, in the poor solvent, or in both, or may be contained in a third fluid other than the pigment solution and the poor solvent. An illustrative example includes a combination of the following two fluids; a solvent being capable of a poor solvent that separates the pigment, such as pure water and an alcohol, is used as the first fluid, while a fluid that contains the surface modifying agent having the foregoing lipophilic functional group into a pigment solution obtained by dissolving the pigment thereinto, is used as the second fluid. Other example includes a fluid that contains a substance having the lipophilic functional group and is obtained by dissolving or dispersing the surface modifying agent having the lipophilic functional group or a mixture thereof into water, an alcohol, or the like, is used as the poor solvent, and a pigment solution obtained by dissolving the pigment into a solvent not containing the substance having the lipophilic functional group such as N-methylpyrrolidone (NMP), pyridine, mixed NMP-pyridine solvent, or the like, is used as the second fluid.

When surface treatment to attach a resin, as the surface modifying agent, to surface of pigment microparticles is intended to be made, the first fluid or the second fluid is made to contain a substance containing the resin, thereby effecting hydrophilizing treatment by covering with the resin at least a part of surface of the pigment microparticles that are discharged from between the processing surfaces 1 and 2. The resin for this purpose is not particularly limited; the resin may be selected according to aimed pigment microparticles and a solvent to be used. An illustrative example of rosin resins and their derivatives is a polymer of one kind of resin acid extracted from a Pinaceae plant, i.e., abietic acid and its analog, such as a mixture constituted of an ingredient containing dihydroabetic acid, dehydroabietic acid, abetic anhydride, or the like. An illustrative example of a terpene resin and its derivative is a thermoplastic oligomer obtained by purification and polymerization of a turpentine oil obtained from a pine tree or an orange oil obtained from a citrus peel, wherein the turpentine oil is a mixture mainly comprised of α-pinene and β-pinene and an orange oil is a mixture mainly comprised of limonene. An illustrative example of shellac resins and their derivatives is a polymer from a mixture of many resin acids extracted from a secretion from laccifer lacca, or in more detail, a resin or the like obtained by forming an ester bond of an acid such as aleuritic acid, jararic acid, and laccijararic acid. Combination of the first fluid and the second fluid is not particularly limited. The resin may be contained in the pigment solution, in the poor solvent, or in both, or may be contained in a third fluid other than the pigment solution and the poor solvent. An illustrative example includes a combination of the following two fluids; a solvent being capable of a poor solvent that separates the pigment, such as pure water and an alcohol, is used as the first fluid, while a fluid of a pigment solution, obtained by dissolving the pigment thereinto and containing the resin therein, is used as the second fluid. Other example includes a fluid containing the resin and obtained by dissolving or dispersing the resin or a mixture of the resins into water, an alcohol, or the like, is used as the poor solvent, and a pigment solution, not containing the resin and obtained by dissolving the pigment into N-methylpyrrolidone (NMP), pyridine, mixed NMP-pyridine solvent, or the like, is used as the second fluid.

The foregoing surface treatment may be effected not only when surface modification of pigment microparticles are subjected between the processing surfaces 1 and 2, as explained above, but also after the pigment microparticles are discharged from the space between the processing surfaces 1 and 2. In this case, a substance to be used for surface treatment of the pigment microparticles is added into the fluid that contains the pigment microparticles, after the fluid thereof is discharged from the space between the processing surfaces 1 and 2, and then the resulting mixture is subjected to stirring or the like to effect surface treatment of the pigment microparticles. Alternatively, surface treatment may be effected by adding a substance to be used for surface treatment into a fluid that contains pigment microparticles and is obtained by removing impurities therefrom by a dialysis tube or the like after being discharged. Alternatively, the surface treatment may be effected on powdered pigment microparticles obtained by drying a fluid component that is discharged from processing surfaces 1 and 2 and contains pigment microparticles. Specifically, the obtained powdered pigment microparticles are dispersed into an intended solvent and then the resulting disperse solution is subjected to stirring or the like after a substance to be used for the surface treatment is added thereinto to effect the surface treatment.

EXAMPLES

Examples of surface modification according to the present invention will be shown hereunder on the copper phthalocyanine microparticles obtained by using an equipment based on the same principle as that described in International Patent Laid-Open Publication No. 2009/8388 (Patent Document 6) filed by the present applicant. However, the present invention is not limited to Examples shown below.

A copper phthalocyanine solution which a copper phthalocyanine was dissolved and a solvent are allowed to join together in a film fluid (a forced thin film) formed between the processing surfaces 1 and 2 arranged to be opposite to each other so as to be able to approach to and separate from each other, at least one of which rotates relative to the other, in the uniformly mixing and stirring reaction apparatus as shown in FIG. 1(A), thereby separating copper phthalocyanine under uniform mixing in the film fluid (the forced thin film).

The term "thin film fluid (forced thin film)" used in this Example means the thin film wherein flow path of the fluid is set by the processing surfaces 1 and 2 and the fluid is in the state of its surface being not contacting to air (not having free surface) in the flow path, in other words, the thin film wherein the space between the processing surfaces 1 and 2 is filled up with the fluid.

In the following examples, the term "from the center" means "through the first introduction part d1" in the processing apparatus shown in FIG. 1(A), the first fluid refers to the first processed fluid, and the second fluid refers to the second processed fluid introduced "through the second introduction part d2" in the processing apparatus shown in FIG. 1(A). Additionally, "part" indicates "parts by weight" in this context.

[Volume-Average Particle Size]

Particle size distribution was measured by using a particle size distribution measuring instrument (trade name: Nanotrac UPA-EX150, manufactured by Nikkiso Co., Ltd.), and the volume-average particle size was adopted.

(Measurement of pH)

Measurement of pH in the range between 0.00 and 14.00 was made with D-51 (manufactured by Horiba, Ltd.).

(Ion Chromatography)
Instrument used:
Pump: LC-10A (manufactured by Shimadzu Corporation)
Detector: ICA-3030 (manufactured by DKK-TOA Corporation)
Column: IonPac AS4A-SC+ IonPac AS4A-SC (manufactured by Nippon Dionex K. K.)
Suppressor: ASRS-ULTRA4 mm (40 mA) (manufactured by Nippon Dionex K. K.)
Eluent: 2.3 mM $Na_2CO_3$ + 2.1 mM $NaHCO_3$
Flow rate: 1.5 mL/minute
Sample introduction amount: 5 μL
(XPS)
Instrument: ESCA 5600CI (manufactured by ULVAC-PHI Inc.)
X-Ray source: MgKα 400 W
(NMR)
Instrument: JNM-LA500 (manufactured by JEOL Ltd.)
Solvent: dimethyl sulfoxide-d6 (DMSO-d6)
Bace peak: 2.49 ppm (DMSO)
Measurement temperature: 120° C.
(IR)
Instrument: FT/IR-4100 type A (manufactured by JASCO Corp.)
ATR method: resolution of 4.0 $cm^{-1}$
Number of accumulation: 16 times
(TOF-SIMS)
Instrument: PHI TRIFT IV (manufactured by ULVAC-PHI Inc.)
Primary ion: $Bi_3^{2+}$
Primary ion irradiation area: 100×100 $\mu m^2$
Time of accumulation: 3 minutes Example 1

Figure 30:
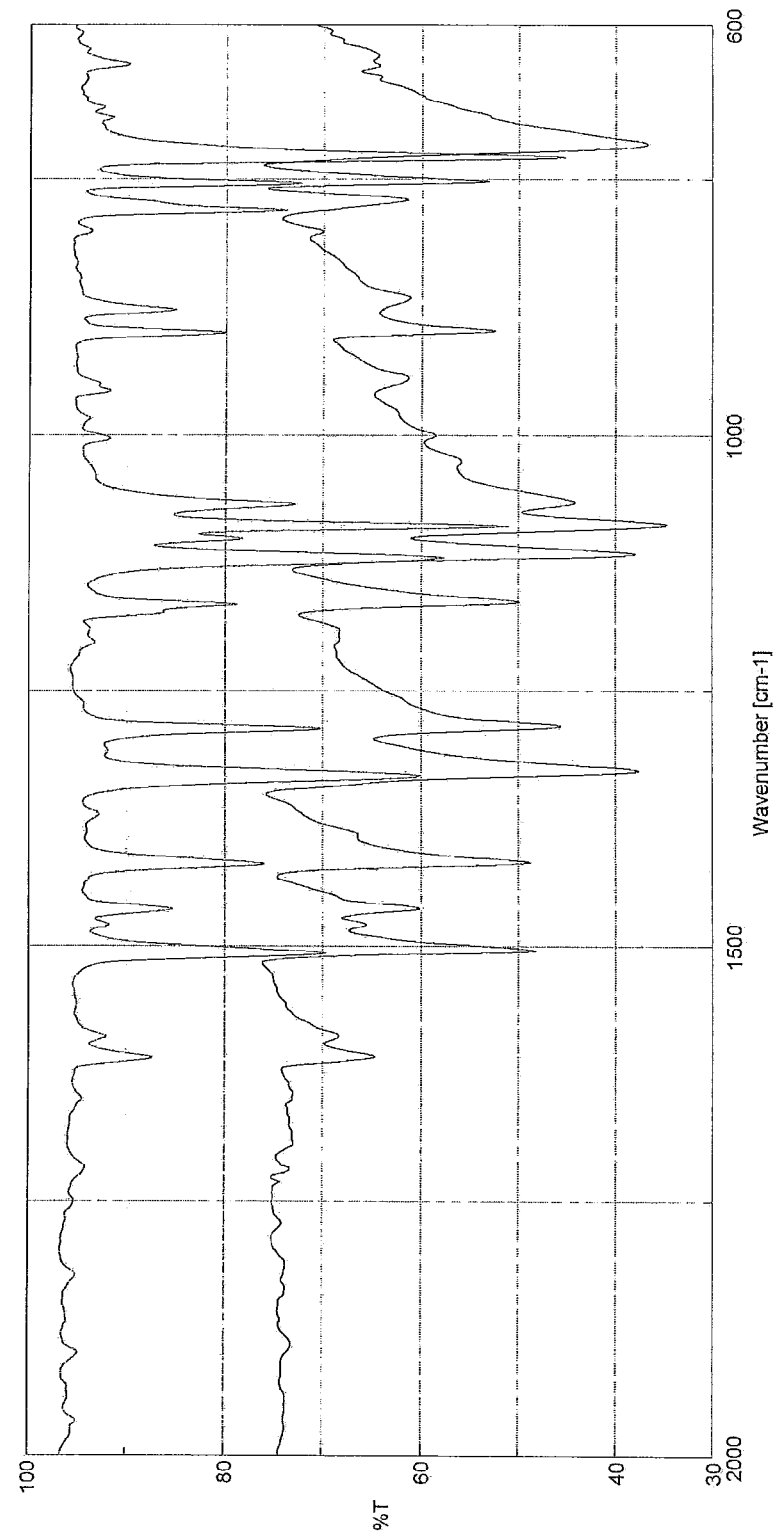
FIG. 30 shows a result of IR measurement in Example 1.
Figure 31:
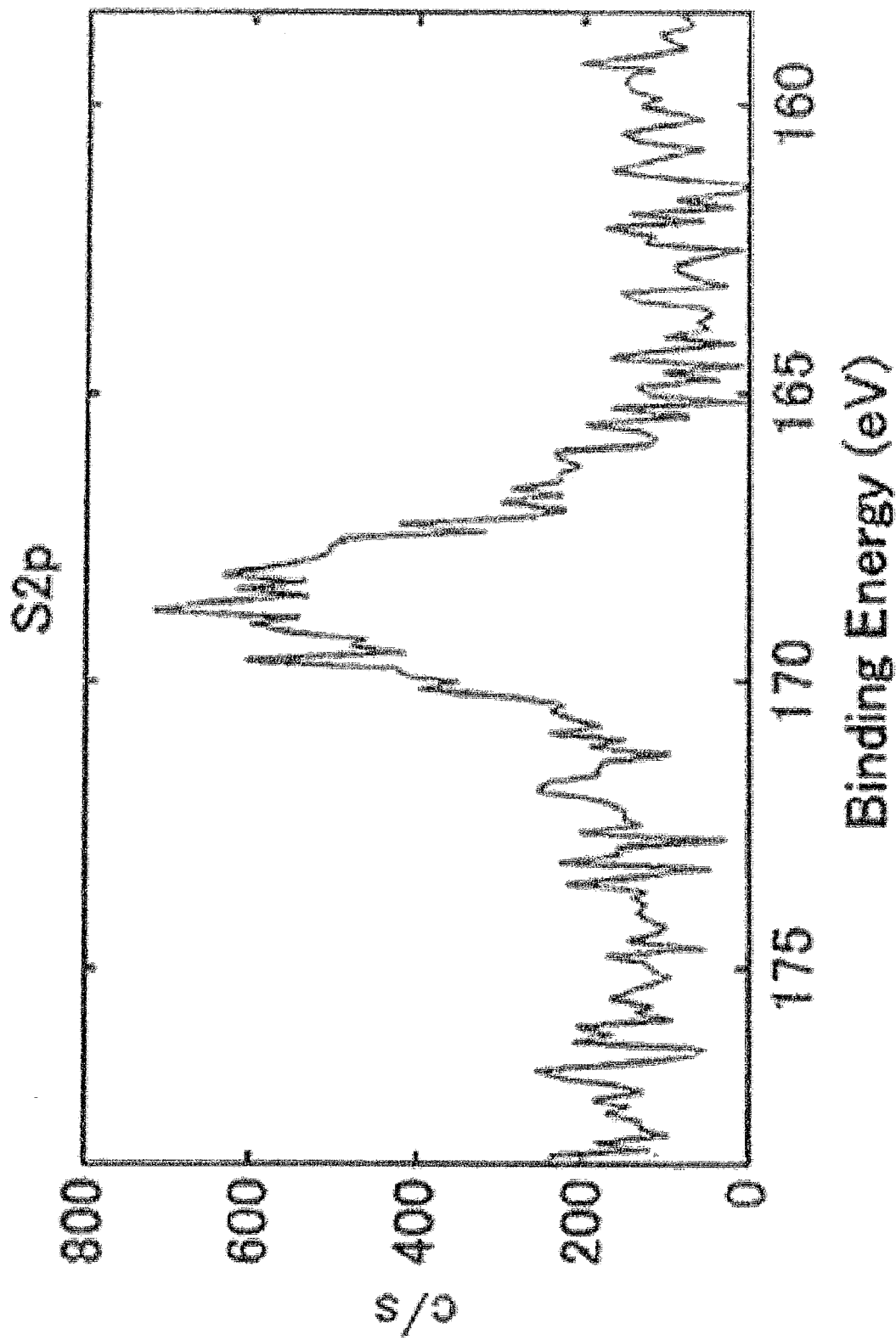
FIG. 31 shows a result of XPS measurement of binding energy of the sulfur (S) 2p orbit in Example 1.
Figure 32:
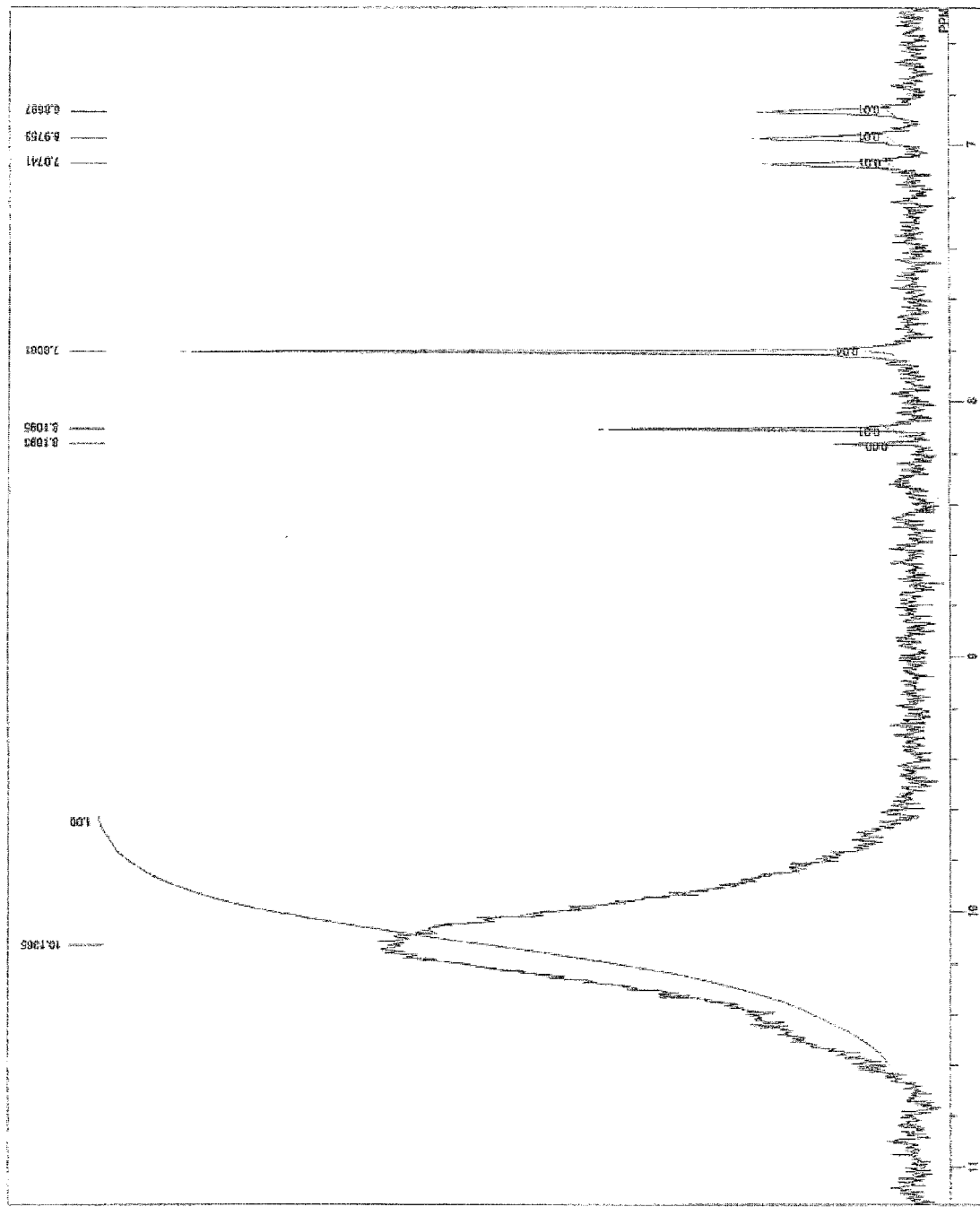
FIG. 32 shows a result of NMR measurement by using heavy DMSO as a solvent in Example 1.
Figure 33:
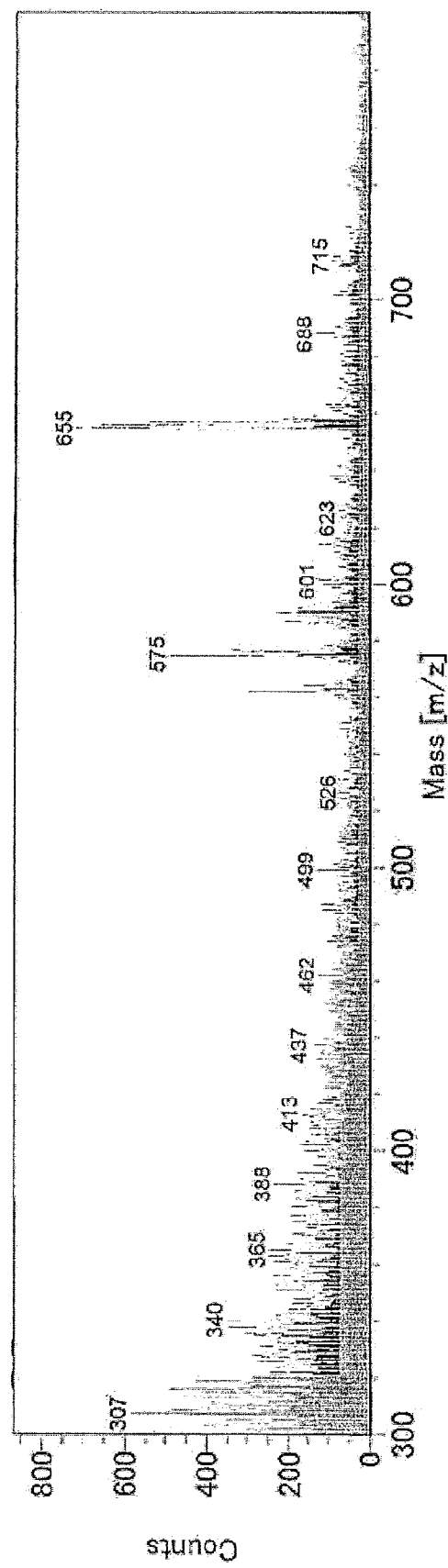
FIG. 33 shows a result of TOF-SIMS measurement in Example 1.
Figure 34:
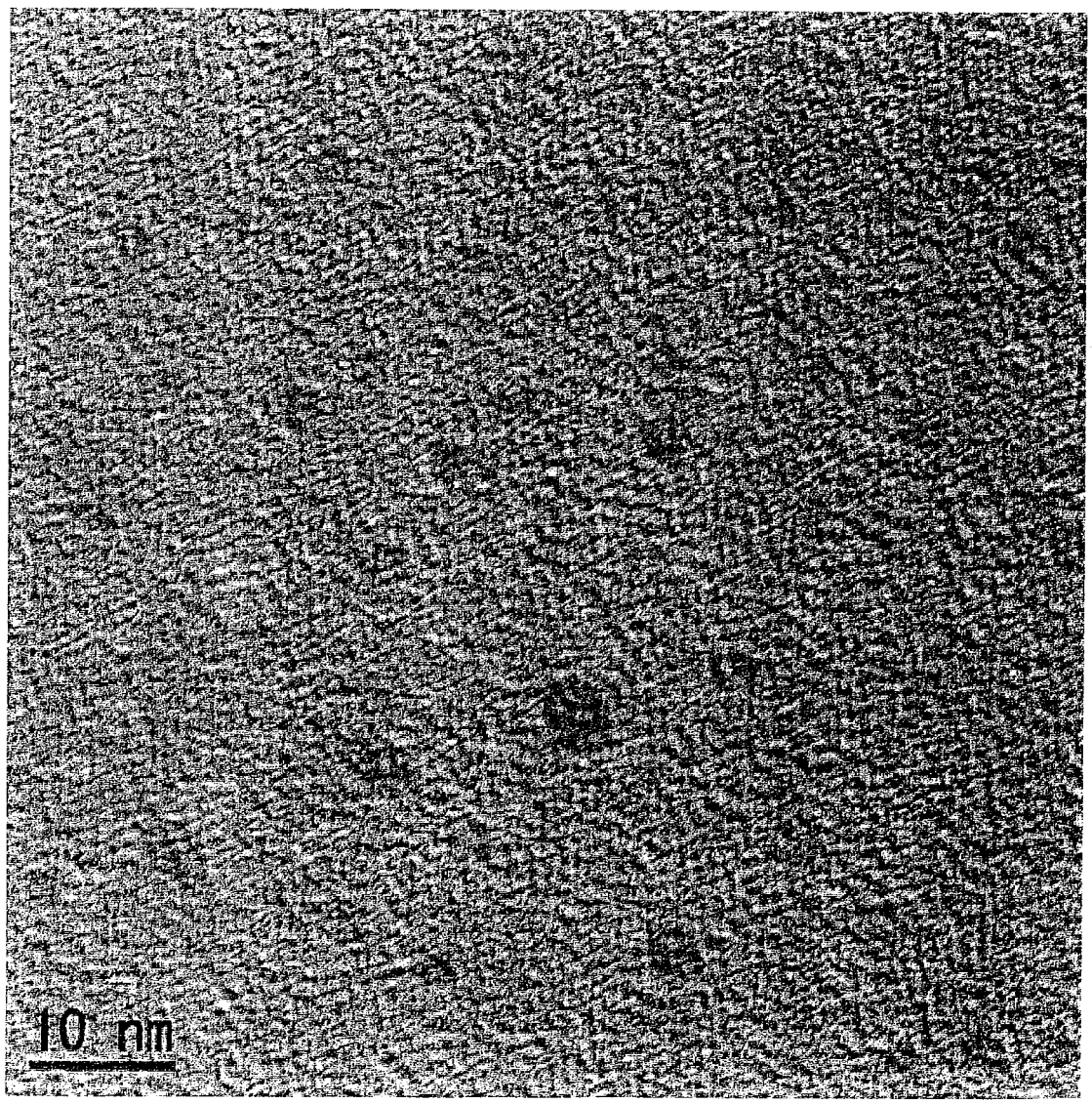
FIG. 34 shows a TEM picture of copper phthalocyanine microparticles obtained in Example 1.

With supplying ethanol of 25° C. as a first fluid from a center at supply pressure of 0.15 MPa and rotation number of 900 rpm, a fuming sulfuric acid solution of copper phthalocyanine obtained by dissolving copper phthalocyanine into 5% fuming sulfuric acid (5% $SO_3$—$H_2SO_4$) was introduced into the space between the processing surfaces 1 and 2 at the rate of 10 mL/minute, thereby mixing the fluids so as to give the discharge rate of 100 g/minute. Copper phthalocyanine microparticles in the discharged disperse solution of copper phthalocyanine were loosely aggregated; the aggregated copper phthalocyanine microparticles were collected by filtration using a nutsche and a filter paper, washed with ethanol, and then dried under condition of 60° C. and −0.1 MPa. From the result of IR spectrum of the obtained phthalocyanine powders, a shoulder peak attributable to the sulfo group could be confirmed near 1000 to 1100 $cm^{-1}$, different from that of the raw material copper phthalocyanine. In FIG. 30, results of the IR measurement are shown (IR spectrum of the obtained copper phthalocyanine is shown by a solid line (lower line in the figure), and IR spectrum of the raw material copper phthalocyanine is shown by a broken line (upper line in the figure). The peak attributable to the sulfo group could also be confirmed from the XPS result of the obtained copper phthalocyanine powders. In FIG. 31, a result of XPS measurement regarding with binding energy of the sulfur (S) 2p orbit is shown. From the surface elemental analysis result by XPS, it was confirmed that one sulfo group was attached per seven copper phthalocyanine molecules present on particle surface. Result of the NMR measurement by using heavy DMSO as the solvent is shown in FIG. 32. From the NMR measurement result, it was confirmed by the broad peak appeared at 9.6 to 10.8 ppm that the sulfo group was bonded to the copper phthalocyanine molecule. Further from the anion detection result of TOF-SIMS measurement, the peak at m/z 575 attributable to copper phthalocyanine and the peak at m/z 655 having a structure that one sulfo group was introduced into copper phthalocyanine was confirmed. A result of the TOF-SIMS measurement in the m/z region of 300 to 800 is shown in FIG. 33. The obtained copper phthalocyanine dry powders were added into a propylene glycol monomethyl ether acetate (PGMEA) solution obtained by dissolving 20% by weight (as the active ingredient, relative to copper phthalocyanine powders) of a dispersing agent (Disperbyk BYK-2000, manufactured by BYK Chemie GmbH), and then the resulting mixture was subjected to disperse treatment by CLEARMIX 0.8S (manufactured by M Technique Co., Ltd.). Volume-average particle diameter after the disperse treatment was 8.3 nanometers. A TEM picture of the obtained copper phthalocyanine microparticles is shown in FIG. 34. The obtained phthalocyanine disperse solution was diluted with pure water by a factor of one hundred for an ion chromatography analysis, with which no sulfate ion was detected.

Example 2

Figure 35:
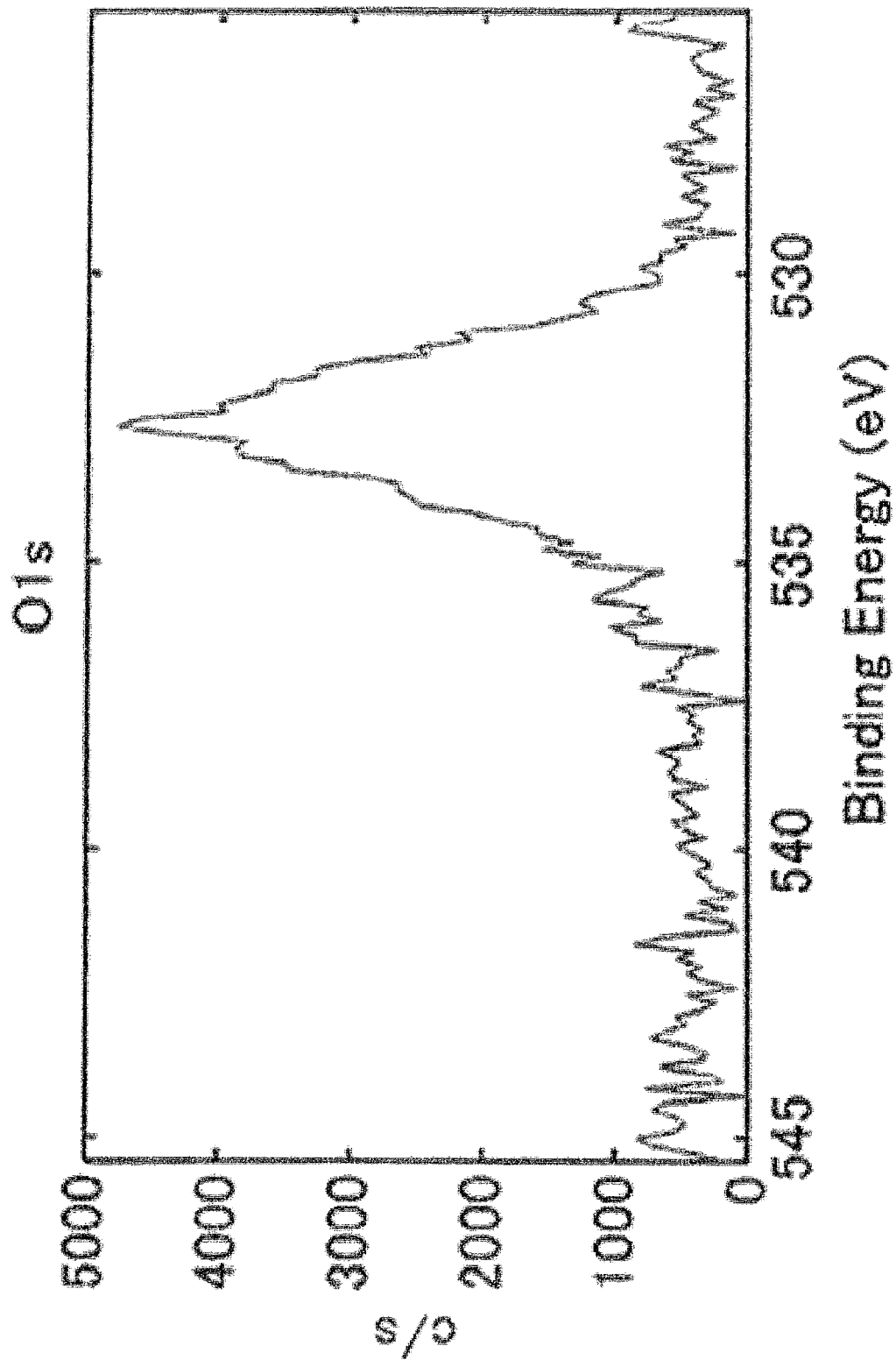
FIG. 35 shows a result of XPS measurement of binding energy of the oxygen (O) 1s orbit in Example 2.
Figure 36:
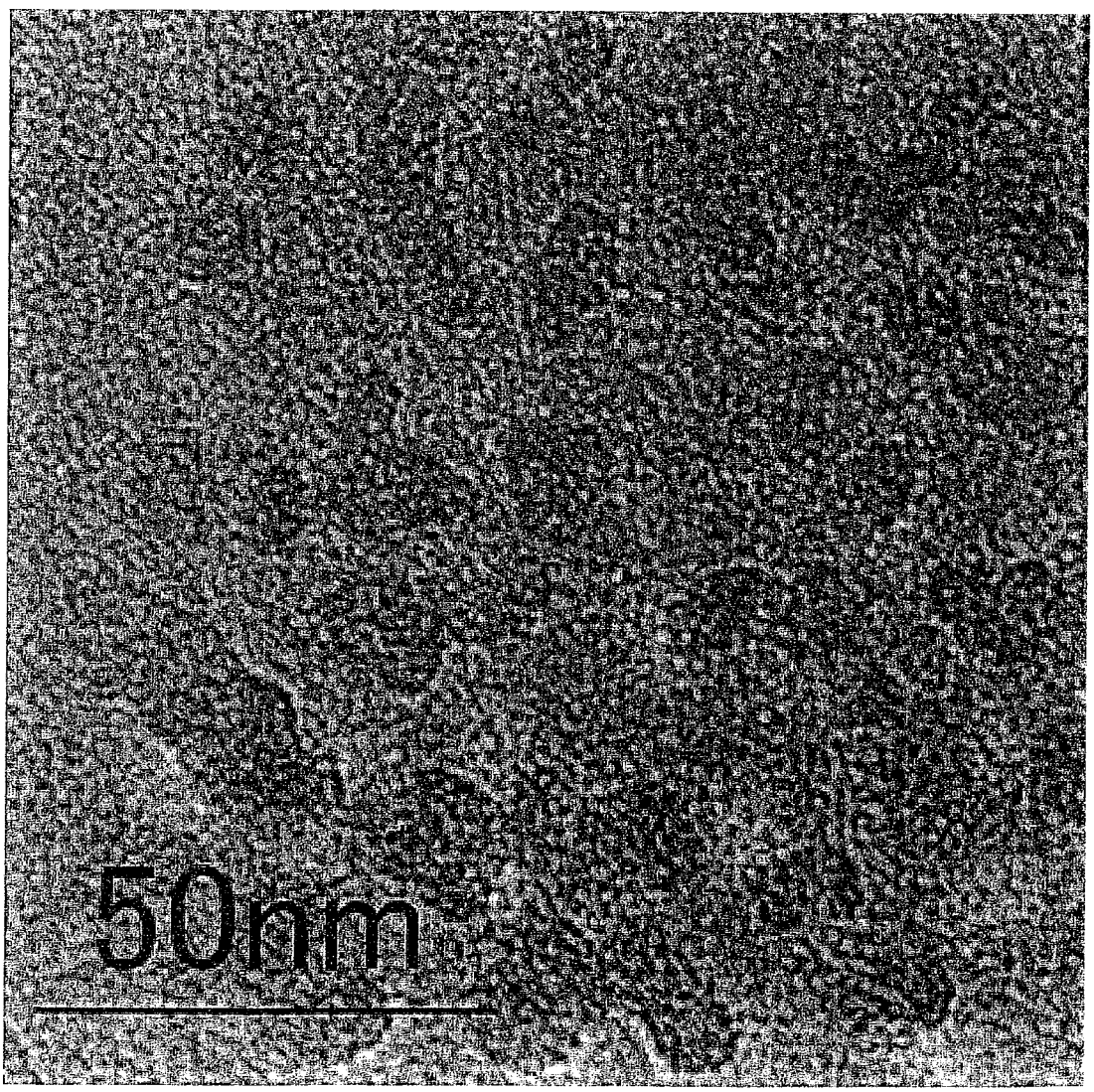
FIG. 36 shows a TEM picture of copper phthalocyanine microparticles obtained in Example 2.

With supplying pure water of 25° C. as a first fluid from a center at supply pressure of 0.15 MPa and rotation number of 1000 rpm, a sulfuric acid solution of copper phthalocyanine obtained by dissolving copper phthalocyanine into sulfuric acid was introduced into the space between the processing surfaces 1 and 2 at the rate of 10 mL/minute, thereby mixing the fluids so as to give the discharge rate of 200 g/minute. Copper phthalocyanine microparticles in the discharged disperse solution of copper phthalocyanine were loosely aggregated; the aggregated copper phthalocyanine microparticles were collected by filtration using a nutsche and a filter paper, washed with pure water, and then dried under condition of 60° C. and −0.1 MPa. From the XPS result of the obtained copper phthalocyanine powders, the peak attributable to the hydroxy group could be confirmed. In FIG. 35, a result of XPS measurement regarding with binding energy of the oxygen (O) 1s orbit is shown. From the surface elemental analysis result by XPS, it was confirmed that one hydroxy group was attached per three copper phthalocyanine molecules present on particle surface. The obtained copper phthalocyanine dry powders were added into pure water containing 2% by weight (as the active ingredient, relative to copper phthalocyanine powders) of dissolved sodium dodecylsulfate (SDS), and then the resulting mixture was subjected to disperse treatment by CLEARMIX 0.8S (manufactured by M Technique Co., Ltd.). Volume-average particle diameter after the disperse treatment was 14.8 nanometers. A TEM picture of the obtained copper phthalocyanine microparticles is shown in FIG. 36.

From the results shown above, it was confirmed that the hydroxy group could be introduced onto surface of copper phthalocyanine microparticles discharged from the space between processing surfaces 1 and 2.

From the results shown above, it was confirmed that hydroxylation treatment and hydrophilization treatment could be effected on surface of copper phthalocyanine microparticles discharged from the space between processing surfaces 1 and 2.

Comparative Example 1

Figure 37:
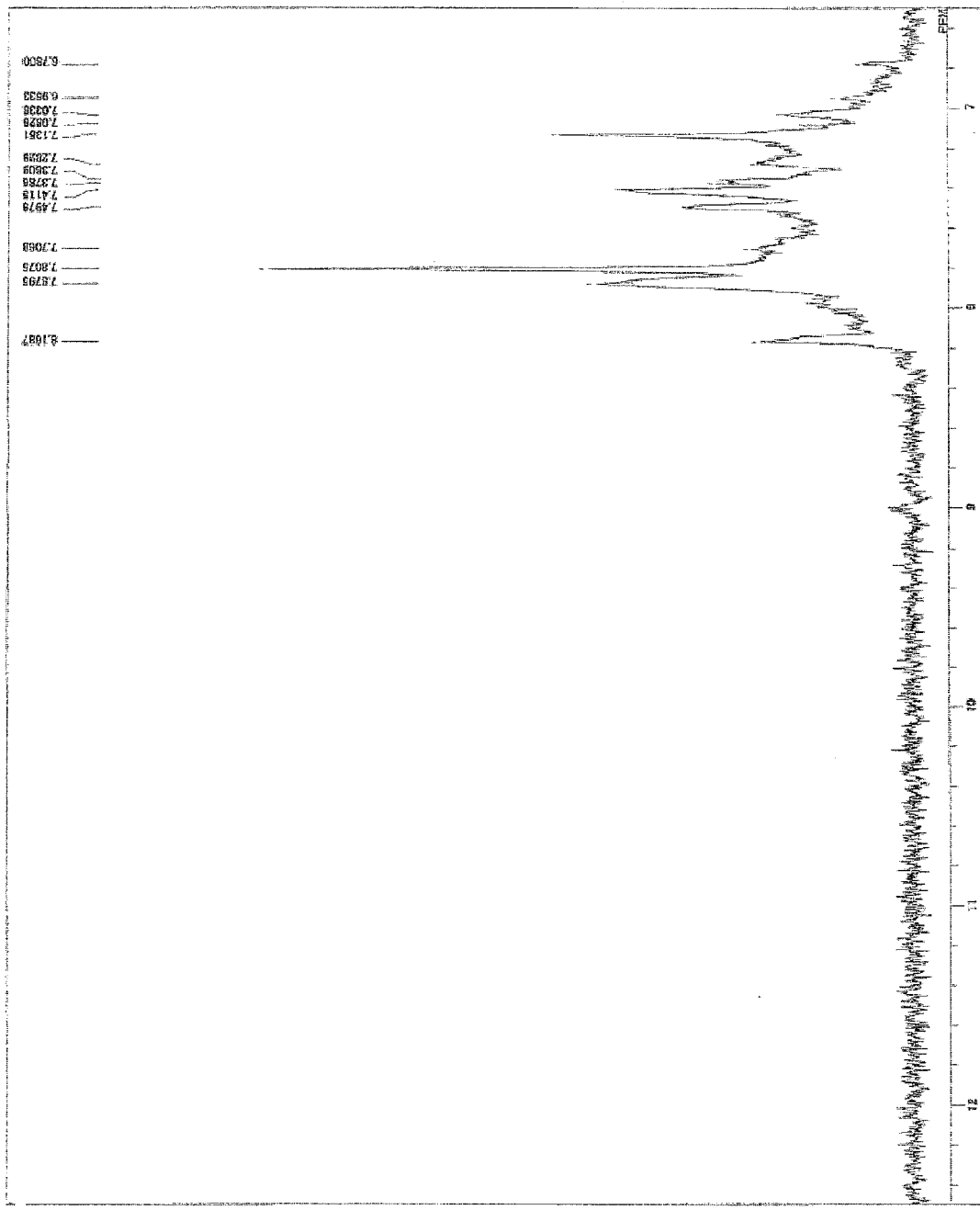
FIG. 37 shows a result of NMR measurement in Comparative Example 1.
Figure 38:
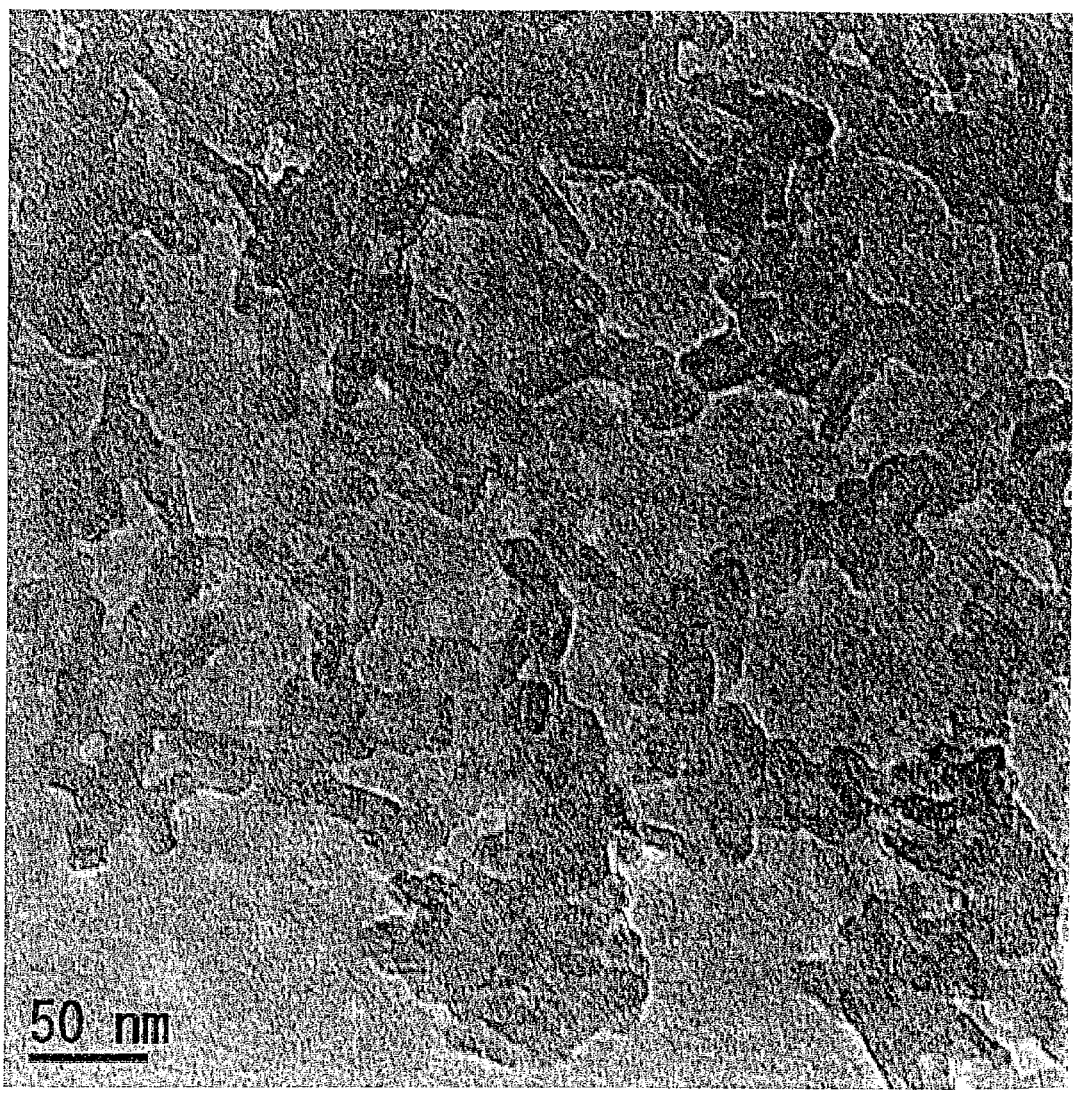
FIG. 38 shows a TEM picture of copper phthalocyanine microparticles obtained in Comparative Example 1.

With supplying pure water of 25° C. as a first fluid from a center at supply pressure of 0.15 MPa and rotation number of 900 rpm, a copper phthalocyanine solution obtained by dissolving copper phthalocyanine into a 1:1 mixture solvent of N-methyl pyrrolidone (NMP) and pyridine was introduced into the space between the processing surfaces 1 and 2 at the rate of 10 mL/minute, thereby mixing them so as to give the discharge rate of 100 g/minute. Copper phthalocyanine microparticles in the discharged disperse solution of copper phthalocyanine were loosely aggregated; the aggregated copper phthalocyanine microparticles were collected by filtration using a nutsche and a filter paper, washed with pure water, and then dried under condition of 60° C. and −0.1 MPa. From the XPS result of the obtained copper phthalocyanine powders, the peaks attributable to a surface modification group such as the sulfo group and the hydroxy group could not be confirmed. A result of the NMR measurement is shown in FIG. 37. From the NMR measurement result, peaks other than those attributable to copper phthalocyanine molecule were not observed, nor were observed peaks attributable to the sulfo group bonded to copper phthalocyanine. Further from the XPS measurement result, peaks other than those attributable to copper phthalocyanine were not observed. It was confirmed that no functional group was introduced into the copper phthalocyanine molecule. The obtained copper phthalocyanine dry powders were added into a propylene glycol monomethyl ether acetate (PGMEA) solution obtained by dissolving 50% by weight (as an active ingredient, relative to copper phthalocyanine powders) of a dispersing agent (Disperbyk BYK-2000, manufactured by BYK Chemie GmbH), and then the resulting mixture was subjected to disperse treatment by CLEARMIX 0.8S (manufactured by M Technique Co., Ltd.). Volume-average particle diameter after the disperse treatment was 304 nanometers. A TEM picture of the obtained copper phthalocyanine microparticles is shown in FIG. 38. Although primary particles with about 10 nanometers were observed, an aggregation state could be confirmed. It was judged that dispersibility was poor in this Comparative Example, because a modification group was not introduced onto surface of pigment copper phthalocyanine microparticles.

Examples 3 to 6

Then, Examples other than the foregoing Examples will be explained.
(Experimental Instruments and Experimental Methods)

Surface treatment of copper phthalocyanine microparticles was done in these Experiments, similarly to those used in each of the foregoing Examples, by using an equipment (forced thin film reactor with trade name of ULREA, hereinafter abbreviated "FTFR", manufactured by M Technique Co., Ltd.) based on the same principle as that described in International Patent Laid-Open Publication No. 2009/8388 (Patent Document 6) filed by the present applicant. Then, copper phthalocyanine microparticles whose surface were treated as mentioned above and the surface state thereof were analyzed by using an infrared absorption spectrum (IR), an X-ray photoelectron spectroscopy method (XPS), and a time-of-flight secondary ion mass spectrometry (TOF-SIMS). Further, dispersion properties of copper phthalocyanine microparticles, which were obtained by different surface treatments, into an aqueous system and into an organic solvent system were evaluated.
(Reagents)

As to the raw material copper phthalocyanine, β-type copper phthalocyanine (trade name of PV FAST BLUE BG, manufactured by Clariant (Japan) K. K.), the same as that in Example 6, was used. As to concentrated sulfuric acid and fuming sulfuric acid to dissolve copper phthalocyanine, 98% concentrated sulfuric acid (special grade reagent, manufactured by Kishida Chemical Co., Ltd.) and fuming sulfuric acid (special grade reagent with $SO_3$ concentration of 30%, manufactured by Yotsuhata Chemical Co., Ltd.) were used. Fuming sulfuric acid with $SO_3$ concentration of 5% was prepared by mixing 98% sulfuric acid and fuming sulfuric acid with $SO_3$ concentration of 30% under nitrogen atmosphere. As to the surfactant to prepare an aqueous disperse solution of copper phthalocyanine microparticles, sodium dodecylsulfate (first class grade reagent, manufactured by Kanto Chemical Co., Inc., hereinafter abbreviated "SDS" similarly to Example 6) was used. As to the organic solvent to prepare an organic disperse solution of copper phthalocyanine microparticles, propylene glycol monomethyl ether acetate (special grade reagent, hereinafter abbreviated "PGMEA", manufactured by Kanto Chemical Co., Inc.) and propylene glycol monomethyl ether (special grade reagent, hereinafter abbreviated "PGME", manufactured by Kanto Chemical Co., Inc.) were used. As to the surfactant to prepare an organic disperse solution, Disperbyk-2000 (modified acryl copolymer with amine value of 4 mg-KOH/g and 40% concentration of the active ingredient, manufactured by BYK Japan K. K.) was used. An aqueous sodium hydroxide solution to regulate pH was prepared by dissolving sodium hydroxide (special grade reagent, manufactured by Kanto Chemical Co., Inc.) into pure water.

[Method for Separation (Crystallization) of Copper Phthalocyanine Microparticles and Method for Surface Processing]

Experimental conditions are shown in Table 1. Hereinafter, Example 3 is noted as Ex. 1, Example 4 as Ex. 2, Example 5 as Ex. 3, and Example 6 as Ex. 4.

TABLE 3

|  | Ex. 1 | Ex. 2 | Ex. 3 | Ex. 4 |
|---|---|---|---|---|
| Fluid [A] | Pure Water | | | |
| Fluid [B] | Cu-Pc/98% Sulfuric Acid Solution | | | Cu-Pc/Fuming Sulfuric Acid Solution |
| $SO_3$ concentration [%] | — | — | — | 5 |
| pH | Control to 12.55* | Control to 7.01* | 1.58 | 1.02 |

*By 3 mol/L NaOH solution

A copper phthalocyanine solution was prepared by dissolving copper phthalocyanine into concentrated sulfuric acid (Example 3 to Example 5) or into fuming sulfuric acid of 5% $SO_3$ concentration (Example 6). While pure water was sent as a first fluid (Fluid [A] in Table 3) from the center at the supply temperature of 20° C. between the processing surfaces 1 and 2 of FTFR, rotation of the processing member was initiated, and then the copper phthalocyanine solution as a second fluid (Fluid [B] in Table 3) was poured between the processing surfaces 1 and 2. Copper phthalocyanine microparticles were separated between the processing surfaces 1 and 2, and discharged between the processing surfaces 1 and 2 as an aqueous dispersion of copper phthalocyanine microparticles. The discharged aqueous dispersion of copper phthalocyanine microparticles was left to stand in a thermostatic chamber at a temperature of 25° C. for 22 hours (Example 5 (Ex. 3) and Example 6 (Ex. 4)). In addition, in Example 3 (Ex. 1) and Example 4 (Ex. 2), the discharged aqueous dispersion of copper phthalocyanine microparticles (pH of 1.58, Example 5 (Ex. 3)) was adjusted to pH of 7.01 (Example 4 (Ex. 2)) and pH of 12.55 (Example 3 (Ex. 1)) by 3 mol/L of aqueous sodium hydroxide aqueous solution, and then the resulting solutions were left to stand in a thermostatic chamber with a temperature of 25° C. for 22 hours.

[Washing Method of Copper Phthalocyanine Microparticles and Preparation of Dried Powder]

It was confirmed that the copper phthalocyanine microparticles were aggregated and settled out in the aqueous dispersions of copper phthalocyanine microparticles which were left to stand as mentioned above. Sedimented copper phthalocyanine microparticles were collected by using a vacuum aspiration with a filtering cloth (the aperture of 10 μm), and then washed by pure water several times before obtaining pastes of the copper phthalocyanine microparticles. The pastes of the copper phthalocyanine microparticles were vacuum dried under the conditions at −0.1 MPaG and at 60° C. for 23 hours to obtain the dried powders.

[Preparation of Dispersion of Copper Phthalocyanine Microparticles]

SDS was dissolved in pure water to prepare an aqueous SDS solution at concentration of 0.2% by weight. The above-mentioned pastes of copper phthalocyanine microparticles were added with pure water and the 0.2% by weight aqueous SDS solution to prepare aqueous dispersions of copper phthalocyanine microparticles. (Formulating conditions: 2% by weight of solid content concentration of copper phthalocyanine microparticles and 0.1% by weight of SDS concentration). One liter of the prepared aqueous dispersions of copper phthalocyanine microparticles were subjected to dispersing treatment by using a rotary emulsifying disperser (trade name: CLEARMIX, manufactured by M Technique Co., Ltd.) at 20000 rpm of revolution number.

Separately, Disperbyk-2000 was dissolved in a mixed solution of PGMEA and PGME (volume ratio: PGMEA/PGME=4/1) to prepare a Disperbyk-2000 solution with active ingredient concentration of 2% by weight. The above-mentioned dried powders of copper phthalocyanine microparticles were added with the mixed solution of PGMEA and PGME and with the Disperbyk-2000 solution with active ingredient concentration of 2% by weight to prepare organic solvent dispersions of copper phthalocyanine microparticles. (Formulating conditions: 2% by weight of solid component concentration of copper phthalocyanine microparticles and 1% by weight of the active ingredient concentration of Disperbyk-2000). Five liters of the prepared organic solvent dispersions of copper phthalocyanine microparticles was subjected to dispersing treatment by using a rotary emulsifying disperser (trade name: CLEARMIX W MOTION, manufactured by M Technique Co., Ltd.) at 18000/16200 rpm of revolution number in respect of the ratio of roter/screen.

(Measurements)

Infrared absorption spectrum (IR) of copper phthalocyanine microparticle powders was measured by using FT/IR-4100 type A (manufactured by JASCO Corp., measurement conditions were: ATR method, resolution power of 4.0 $cm^{-1}$, and 16 times of number of accumulation). X-ray photoelectron spectroscopy method (XPS) was done by using ESCA 3300s (manufactured by Shimadzu Corporation; X-ray source of AlKα beam (1486.6 eV), output 10 kV, and 20 mA; the smallest peak at 284.6 eV of the binding energy among $C_{1s}$ peaks was taken as the binding energy standard). Measurement of time-of-flight secondary ion mass spectrometry (TOF-SIMS) was done by using PHI TRIFT IV (manufactured by ULVAC-PHI Inc.; measurement conditions were: ion species of $Bi_3^{++}$, acceleration voltage of 30 keV, ion current of 0.7 nA ($Bi_3^{++}$ only), luster range of 100 μm, and mass range between 0 and 1850 in terms of atomic mass unit).

Particle size distribution of the dispersions of copper phthalocyanine microparticles were measured by using Microtrac UPA-150, a dynamic light scattering particle size distribution analyzer, manufactured by Nikkiso Co., Ltd. (measuring conditions: particle refractive index of 1.51, the particle specific gravity of 1.0 $g/cm^3$, and the measurement time of 3 minutes). The dilute solvents used in the measurements were: pure water for the measurement of the aqueous dispersions of copper phthalocyanine microparticles, and the mixed solution of PGMEA and PGME (volume ratio: PGMEA/PGME=4/1) for the measurement of the organic solvent dispersions of copper phthalocyanine microparticles. $D_{50}$ (50%-volume size) and $D_{90}$ (90%-volume size) are the particle sizes at the point where an accumulation curve reaches 50% and 90%, respectively, relative to the accumulation curve of the total volume of the particles. Spectrum measurements of the dispersions were measured using UV-2450, a UV-visible light spectrophotometer, manufactured by Shimadzu Corporation (measuring conditions: the sampling rate of 0.2 nm, the measuring rate of measuring rate, and use of a quartz cell).

[Infrared Absorption Spectrum of Surface-Treated Copper Phathalocyanine Microparticles]

Figure 39:
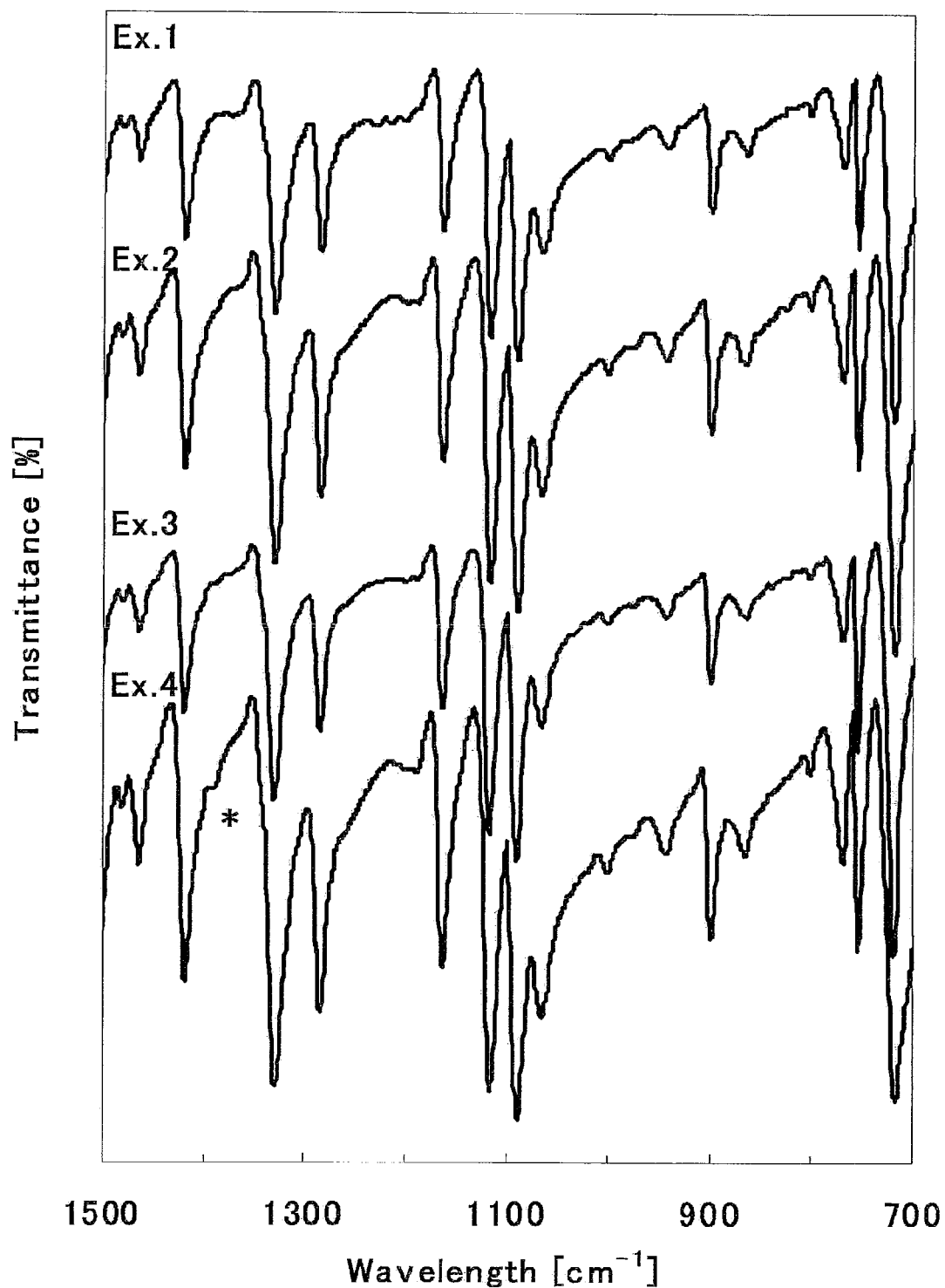
FIG. 39 shows infrared absorption spectra of copper phthalocyanine microparticles obtained in Examples 3 to 6.

Infrared absorption spectra of copper phthalocyanine microparticles in the fingerprint region are shown in FIG. 39. Under all the experimental conditions, the peaks attributable to vibration of the phthalocyanine skeleton were confirmed (approximately between 1117 and 1118, between 1089 and 1090, between 1065 and 1066, 943, between 864 and 865, and between 717 and 719 cm$^{-1}$). Further, in the spectrum of Example 6 (Ex. 4) a shoulder peak was confirmed around 1388 cm$^{-1}$ (with an asterisk * in the chart), indicating existence of a sulfo group in copper phthalocyanine microparticles prepared by using fuming sulfuric acid as a second fluid, and thus, the surface processing was performed.

(XPS Measurement of Surface-Treated Copper Phthalocyanine Nanoparticles)

Figure 40:
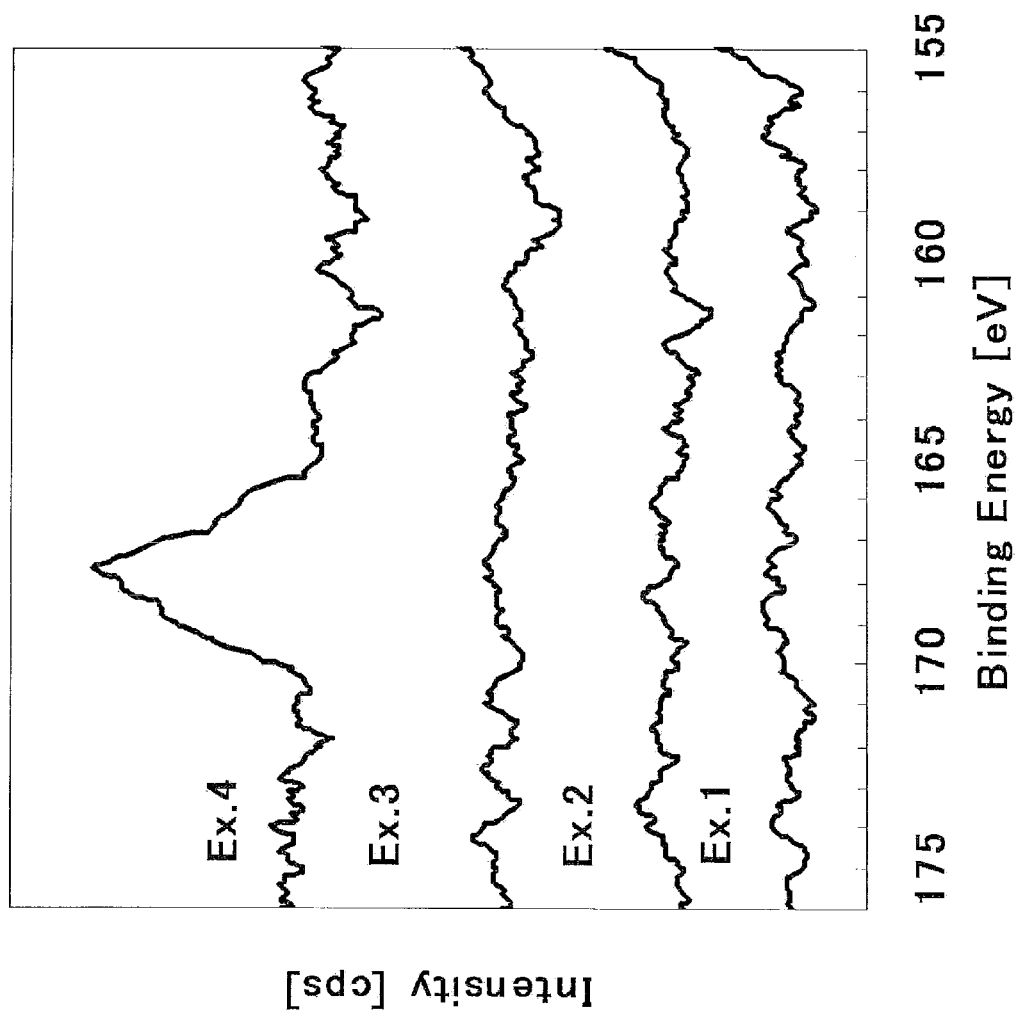
FIG. 40 shows results of XPS measurements of respective binding energies of the sulfur (S) 2p orbit in Example 3 to 6.
Figure 41:
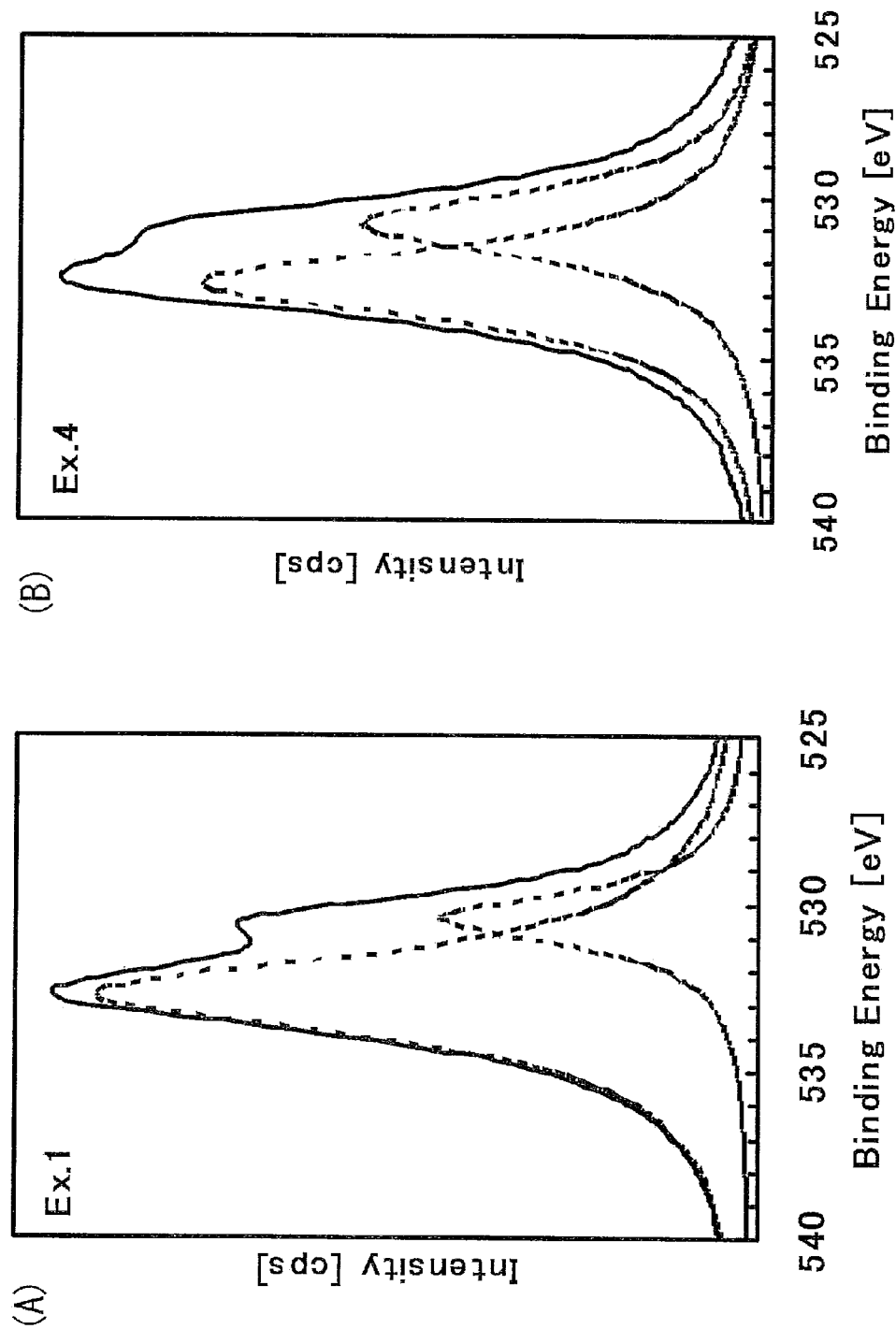
FIG. 41 shows results of XPS measurements of binding energies of the oxygen (O) 1s orbit; (A) is obtained in Example 3 (Ex. 1) and (B) is obtained in Example 6 (Ex. 4).

In Table 2, binding energies of $C_{1s}$, $N_{1s}$, $Cu_{2p3/2}$ $Cu_{2p1/2}$, $S_{2p}$, and $O_{1s}$ peaks confirmed in the XPS spectra are shown. Each peak of $C_{1s}$, $N_{1s}$, $Cu_{2p3/2}$, and $Cu_{2p1/2}$ confirmed in Example 3 (Ex. 1) to Example 6 (Ex. 4) was identical to that of the reported results of XPS measurements on copper phthalocyanine (T. Enokida and R. Hirohashi: Mol. Cryst. Liq. Cryst., 195, 265 (1991); Y. Niwa, H. Kobayashi, and T. Tsuchiya: J. Chem. Phys., 60, 799 (1974)); thus, it was confirmed that there were no differences due to measurement conditions. However, as can be seen in FIG. 40, the $S_{2p}$ peak was confirmed in Example 6 (Ex. 4); this is considered as the peak attributable to the sulfo group that was observed in IR measurement. Further, the $O_{1s}$ peak (532.7 eV) confirmed in Example 3 (Ex. 1) to Example 6 (Ex. 4) was identical to that of the reported results (Y. Niwa, H. Kobayashi, and T. Tsuchiya: J. Chem. Phys., 60, 799 (1974); J. Mizuguchi: Jpn. J. Appl. Phys., 21, 822 (1982)); this peak is considered attributable to oxygen that is adsorbed onto surface of copper phthalocyanine nanoparticles. However, it was confirmed that the $O_{1s}$ peak in Example 3 (Ex. 1) and in Example 6 (Ex. 4) was composed of a plurality of peak components, as can be seen in FIGS. 41 (A) and (B). From a result of wave separation as shown by broken lines in each chart, the $O_{1s}$ peak in Example 3 (Ex. 1) was separated into two components of 532.7 eV and 530.4 eV and the peak in Example 6 (Ex. 4) was separated into two components of 532.7 eV and 530.8 eV. The peak located at 530.8 eV in Example 6 (Ex. 4) is considered attributable to the sulfo group. The $O_{1s}$ peak at 530.4 eV in Example 3 (Ex. 1) is located in the lower energy side of the peak attributable to the sulfo group in Example 6 (Ex. 4), and thus this peak is considered attributable to a bond between oxygen and hydrogen having smaller electronegativity than sulfur, suggesting presence of the hydroxy group on surface of copper phthalocyanine nanoparticles prepared under the conditions of Example 3 (Ex. 1).

TABLE 2

| | Binding energy (eV) | | | |
|---|---|---|---|---|
| | Ex. 1 | Ex. 2 | Ex. 3 | Ex. 4 |
| $C_{1s}$ | 284.6 | 284.6 | 284.6 | 284.6 |
| $N_{1s}$ | 398.8 | 398.8 | 398.7 | 398.8 |
| $Cu_{2p3/2}$ | 935.1 | 935.1 | 935.0 | 935.4 |
| $Cu_{2p1/2}$ | 955.1 | 955.1 | 955.1 | 955.3 |
| $S_{2p}$ | — | — | — | 168.4 |
| $O_{1s}$ | 532.7 | 532.7 | 532.7 | 532.7 |

(TOF-SIMS Measurement of Surface-Treated Copper Phthalocyanine Microparticles)

Figure 42:
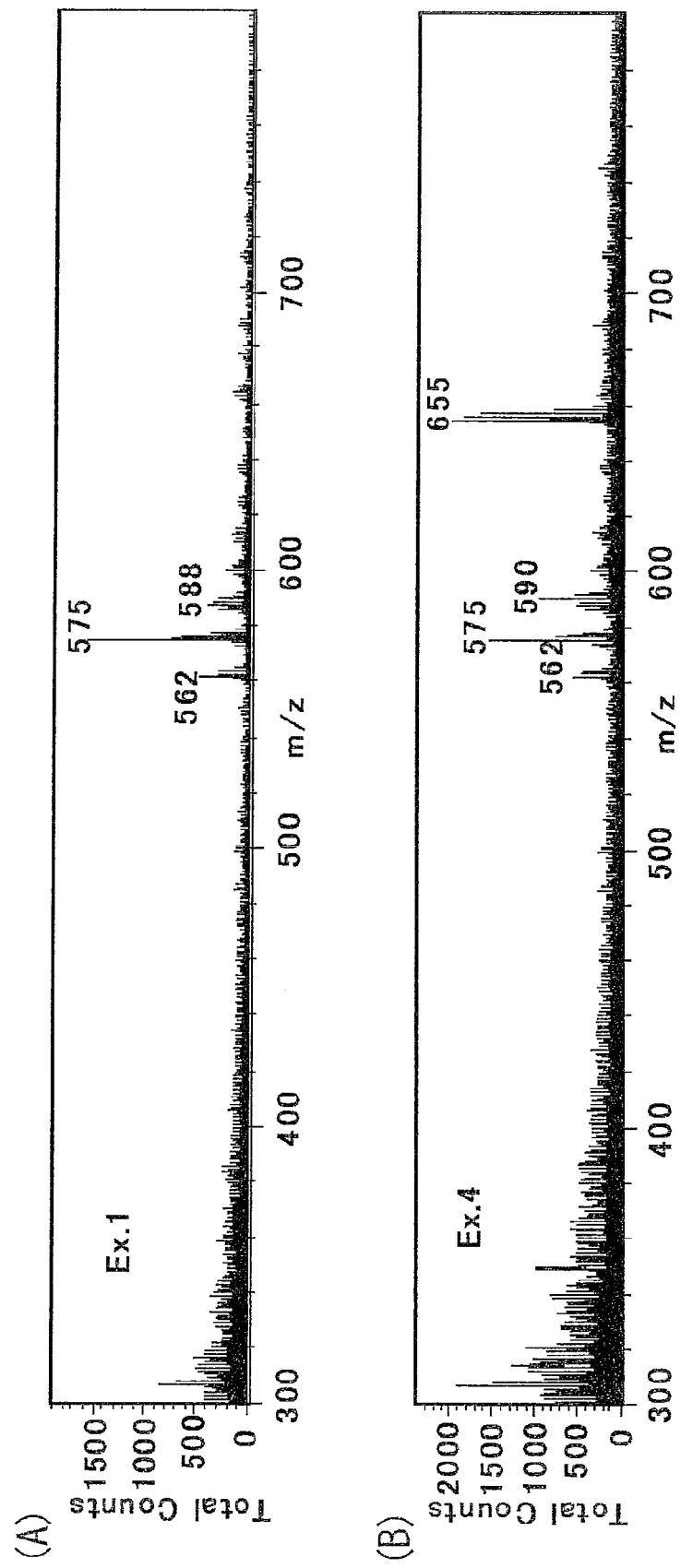
FIG. 42 shows results of TOF-SIMS measurements; (A) is obtained in Example 3 (Ex. 1) and (B) is obtained in Example 6 (Ex. 4).
Figure 43:
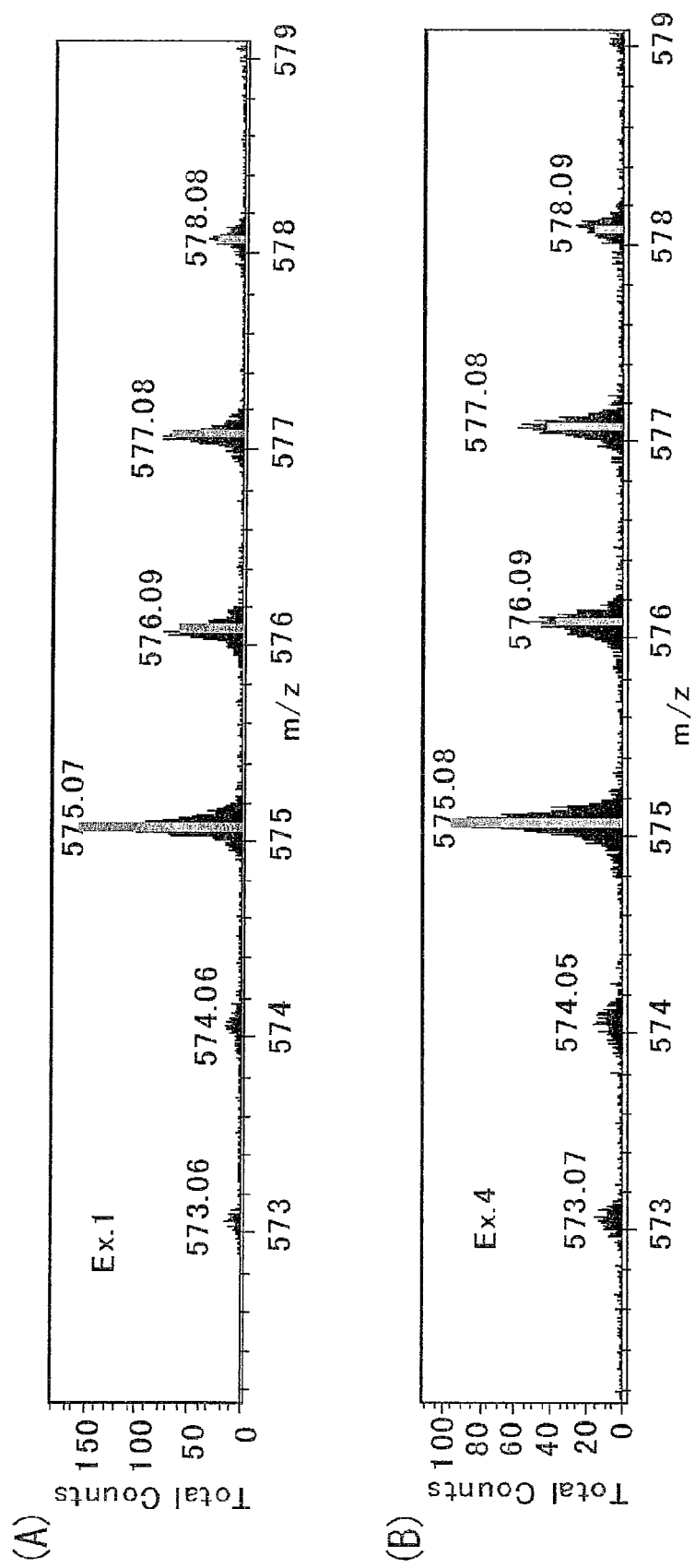
FIG. 43 shows results of TOF-SIMS measurements in the m/s range of 572 to 579.
Figure 44:
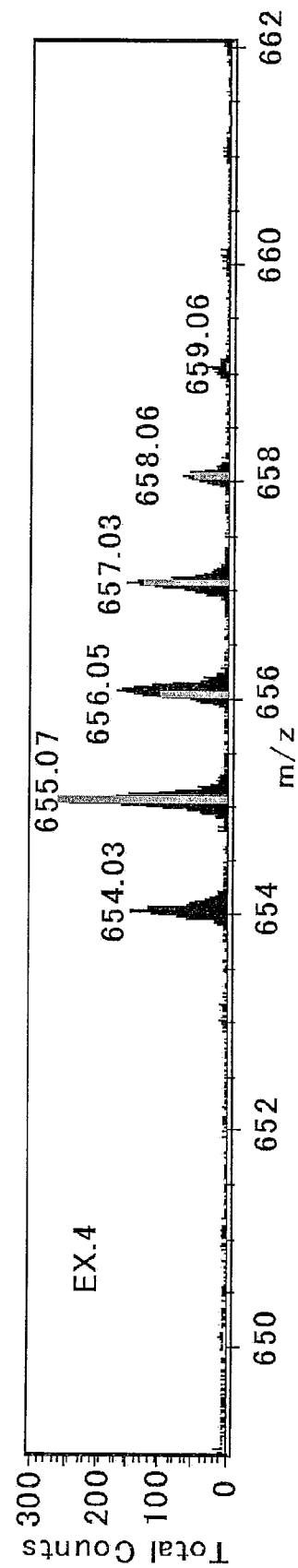
FIG. 44 shows a result of TOF-SIMS measurement in the m/s range of 649 to 662 in Example 6 (Ex. 4). Gray lines show theoretical values of existing ratio of stable isotopes of sulfonated copper phthalocyanine.

Negative mass spectra by TOF-SIMS measurements are shown in FIGS. 42 (A) and (B). As can be seen in spectra, molecular peak of copper phthalocyanine (m/z=575 u) was confirmed both in Example 3 (Ex. 1) and Example 6 (Ex. 4). Furthermore, in Example 6 (Ex. 4), a characteristic peak was confirmed also at m/z=655 u, which was located at the position of 80 u (corresponding to $SO_3$) higher than m/z=575 u. In FIGS. 43 (A) and (B), negative mass spectra of mass region of the copper phthalocyanine obtained in Example 3 (Ex. 1) and Example 6 (Ex. 4) are shown, and in FIG. 44, negative mass spectrum of mass region of the sulfonated copper phthalocyanine obtained in Example 6 (Ex. 4) is shown. Gray line in each spectrum shows theoretical values of existing ratio of stable isotopes of copper phthalocyanine (FIG. 43) or sulfonated copper phthalocyanine (FIG. 44); it can be seen that the measurement results coincide well with the theoretical values. It is considered that peaks at 562 and 588 u in Example 3 (Ex. 1) and peaks at 562 and 590 u in Example 6 (Ex. 4) are due to decomposition products of copper phthalocyanine that are formed during the measurement.

From the above results, it was confirmed that sulfonated copper phthalocyanine was present on surface of copper phthalocyanine microparticles prepared under the condition of Example 6 (Ex. 4) and that the sulfo group could be introduced onto particle surface by the surface treatment. As to the copper phthalocyanine microparticles prepared under the condition of Example 3 (Ex. 1), the surface structure thereof could not be judged because of inconsistent measurement results between XPS and TOF-SIMS, though suggesting that the hydroxy group was possibly introduced.

(Dispersibility of Surface-Treated Copper Phthalocyanine Microparticles into an Organic Solvent System)

Figure 46:
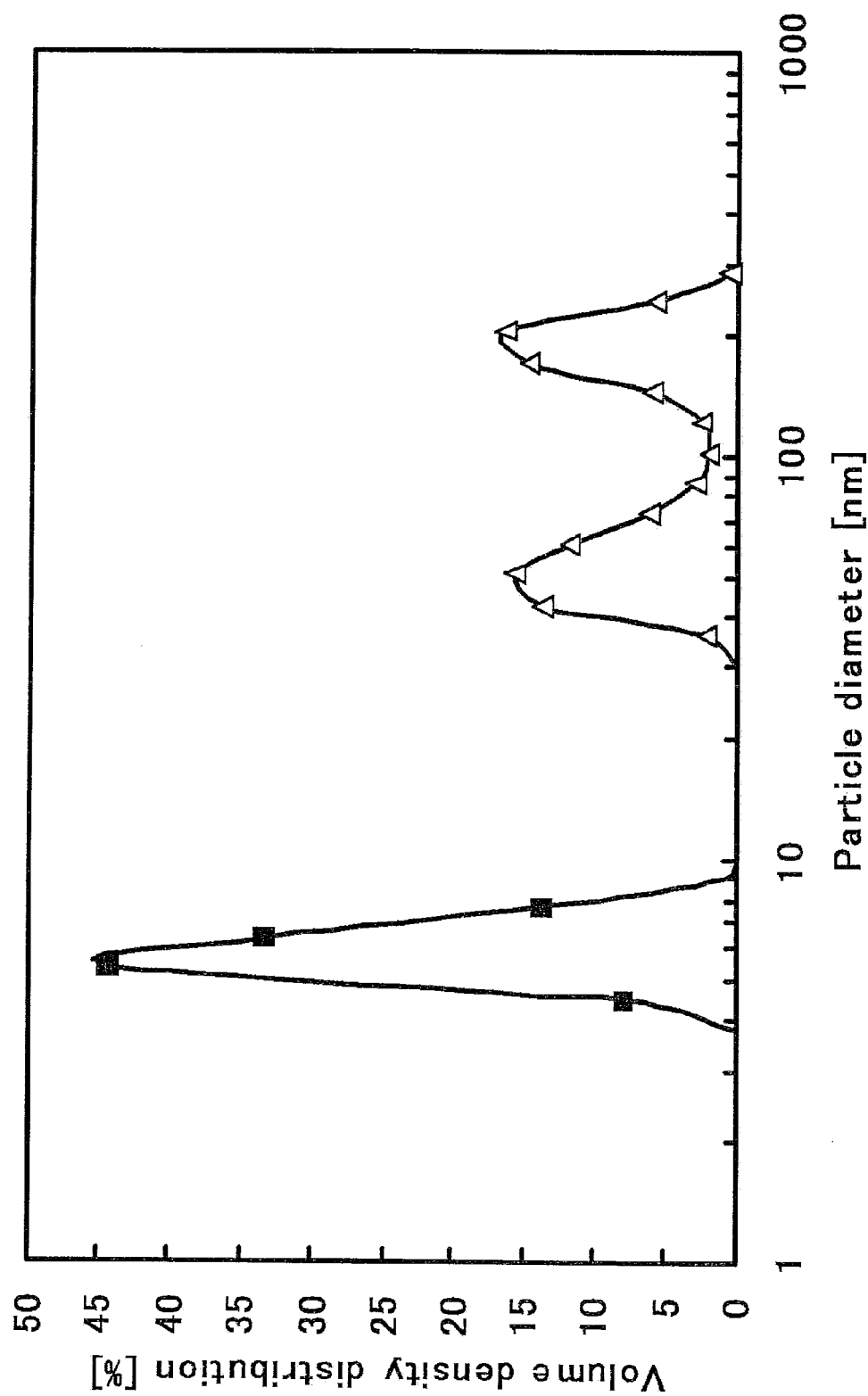
FIG. 46 shows particle size distribution of copper phthalocyanine microparticles in the organic solvent disperse solution after disperse treatment in each of Example 3 (Ex. 1/white triangles) and Example 6 (Ex. 4/black quadrangles).

In FIG. 45, change of particle diameter with a lapse of time in dispersion treatment is shown with regard to the organic disperse solution of the copper phthalocyanine microparticles prepared under each experimental condition of Example 3 (Ex. 1) and Example 6 (Ex. 4). Particle size distribution after the treatment is shown in FIG. 46. The copper phthalocyanine microparticles prepared under the condition of Example 6 (Ex. 4) could be dispersed with the particle size below 10 nanometers, or as small as several nanometers, while the copper phthalocyanine microparticles prepared under the condition of Example 3 (Ex. 1) gave dispersion having the particle size of about 60 to 200 nanometers. It was considered that, because the copper phthalocyanine microparticles of Example 6 (Ex. 4) had the sulfo group introduced on the surface thereof, more dispersing agent having an amine value was adsorbed to the surface, thereby effecting the dispersion more effectively. Further, the copper phthalocyanine microparticles of Example 6 (Ex. 4) were dispersed with the particle size of as small as several nanometers, suggesting that surface treatment was effected on each particle uniformly.

(Dispersibility of Surface-Treated Copper Phthalocyanine Microparticles into an Aqueous System)

Figure 47:
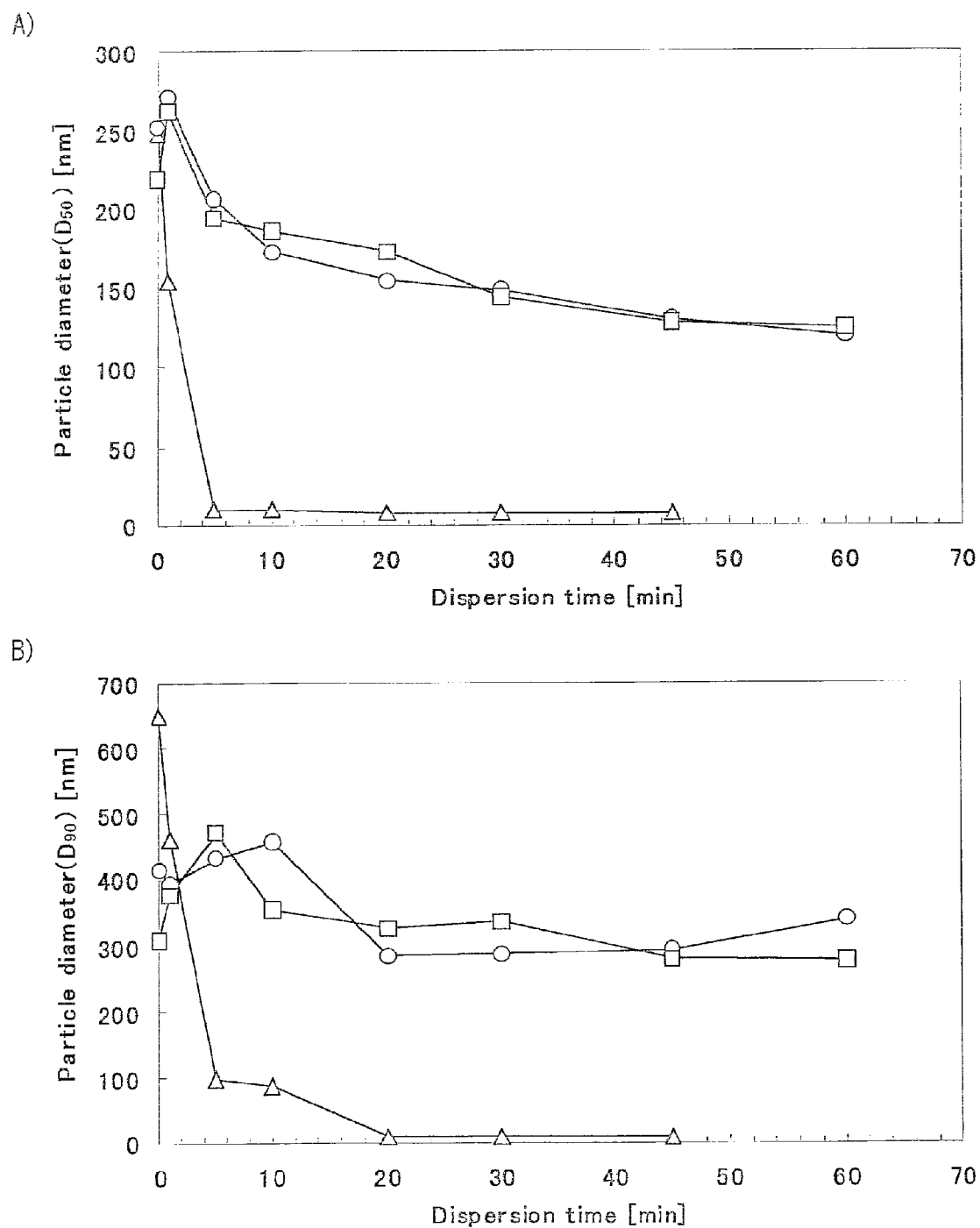
FIG. 47 shows change of particle diameter with a lapse of time in dispersion treatment in each of Example 3 (Ex.
Figure 48:
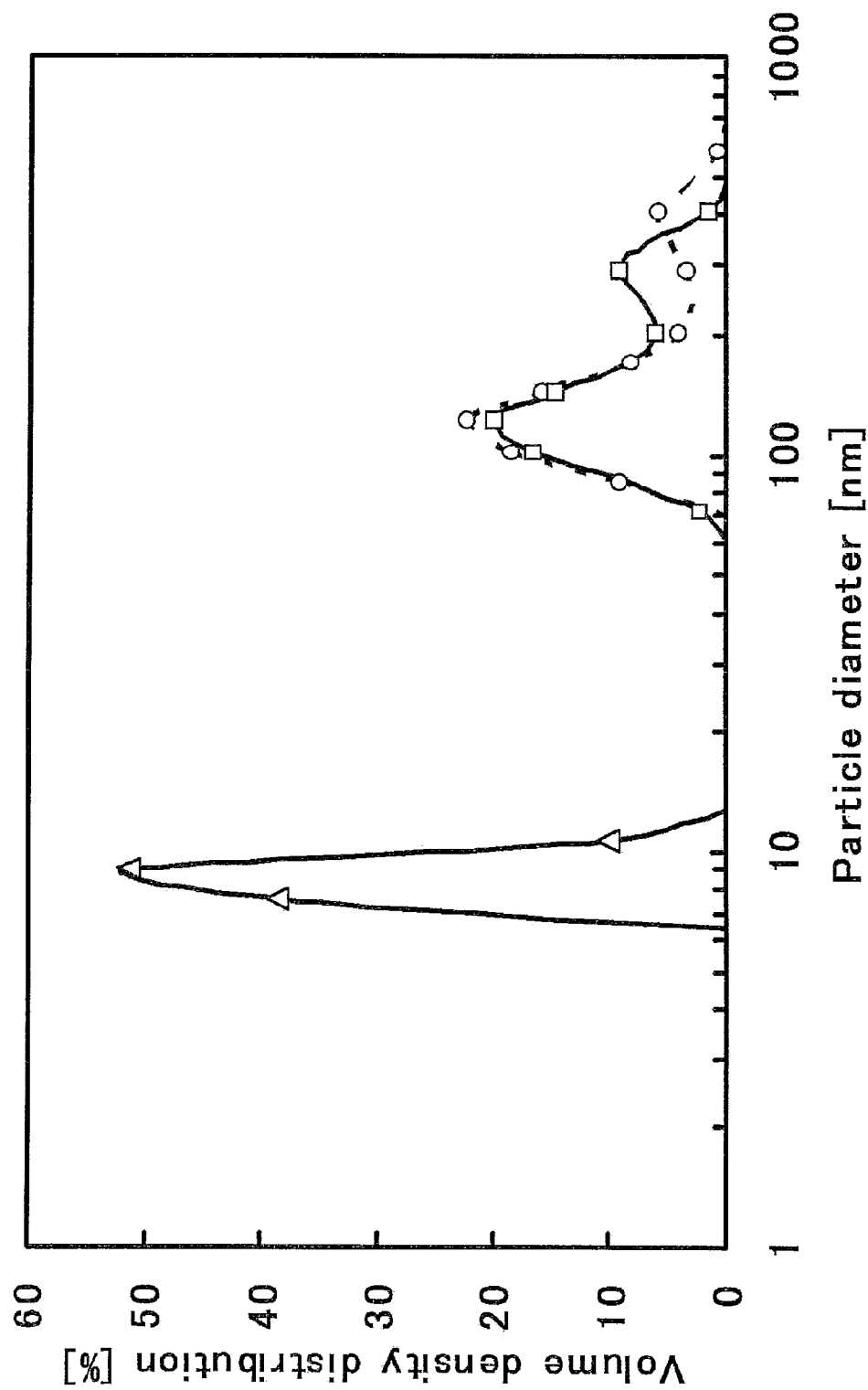
FIG. 48 shows particle size distribution of copper phthalocyanine microparticles in the aqueous disperse solution after disperse treatment in each of Example 3 (Ex. 1/white triangles), Example 4 (Ex. 2/white circles), and Example 6 (Ex. 3/white quadrangles).

In FIG. 47, change of particle diameter with a lapse of time in dispersion treatment is shown with regard to the aqueous disperse solution of the copper phthalocyanine microparticles of Example 3 (Ex. 1), Example 4 (Ex. 2), and Example 5 (Ex. 3). Particle size distribution after the treatment is shown in FIG. 48. The copper phthalocyanine microparticles prepared under the condition of Example 3 (Ex. 1) could be dispersed with the particle size of as small as several nanometers, while the copper phthalocyanine microparticles of Example 4 (Ex. 2) and Example 5 (Ex. 3) gave dispersion having the particle size of about 150 to 300 nanometers with no change in diameter of dispersed particles after 20 minutes from the treatment. Similarly to disperse treatment of the organic solvent system, the copper phthalocyanine microparticles of Example 3 (Ex. 1) were dispersed with the particle size of as small as several nanometers, suggesting that surface treatment was effected on each particle uniformly.

(Transmission Spectra of Disperse Solution of Surface-Treated Copper Phthalocyanine Microparticles)

Figure 49:
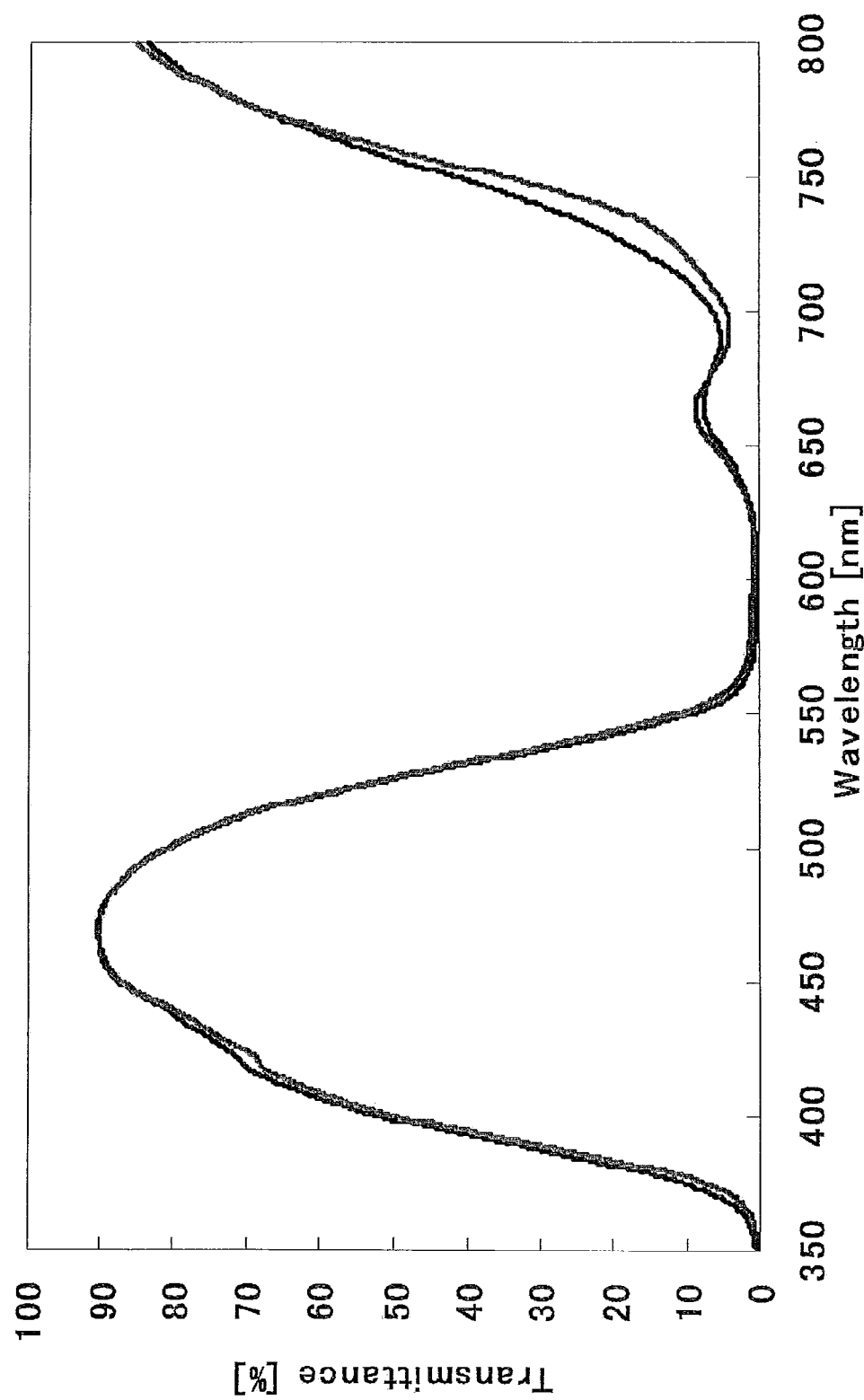
FIG. 49 shows transmission spectra of 0.0050% disperse solution of copper phthalocyanine particles of Example 3 and Example 6 in the wavelength range of 350 to 800 nanometers. The black line shows transmission spectrum of Example 3 and the gray line shows transmission spectrum of Example 6.

In FIG. 49, transmission spectra of disperse solution of copper phthalocyanine microparticles with concentration of 0.005% by weight in an aqueous medium of Example 3 (Ex. 1) and in an organic solvent of Example 6 (Ex. 4) in the wavelength range of 350 to 800 nanometers are shown.

There is no substantial difference between the spectra patterns in Example 3 (Ex. 1) and Example 6 (Ex. 4), suggesting that an effect of a functional group present on surface of copper phthalocyanine microparticles to the spectrum feature is small. It was found that the copper phthalocyanine microparticles gave similar spectra in the aqueous system and in the organic solvent system.

The invention claimed is:

1. A method for surface treatment of pigment microparticles, comprising:
    a method for producing pigment microparticles comprising the steps of:
        supplying a fluid to be processed between processing surfaces capable of approaching to and separating from each other and displacing relative to each other, wherein a force to move in the direction of approaching, at least one of the processing surfaces rotating relative to the other, wherein the force includes a supply pressure of the fluid to be processed and a pressure applied between the relatively rotating processing surfaces, is balanced with a force to move in the direction of separating thereby keeping a minute space in the distance between the processing surfaces,
        using the minute space kept between two processing surfaces as a flow path of the fluid to be processed thereby forming a thin film fluid by the fluid to be processed,
        forming pigment microparticles in the thin film fluid, the method for surface treatment of pigment microparticles further comprising the steps of:
        providing a modifying agent containing functional group contained in the fluid to be processed;
        introducing the modifying agent between the processing surfaces,
        separating the pigment microparticles between the processing surfaces; and
        surface-modifying the separated pigment microparticles between the processing surfaces, thereby obtaining the surface-modified pigment microparticles.

2. The method for surface treatment of pigment microparticles according to claim 1, wherein the method for producing pigment microparticles further comprises:
    providing a fluid pressure imparting mechanism for imparting a pressure to the fluid to be processed,
    providing at least two processing members, including said processing surfaces, of a first processing member and a second processing member, the second processing member being capable of relatively approaching to and separating from the first processing member, and
    providing a rotation drive mechanism for rotating the first processing member and the second processing member relative to each other, wherein
    each of the processing members is provided with at least two processing surfaces of a first processing surface and a second processing surface disposed in a position they are faced with each other,
    each of the processing surfaces constitutes part of a sealed flow path through which the fluid to be processed under the pressure is passed,
    of the first and second processing members, at least the second processing member is provided with a pressure-receiving surface, and at least part of the pressure-receiving surface is comprised of the second processing surface,
    the pressure-receiving surface receives the pressure applied to the fluid to be processed by the fluid pressure imparting mechanism thereby generating a force to move in the direction of separating the second processing surface from the first processing surface,
    the fluid to be processed under the pressure is passed between the first and second processing surfaces being capable of approaching to and separating from each other and rotating relative to each other, whereby the fluid to be processed forms the thin film fluid,
    the pigment microparticles are formed in the thin film fluid.

3. The method for surface treatment of pigment microparticles according to claim 2, wherein the surface treatment is effected by treating surface of the pigment microparticles with an acid group.

4. The method for surface treatment of pigment microparticles according to claim 2, wherein the surface treatment is effected by treating surface of the pigment microparticles with a basic group.

5. The method for surface treatment of pigment microparticles according to claim 2, wherein
    at least two kinds of fluids are used as the fluid to be processed, the at least two kinds of fluids including a first fluid and a second fluid,
    the first fluid is the fluid which contains a pigment solution, including a pigment dissolved into a solvent,
    the second fluid is a fluid containing a solvent capable of being a poor solvent that has lower solubility to the pigment than the solvent in the pigment solution, and
    the modifying agent containing the functional group is contained in the at least one kind selected from a group of the pigment solution, the poor solvent, and a solvent other than either that in the pigment solution or the poor solvent.

6. The method for surface treatment of pigment microparticles according to claim 2, wherein
    the modifying agent containing the functional group is fuming sulfuric acid, and
    between the processing surfaces, the pigment microparticles are separated and sulfo group is introduced onto the surface of the separated pigment microparticles, thereby obtaining the sulfo group-introduced pigment microparticles.

7. The method for surface treatment of pigment microparticles according to claim 2, wherein
one of the fluids to be processed under the pressure from the fluid pressure imparting mechanism is passed between the first and second processing surfaces, wherein
an independent introduction path through which a fluid to be processed other than the said fluid to be processed is passed is arranged, and at least one opening leading to the introduction path is arranged in at least either the first processing surface or the second processing surface, wherein
the fluid other than the said fluid to be processed is introduced between the processing surfaces from the introduction path whereby the said fluid to be processed and the fluid other than the said fluid to be processed are mixed in the thin film fluid.

8. The method for surface treatment of pigment microparticles according to claim 7, wherein the surface treatment is effected by treating surface of the pigment microparticles with an acid group.

9. The method for surface treatment of pigment microparticles according to claim 7, wherein the surface treatment is effected by treating surface of the pigment microparticles with a basic group.

10. The method for surface treatment of pigment microparticles according to claim 7, wherein
at least two kinds of fluids are used as the fluids to be processed, the at least two kinds of fluids including a first fluid and a second fluid,
the first fluid is the fluid which contains a pigment solution, including a pigment dissolved into a solvent,
the second fluid is a fluid containing a solvent capable of being a poor solvent that has lower solubility to the pigment than the solvent in the pigment solution, and
the modifying agent containing the functional group is contained in the at least one kind selected from a group of the pigment solution, the poor solvent, and a solvent other than either that in the pigment solution or the poor solvent.

11. The method for surface treatment of pigment microparticles according to claim 7, wherein
the modifying agent containing the functional group is fuming sulfuric acid, and
between the processing surfaces, the pigment microparticles are separated and sulfo group is introduced onto the surface of the separated pigment microparticles, thereby obtaining the sulfo group-introduced pigment microparticles.

12. The method for surface treatment of pigment microparticles according to claim 1, wherein the surface treatment is effected by treating surface of the pigment microparticles with an acid group.

13. The method for surface treatment of pigment microparticles according to claim 1, wherein the surface treatment is effected by treating surface of the pigment microparticles with a basic group.

14. The method for surface treatment of pigment microparticles according to claim 1, wherein
at least two kinds of fluids are used as the fluid to be processed, the at least two kinds of fluids including a first fluid and a second fluid,
the first fluid is a fluid which contains a pigment solution, including a pigment dissolved into a solvent,
the second fluid is a fluid containing a solvent capable of being a poor solvent that has lower solubility to the pigment than the solvent in the pigment solution, and
the modifying agent containing the functional group is contained in the at least one kind selected from a group of the pigment solution, the poor solvent, and a solvent other than either that in the pigment solution or the poor solvent.

15. The method for surface treatment of pigment microparticles according to claim 1, wherein
the modifying agent containing the functional group is fuming sulfuric acid, and
between the processing surfaces, the pigment microparticles are separated and sulfo group is introduced onto the surface of the separated pigment microparticles, thereby obtaining the sulfo group-introduced pigment microparticles.

* * * * *